(12) United States Patent
Harrison et al.

(10) Patent No.: US 11,812,435 B2
(45) Date of Patent: *Nov. 7, 2023

(54) LAYER 1 AND LAYER 2 CHANNEL STATE INFORMATION RICH REPORTING MECHANISMS

(71) Applicant: Telefonaktiebolaget LM Ericsson (publ), Stockholm (SE)

(72) Inventors: Robert Mark Harrison, Grapevine, TX (US); Sebastian Faxér, Järfälla (SE); Shiwei Gao, Nepean (CA); Stephen Grant, Pleasanton, CA (US); Siva Muruganathan, Stittsville (CA)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 87 days.

This patent is subject to a terminal disclaimer.

(21) Appl. No.: 17/361,597

(22) Filed: Jun. 29, 2021

(65) Prior Publication Data
US 2021/0337535 A1 Oct. 28, 2021

Related U.S. Application Data

(63) Continuation of application No. 15/758,604, filed as application No. PCT/IB2017/054912 on Aug. 11, 2017, now Pat. No. 11,071,095.
(Continued)

(51) Int. Cl.
*H04W 4/00* (2018.01)
*H04W 72/21* (2023.01)
(Continued)

(52) U.S. Cl.
CPC .......... *H04W 72/21* (2023.01); *H04B 7/0417* (2013.01); *H04B 7/0617* (2013.01);
(Continued)

(58) Field of Classification Search
CPC ... H04L 5/0053; H04L 5/0055; H04L 5/0057; H04B 7/0417; H04B 7/0617;
(Continued)

(56) References Cited

U.S. PATENT DOCUMENTS 8,743,992 B2 6/2014 Enescu et al.
9,287,958 B2 3/2016 Son et al.
(Continued)

FOREIGN PATENT DOCUMENTS

CN 104009785 A 8/2014
CN 104025657 A 9/2014
(Continued)

OTHER PUBLICATIONS

European Examination Report dated Oct. 22, 2020 issued in corresponding European U.S. Appl. No. 20189695.8, consisting of 12 pages.
(Continued)

*Primary Examiner* — Bon Hui A Zhu
(74) *Attorney, Agent, or Firm* — Christopher & Weisberg, P.A.

(57) ABSTRACT

A method and system for reporting multi-beam channel state information, CSI, in a wireless device are disclosed. According to one aspect, the method includes providing an indication of a plurality of beam index pairs, $(l_k, m_k)$, in the UCI in a first transmission, each beam index pair corresponding to a beam k. The method also includes providing an indication of at least one of a beam power, a beam rotation and a channel quality index, CQI, in the UCI in a second transmission. The method also includes transmitting at least one of the indication of beam index pairs, beam power, beam rotation and CQI.

20 Claims, 16 Drawing Sheets

Related U.S. Application Data

(60) Provisional application No. 62/374,298, filed on Aug. 12, 2016.

(51) Int. Cl.
  H04L 5/00 (2006.01)
  H04B 7/0417 (2017.01)
  H04B 7/06 (2006.01)

(52) U.S. Cl.
  CPC ......... *H04B 7/0623* (2013.01); *H04B 7/0639* (2013.01); *H04B 7/0695* (2013.01); *H04L 5/0057* (2013.01); *H04B 7/0626* (2013.01); *H04B 7/0632* (2013.01)

(58) Field of Classification Search
  CPC .. H04B 7/0623; H04B 7/0632; H04B 7/0639; H04B 7/0695
  See application file for complete search history.

(56) References Cited

U.S. PATENT DOCUMENTS

| | | | |
|---|---|---|---|
| 9,331,767 | B1 | 5/2016 | Thomas et al. |
| 2002/0187814 | A1 | 12/2002 | Yoshida |
| 2010/0046667 | A1 | 2/2010 | Tsutsui |
| 2011/0026418 | A1 | 2/2011 | Bollea et al. |
| 2011/0050489 | A1 | 3/2011 | Maenpa et al. |
| 2011/0069773 | A1 | 3/2011 | Doron et al. |
| 2011/0080969 | A1 | 4/2011 | Jongren et al. |
| 2011/0135033 | A1 | 6/2011 | Ko et al. |
| 2011/0249637 | A1 | 10/2011 | Hammarwall et al. |
| 2011/0249713 | A1 | 10/2011 | Hammarwall et al. |
| 2011/0305263 | A1 | 12/2011 | Jongren et al. |
| 2012/0033566 | A1 | 2/2012 | Pora et al. |
| 2013/0064129 | A1 | 3/2013 | Koivisto et al. |
| 2013/0107915 | A1 | 5/2013 | Benjebbour et al. |
| 2013/0163457 | A1 | 6/2013 | Kim et al. |
| 2013/0182787 | A1 | 7/2013 | Kakishima et al. |
| 2013/0201912 | A1 | 8/2013 | Sheng et al. |
| 2013/0230118 | A1 | 9/2013 | Onggosanusi et al. |
| 2013/0308715 | A1 | 11/2013 | Nam et al. |
| 2013/0315189 | A1 | 11/2013 | Kim et al. |
| 2013/0343215 | A1 | 12/2013 | Li et al. |
| 2014/0003240 | A1 | 1/2014 | Chen et al. |
| 2014/0037029 | A1 | 2/2014 | Murakami et al. |
| 2014/0050280 | A1 | 2/2014 | Stirling-Gallacher et al. |
| 2014/0146863 | A1 | 5/2014 | Seol et al. |
| 2014/0226611 | A1 | 8/2014 | Kang et al. |
| 2014/0301492 | A1 | 10/2014 | Xin et al. |
| 2014/0334564 | A1 | 11/2014 | Singh et al. |
| 2015/0049702 | A1 | 2/2015 | Cheng et al. |
| 2015/0078191 | A1 | 3/2015 | Jongren et al. |
| 2015/0207547 | A1 | 7/2015 | Ko et al. |
| 2015/0222340 | A1 | 8/2015 | Nagata et al. |
| 2015/0326285 | A1 | 11/2015 | Zirwas et al. |
| 2015/0381253 | A1 | 12/2015 | Kim et al. |
| 2016/0013838 | A1 | 1/2016 | Zhu et al. |
| 2016/0072562 | A1 | 3/2016 | Onggosanusi et al. |
| 2016/0080051 | A1 | 3/2016 | Sajadieh et al. |
| 2016/0127021 | A1 | 5/2016 | Noh et al. |
| 2016/0142117 | A1 | 5/2016 | Rahman et al. |
| 2016/0156391 | A1* | 6/2016 | Fujii ........................ H04B 7/04 455/63.4 |
| 2016/0156401 | A1 | 6/2016 | Onggosanusi et al. |
| 2016/0173180 | A1 | 6/2016 | Cheng et al. |
| 2016/0192383 | A1 | 6/2016 | Hwang et al. |
| 2016/0323022 | A1 | 11/2016 | Rahman et al. |
| 2016/0352012 | A1 | 12/2016 | Foo |
| 2016/0359596 | A1* | 12/2016 | Wild ........................ H04B 7/088 |
| 2017/0134080 | A1 | 5/2017 | Rahman et al. |
| 2017/0134082 | A1 | 5/2017 | Onggosanusi et al. |
| 2017/0238323 | A1 | 8/2017 | Marinier et al. |
| 2017/0311187 | A1 | 10/2017 | Dong et al. |
| 2018/0034519 | A1 | 2/2018 | Rahman et al. |
| 2018/0131420 | A1 | 5/2018 | Faxer et al. |
| 2018/0191411 | A1 | 7/2018 | Faxer et al. |
| 2018/0219605 | A1 | 8/2018 | Davydov et al. |
| 2019/0036584 | A1 | 1/2019 | Chang et al. |
| 2019/0053220 | A1 | 2/2019 | Zhang et al. |

FOREIGN PATENT DOCUMENTS

| | | | |
|---|---|---|---|
| CN | 104508994 | A | 4/2015 |
| CN | 105210306 | A | 12/2015 |
| CN | 105306121 | A | 2/2016 |
| EP | 1 423 926 | A1 | 6/2004 |
| EP | 2439859 | A2 | 4/2012 |
| KR | 10-2016-0029503 | A | 3/2016 |
| RU | 2567852 | C2 | 11/2015 |
| WO | 2015060548 | A1 | 4/2015 |
| WO | 2015/147814 | A1 | 10/2015 |
| WO | 2015/190866 | A1 | 12/2015 |
| WO | 2016/048223 | A1 | 3/2016 |
| WO | 2016/080742 | A1 | 5/2016 |
| WO | 2016/120443 | A1 | 8/2016 |
| WO | 2017/048223 | A1 | 3/2017 |
| WO | 2017/168349 | A1 | 10/2017 |

OTHER PUBLICATIONS

Chinese Office Action dated Jun. 21, 2021 and English Summary of same issued in corresponding Chinese Patent Application No. 1201780063408.5, consisting of 5 pages.

Korean Notice of Preliminary Rejection dated Jun. 10, 2021 issued in corresponding Korean Patent Application No. 10-2021-7012520, consisting of 7 pages.

African Regional Intellectual Property Organization Search and Examination Report dated Jun. 10, 2021 issued in corresponding ARIPO Patent Application No. AP/P/2019/011409, consisting of 5 pages.

Ericsson R1-155678; 3GPP TSG-RAN WG1 #82bis; Title: FD-MIMO Class A Codebook Design; Agenda Item: 7.2.4 3.1; Document for: Discussion and Decision; Malmo, Sweden, Oct. 5-9, 2015, consisting of 11 pages.

Non-Final Office Action dated Oct. 4, 2021 issued in U.S. Appl. No. 17/086,873, consisting of 11 pages.

Colombian Office Action and English translation of the Colombian Office Action dated Jun. 24, 2021 issued in Colombian Patent Application No. NC2019/0001252, consisting of 17 pages.

Russian Decision to Grant and English translation of the Russian Decision to Grant dated Nov. 24, 2021 issued in corresponding Russian Application No. 2020100455/07, consisting of 20 pages.

\* cited by examiner

PRECODER ELEMENTS TO ANTENNA PORT MAPPING EXAMPLE: (N1, N2) = (4,2)

LAYER 1 AND LAYER 2 CHANNEL STATE INFORMATION RICH REPORTING MECHANISMS

CROSS-REFERENCE TO RELATED APPLICATIONS

This application is a continuation of and claims priority to U.S. application Ser. No. 15/758,604, filed Mar. 8, 2018, entitled "LAYER 1 AND LAYER 2 CHANNEL STATE INFORMATION RICH REPORTING MECHANISMS" which is a Submission Under 35 U.S.C. § 371 for U.S. National Stage Patent Application of International Application No. PCT/IB2017/054912, filed Aug. 11, 2017 entitled "LAYER 1 AND LAYER 2 CHANNEL STATE INFORMATION RICH REPORTING MECHANISMS," which claims priority to U.S. Provisional Application No. 62/374,298, filed Aug. 12, 2016, entitled "L1 AND L2 CSI RICH REPORTING MECHANISMS" the entireties of all of these Applications are incorporated herein by reference.

TECHNICAL FIELD

This disclosure relates to wireless communications, and in particular, layer 1 (L1) and layer 2 (L2) channel state information (CSI) reporting mechanisms.

BACKGROUND

LTE uses orthogonal frequency division multiplexing (OFDM) in the downlink and discrete Fourier transform (DFT)-spread OFDM in the uplink. The basic LTE downlink physical resource can thus be seen as a time-frequency grid as illustrated in FIG. 1, where each resource element corresponds to one OFDM subcarrier during one OFDM symbol interval.

As shown in FIG. 2, in the time domain, LTE downlink transmissions are organized into radio frames of 10 ms, each radio frame consisting of ten equally-sized subframes of length $T_{subframe}$=1 ms.

Furthermore, the resource allocation in LTE is typically described in terms of resource blocks, where a resource block corresponds to one slot (0.5 ms) in the time domain and 12 contiguous subcarriers in the frequency domain. Resource blocks are numbered in the frequency domain, starting with 0 from one end of the system bandwidth.

Downlink transmissions are dynamically scheduled, i.e., in each subframe the base station transmits control information over a physical downlink control channel (PDCCH), in the current downlink subframe. This control signaling is typically transmitted in the first 1, 2, 3 or 4 OFDM symbols in each subframe. A downlink system with 3 OFDM symbols as control is illustrated in FIG. 3.

LTE uses hybrid automated repeat request (HARQ), where, after receiving downlink data in a subframe, the terminal attempts to decode it and reports to the base station whether the decoding was successful (ACK) or not (NAK). In case of an unsuccessful decoding attempt, the base station can retransmit the erroneous data.

Uplink control signaling from the terminal to the base station consists of
HARQ acknowledgements for received downlink data;
terminal reports related to the downlink channel conditions, used as assistance for the downlink scheduling;
scheduling requests, indicating that a mobile terminal needs uplink resources for uplink data transmissions.

In order to provide frequency diversity, these frequency resources are frequency hopping on the slot boundary, i.e., one "resource" consists of 12 subcarriers at the upper part of the spectrum within the first slot of a subframe and an equally sized resource at the lower part of the spectrum during the second slot of the subframe or vice versa. This is shown in FIG. 4. If more resources are needed for the uplink L1/L2 control signaling, e.g., in case of very large overall transmission bandwidth supporting a large number of users, additional resources blocks can be assigned next to the previously assigned resource blocks.

As mentioned above, uplink L1/L2 control signaling include hybrid-ARQ acknowledgements, channel state information and scheduling requests. Different combinations of these types of messages are possible as described further below, but to explain the structure for these cases it is beneficial to discuss separate transmission of each of the types first, starting with the hybrid-ARQ and the scheduling request. There are 5 formats defined for PUCCH in Rel-13, each capable of carrying a different number of bits. For this background art, PUCCH formats 2 and 3 are the most noteworthy.

Wireless devices can report channel state information (CSI) to provide the base station, e.g., eNodeB (eNB), with an estimate of the channel properties at the terminal in order to aid channel-dependent scheduling. Such channel properties are those that tend to vary with the fading of the channel or with interference, such as the relative gain and phase of the channel between antenna elements, the signal to interference and noise ratio (SINR) in a given subframe, etc. Such CSI feedback is used to adapt MIMO precoding and modulation and coding states. LTE provides other measures of channel properties, such as received signal strength indicator (RSSI), reference signal received power (RSRP), and reference signal received quality (RSRQ), however these are longer term properties not used to adapt multiple input multiple output (MIMO) transmission or to select modulation and coding states, and so are not considered CSI in the context of this disclosure.

A CSI report consists of multiple bits per subframe transmitted in the uplink control information (UCI) report. Physical uplink control channel (PUCCH) format 1, which is capable of at most two bits of information per subframe, can obviously not be used for this purpose. Transmission of CSI reports on the PUCCH in Rel-13 is instead handled by PUCCH formats 2, 3, 4, and 5, which are capable of multiple information bits per subframe.

PUCCH format 2 resources are semi-statically configured. A Format 2 report can carry a payload of at most 11 bits. Variants of format 2 are format 2a and 2b which also carries HARQ-ACK information of 1 and 2 bits respectively for normal cyclic prefix. For extended cyclic prefix, PUCCH Format 2 can also carry HARQ-ACK information. For simplicity, they are all referred to as format 2 herein.

PUCCH format 3 is designed to support larger HARQ-ACK payloads, and can carry up to 10 or 20 HARQ-ACK bits for frequency division duplex (FDD) and time division duplex (TDD), respectively. It can also carry scheduling resource (SR), and so supports up to 21 bits total. PUCCH format 3 can also carry CSI. PUCCH formats 4 and 5 carry still larger payloads.

Because PUCCH payloads are constrained, LTE defines CSI reporting types that carry subsets of CSI components (such as channel quality index (CQI), precoding matrix indicator (PMI), rank indicator (RI), and CSI-RS resource indicator (CRI)). Together with the PUCCH reporting mode and 'Mode State', each reporting type defines a payload that can be carried in a given PUCCH transmission, which is given in 3GPP TS 36.213, Table 7.2.2-3. In Rel-13, all PUCCH reporting types have payloads that are less than or equal to 11 bits, and so all can be carried in a single PUCCH format 2 transmission.

Various CSI reporting types are defined in Rel-13 LTE:
Type 1 report supports CQI feedback for the wireless device selected subbands;
Type 1a report supports subband CQI and second PMI feedback;
Type 2, Type 2b, and Type 2c report supports wideband CQI and PMI feedback;
Type 2a report supports wideband PMI feedback;
Type 3 report supports RI feedback;
Type 4 report supports wideband CQI;
Type 5 report supports RI and wideband PMI feedback;
Type 6 report supports RI and PTI feedback;
Type 7 report support CRI and RI feedback;
Type 8 report supports CRI, RI and wideband PMI feedback;
Type 9 report supports CRI, RI and PTI feedback; and
Type 10 report supports CRI feedback.

These reporting types are transmitted on PUCCH with periodicities and offsets (in units of subframes) determined according to whether CQI, Class A first PMI, RI, or CRI are carried by the reporting type. Table 1 below shows the subframes when the various reporting types are transmitted assuming that wideband CSI reports are used with a single CSI subframe set. Similar mechanisms are used for subband reporting and for multiple subframe sets.

multiplexed in with CQI, being transmitted instead of CQI in one of out of H' transmissions of CQI and Class A first PMI. CRI is time multiplexed in with RI in a similar way: CRI is transmitted instead of RI in one of out of $M_{CRI}$ transmissions of RI and CRI.

It is also worth noting that PUCCH format 3 can carry ACK/NACK and CSI in the same PUCCH transmission, but the CSI must be from only one serving cell. Furthermore, in Rel-13, a wireless device only transmits CSI on PUCCH format 3 when transmitting ACK/NACK. If there is no ACK/NACK to be transmitted in a given subframe and CSI is to be transmitted on PUCCH, the wireless device will use PUCCH format 2 in that subframe.

LTE control signaling can be carried in a variety of ways, including carrying control information on PDCCH, EPDCCH or PUCCH, embedded in the PUSCH, in MAC control elements ('MAC CEs'), or in radio resource control (RRC) signaling. Each of these mechanisms is customized to carry a particular kind of control information.

Control information carried on physical downlink control channel (PDCCH), evolved PDCCH (EPDCCH), PUCCH, or embedded in physical uplink shared channel (PUSCH) is physical layer related control information, such as downlink control information (DCI), and uplink control information (UCI), as described in 3GPP TS 36.211, 36.212, and 36.213. DCI is generally used to instruct the wireless device to perform some physical layer function, providing the needed information to perform the function. UCI generally provides the network with needed information, such as HARQ-ACK, scheduling request (SR), channel state information (CSI),

TABLE 1

| CSI content | CSI Reporting Type | Subframe in which wideband CSI reporting type(s) are transmitted |
|---|---|---|
| CQI | 1, 1a, 2, 2b, 2c, 4 | $(10 \times n_f + [n_s/2] - N_{OFFSET, CQI}) \bmod (N_{pd}) = 0$ |
| Class A first PMI | 2a | $(10 \times n_f + [n_s/2] - N_{OFFSET, CQI}) \bmod (H' \cdot N_{pd}) = 0$ |
| RI | 3, 5 | $(10 \times n_f + [n_s/2] - N_{OFFSET, CQI} - N_{OFFSET, RI}) \bmod (N_{pd} \cdot M_{RI}) = 0$ |
| CRI* | 7, 8, 9, 10 | $(10 \times n_f + [n_s/2] - N_{OFFSET, CQI} - N_{OFFSET, RI}) \bmod (N_{pd} \cdot M_{RI} \cdot M_{CRI}) = 0$ |

*Note
that this is for the case where more than one CSI-RS port is configured.

Where (as defined in 3GPP TSs 36.213 and 36.331):
$n_f$ is the system frame number
$n_s$ is the slot number within a radio frame
$N_{pd}$ is a periodicity in subframes set by the higher layer parameter cqi-pmi-ConfigIndex
$N_{OFFSET,CQI}$ is an offset in subframes set by the higher layer parameter cqi-pmi-ConfigIndex
H' is set by the higher layer parameter periodicityFactorWB
$M_{RI}$ is periodicity multiple in subframes set by the higher layer parameter ri-ConfigIndex
$N_{OFFSET,RI}$ is an offset in subframes set by the higher layer parameter ri-ConfigIndex
$M_{CRI}$ is periodicity multiple in subframes set by the higher layer parameter cri-ConfigIndex It can be observed that PUCCH CSI reporting has a fundamental periodicity of $N_{pd}$ subframes, and that CQI can be reported at this rate. If RI is configured, it can also be reported at the same rate as CQI, since an offset $N_{OFFSET,RI}$ can allow RI to have different shifts of the same periodicity as CQI. On the other hand, Class A first PMI is time including CQI, PMI, RI, and/or CRI. UCI and DCI can be transmitted on a subframe-by-subframe basis, and so are designed to support rapidly varying parameters, including those that can vary with a fast fading radio channel. Because UCI and DCI can be transmitted in every subframe, UCI or DCI corresponding to a given cell tend to be on the order of tens of bits, in order to limit the amount of control overhead.

Control information carried in medium access control (MAC) control elements (CEs) is carried in MAC headers on the uplink and downlink shared transport channels (UL-SCH and DL-SCH), as described in 3GPP TS 36.321. Since a MAC header does not have a fixed size, control information in MAC CEs can be sent when it is needed, and does not necessarily represent a fixed overhead. Furthermore, MAC CEs can carry larger control payloads efficiently, since they are carried in UL-SCH or DL-SCH transport channels, which benefit from link adaptation, HARQ, and can be turbo coded (whereas UCI and DCI can't be in Rel-13). MAC CEs are used to perform repetitive tasks that use a fixed set of parameters, such as maintaining timing advance or buffer status reporting, but these tasks generally do not require transmission of a MAC CE on a subframe-by-subframe basis. Consequently, channel state information related to a fast fading radio channel, such as PMI, CQI, RI, and CRI are not carried in MAC CEs in Rel-13.

Dedicated RRC control information is also carried through UL-SCH and DL-SCH, but using signaling radio bearers (SRBs), as discussed in 3GPP TS 36.331. Consequently, it can also carry large control payloads efficiently. However, SRBs are not generally intended for very frequent transmission of large payloads, and need to be available to support less frequent signaling that should be highly reliably transmitted, such as for mobility procedures including handover. Therefore, similar to the MAC, RRC signaling does not carry channel state information related to a fast fading radio channel, such as PMI, CQI, RI, and CRI in Rel-13. In fact, this kind of CSI is only carried in UCI signaling on PUSCH or PUCCH.

Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

The LTE standard is currently evolving with enhanced MIMO support. A core component in LTE is the support of MIMO antenna deployments and MIMO related techniques. Currently LTE Rel-13 supports an 8-layer spatial multiplexing mode for 16 Tx antennas with channel dependent precoding. The spatial multiplexing mode is aimed for high data rates in favorable channel conditions. An illustration of the spatial multiplexing operation is provided in FIG. 5.

As seen, the information carrying symbol vector s is multiplied by an $N_T \times r$ precoder matrix W, which serves to distribute the transmit energy in a subspace of the $N_T$ (corresponding to $N_T$ antenna ports) dimensional vector space. The precoder matrix is typically selected from a codebook of possible precoder matrices, and typically indicated by means of a precoder matrix indicator (PMI), which specifies a unique precoder matrix in the codebook for a given number of symbol streams. The r symbols in s each correspond to a layer and r is referred to as the transmission rank. In this way, spatial multiplexing is achieved since multiple symbols can be transmitted simultaneously over the same time/frequency resource element (TFRE). The number of symbols r is typically adapted to suit the current channel properties.

LTE uses OFDM in the downlink (and DFT precoded OFDM in the uplink) and hence the received $N_R \times 1$ vector $y_n$ for a certain TFRE on subcarrier n (or alternatively data TFRE number n) is thus modeled by $$y_n = H_n W s_n + e_n \qquad \text{Equation 1}$$

where $e_n$ is a noise/interference vector obtained as realizations of a random process. The precoder W can be a wideband precoder, which is constant over frequency, or frequency selective.

The precoder matrix W is often chosen to match the characteristics of the $N_R \times N_T$ MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to the wireless device. In addition, the precoder matrix may also be selected to strive for orthogonalizing the channel, meaning that after proper linear equalization at the wireless device, the inter-layer interference is reduced.

One example method for a wireless device to select a precoder matrix W can be to select the $W_k$ that maximizes the Frobenius norm of the hypothesized equivalent channel:

$$\max_k \|\hat{H}_n W_k\|_F^2 \qquad \text{Equation 2}$$

Where
$\hat{H}_n$ is a channel estimate, possibly derived from CSI-RS as described below.
$W_k$ is a hypothesized precoder matrix with index k.
$\hat{H}_n W_k$ is the hypothesized equivalent channel With regard to CSI feedback, a subband is defined as a number of adjacent PRB pairs. In LTE, the subband size (i.e., the number of adjacent PRB pairs) depends on the system bandwidth, whether CSI reporting is configured to be periodic or aperiodic, and feedback type (i.e., whether higher layer configured feedback or wireless device-selected subband feedback is configured). An example illustrating the difference between subband and wideband is shown in FIG. 6. In the example, the subband consists of 6 adjacent PRBs. Note that only 2 subbands are shown in FIG. 6 for simplicity of illustration. Generally, all the PRB pairs in the system bandwidth are divided into different subbands where each subband consists of a fixed number of PRB pairs. In contrast, wideband involves all the PRB pairs in the system bandwidth. As mentioned above, a wireless device may feedback a single precoder that takes into account the measurements from all PRB pairs in the system bandwidth if it is configured to report wideband precoder matrix indicator PMI by the eNodeB. Alternatively, if the wireless device is configured to report subband PMI, a wireless device may feedback multiple precoders with one precoder per subband. In addition, to the subband precoders, the wireless device may also feedback the wideband PMI.

In closed-loop precoding for the LTE downlink, the wireless device transmits, based on channel measurements in the forward link (downlink), recommendations to the eNodeB of a suitable precoder to use. The eNB configures the wireless device to provide feedback according to the wireless device's transmission mode, and may transmit CSI-RS and configure the wireless device to use measurements of CSI-RS to feedback recommended precoding matrices that the wireless device selects from a codebook. A single precoder that is supposed to cover a large bandwidth (wideband precoding) may be fed back. It may also be beneficial to match the frequency variations of the channel and instead feedback a frequency-selective precoding report, e.g., several precoders, one per subband. This is an example of the more general case of channel state information feedback, which also encompasses feeding back other information than recommended precoders to assist the eNodeB in subsequent transmissions to the wireless device. Such other information may include channel quality indicators (CQIs) as well as transmission rank indicator (RI).

Given the CSI feedback from the wireless device, the eNodeB determines the transmission parameters it wishes to use to transmit to the wireless device, including the precoding matrix, transmission rank, and modulation and coding state (MCS). These transmission parameters may differ from the recommendations the wireless device makes. Therefore a rank indicator and MCS may be signaled in downlink control information (DCI), and the precoding matrix can be signaled in DCI or the eNodeB can transmit a demodulation reference signal from which the equivalent channel can be measured. The transmission rank, and thus the number of spatially multiplexed layers, is reflected in the number of columns of the precoder W. For efficient performance, a transmission rank that matches the channel properties should be selected.

In closed loop MIMO transmission schemes such as TM9 and TM10, a wireless device estimates and feeds back the downlink CSI to the eNodeB. The eNB uses the feedback CSI to transmit downlink data to the wireless device. The CSI consists of a transmission rank indicator (RI), a precoding matrix indicator (PMI) and a channel quality indicator(s) (CQI). A codebook of precoding matrices is used by the wireless device to find out the best match between the estimated downlink channel $H_n$ and a precoding matrix in the codebook based on certain criteria, for example, the wireless device throughput. The channel $H_n$ is estimated based on a Non-Zero Power CSI reference signal (NZP CSI-RS) transmitted in the downlink for TM9 and TM10.

The CQI/RI/PMI together provide the downlink channel state to the wireless device. This is also referred to as implicit CSI feedback since the estimation of $H_n$ is not fed back directly. The CQI/RI/PMI can be wideband or subband depending on which reporting mode is configured.

The RI corresponds to a recommended number of streams that are to be spatially multiplexed and thus transmitted in parallel over the downlink channel. The PMI identifies a recommended precoding matrix codeword (in a codebook which contains precoders with the same number of rows as the number of CSI-RS ports) for the transmission, which relates to the spatial characteristics of the channel. The CQI represents a recommended transport block size (i.e., code rate) and LTE supports transmission of one or two simultaneous (on different layers) transmissions of transport blocks (i.e., separately encoded blocks of information) to a wireless device in a subframe. There is thus a relation between a CQI and an SINR of the spatial stream(s) over which the transport block or blocks are transmitted.

Codebooks of up to 16 antenna ports have been defined in LTE Up to Release 13. Both one dimension (1D) and two-dimension (2D) antenna array are supported. For LTE Release 12 wireless device and earlier, only a codebook feedback for a 1D port layout is supported, with 2, 4 or 8 antenna ports. Hence, the codebook is designed assuming these ports are arranged on a straight line in one dimension. In LTE Rel-13, codebooks for 2D port layouts were specified for the case of 8, 12, or 16 antenna ports. In addition, a codebook for 1D port layout for the case of 16 antenna ports was also specified in LTE Rel-13.

In LTE Rel-13, two types of CSI reporting were introduced, i.e., Class A and Class B. In Class A CSI reporting, a wireless device measures and reports CSI based on a new codebook for the configured 2D antenna array with 8, 12 or 16 antenna ports. The Class A codebook is defined by five parameters, i.e., (N1,N2,Q1,Q2,CodebookConfig), where (N1,N2) are the number of antenna ports in a first and a second dimension, respectively. (Q1,Q2) are the DFT oversampling factor for the first and the second dimension, respectively. CodebookConfig ranges from 1 to 4 and defines four different ways the codebook is formed. For CodebookConfig=1, a PMI corresponding to a single 2D beam is fed back for the whole system bandwidth while for CodebookConfig={2,3,4}, PMIs corresponding to four 2D beams are fed back and each subband may be associated with a different 2D beam. The CSI consists of a RI, a PMI and a CQI or CQIs, similar to the CSI reporting in pre Rel-13.

In Class B CSI reporting, in one scenario (also refers to as "$K_{CSI-RS}$>1"), the eNB may pre-form multiple beams in one antenna dimension. There can be multiple ports (1, 2, 4, or 8 ports) within each beam on the other antenna dimension. "beamformed" CSI-RS are transmitted along each beam. A wireless device first selects the best beam from a group of beams configured and then measures CSI within the selected beam based on the legacy codebook for 2, 4, or 8 ports. The wireless device then reports back the selected beam index and the CSI corresponding to the selected beam. In another scenario (also refers to as "$K_{CSI-RS}$=1"), the eNB may form up to 4 (2D) beams on each polarization and "beamformed" CSI-RS is transmitted along each beam. A wireless device measures CSI on the "beamformed" CSI-RS and feedback CSI based on a new Class B codebook for 2, 4, or 8 ports.

In LTE Release-10, a new reference symbol sequence was introduced for the intent to estimate downlink channel state information, the CSI-RS. The CSI-RS provides several advantages over basing the CSI feedback on the common reference symbols (CRS) which were used, for that purpose, in previous releases. Firstly, the CSI-RS is not used for demodulation of the data signal, and thus does not require the same density (i.e., the overhead of the CSI-RS is substantially less). Secondly, CSI-RS provides a much more flexible means to configure CSI feedback measurements (e.g., which CSI-RS resource to measure on can be configured in a wireless device specific manner).

By measuring a CSI-RS transmitted from the eNodeB, a wireless device can estimate the effective channel the CSI-RS is traversing including the radio propagation channel and antenna gains. In more mathematical rigor this implies that if a known CSI-RS signal x is transmitted, a wireless device can estimate the coupling between the transmitted signal and the received signal (i.e., the effective channel). Hence if no virtualization is performed in the transmission, the received signal y can be expressed as $$y=Hx+e \qquad \text{Equation 3}$$

and the wireless device can estimate the effective channel H.

Up to eight CSI-RS ports can be configured in LTE Rel-10, that is, the wireless device can estimate the channel from up to eight transmit antennas. Up to eight CSI-RS ports can be configured in LTE Rel-10, that is, the wireless device can estimate the channel from up to eight transmit antenna ports. In LTE Release 13, the number of CSI-RS ports that can be configured is extended to up to sixteen ports (3GPP TS 36.213, 3GPP TS 36.211). In LTE Release 14, supporting up to 32 CSI-RS ports is under consideration.

Related to CSI-RS is the concept of zero-power CSI-RS resources (also known as a muted CSI-RS) that are configured just as regular CSI-RS resources, so that a wireless device knows that the data transmission is mapped around those resources. The intent of the zero-power CSI-RS resources is to enable the network to mute the transmission on the corresponding resources in order to boost the SINR of a corresponding non-zero power CSI-RS, possibly transmitted in a neighbor cell/transmission point. For Rel-11 of LTE a special zero-power CSI-RS was introduced that a wireless device is mandated to use for measuring interference plus noise. A wireless device can assume that the transmission points of interest are not transmitting on the zero-power CSI-RS resource, and the received power can therefore be used as a measure of the interference plus noise.

Based on a specified CSI-RS resource and on an interference measurement configuration (e.g., a zero-power CSI-RS resource), the wireless device can estimate the effective channel and noise plus interference, and consequently also determine the rank, precoding matrix, and MCS to recommend to best match the particular channel.

Exemplary embodiments presented in this disclosure may be used with two dimensional antenna arrays and some of the presented embodiments use such antennas. Such antenna arrays may be (partly) described by the number of antenna columns corresponding to the horizontal dimension $N_h$, the number of antenna rows corresponding to the vertical dimension $N_v$ and the number of dimensions corresponding to different polarizations $N_p$. The total number of antennas is thus $N=N_hN_vN_p$. It should be pointed out that the concept of an antenna is non-limiting in the sense that it can refer to any virtualization (e.g., linear mapping) of the physical antenna elements. For example, pairs of physical sub-elements could be fed the same signal, and hence share the same virtualized antenna port.

An example of a 4×4 array with cross-polarized antenna elements is illustrated in FIG. 7. A two-dimensional antenna array of cross-polarized antenna elements (N, =2), with $N_h$=4 horizontal antenna elements and $N_v$=4 vertical antenna elements is shown. Precoding may be interpreted as multiplying the signal with different beamforming weights for each antenna prior to transmission. A typical approach is to tailor the precoder to the antenna form factor, i.e. taking into account $N_h$, $N_v$, and $N_p$ when designing the precoder codebook. Such 2D codebooks may not strictly relate vertical or horizontal dimensions to the dimensions that antenna ports are associated with. Therefore, 2D codebooks can be considered to have a first and a second number of antenna ports $N_1$ and $N_2$, wherein $N_1$ can correspond to either the horizontal or vertical dimension, and so $N_2$ corresponds to the remaining dimension. That is, if $N_1=N_h$, then $N_2=N_v$, while if $N_1=N_v$, then $N_2=N_h$. Similarly, 2D codebooks may not strictly related antenna ports to polarization, and be designed with cophasing mechanisms used to two combine beams or two antenna ports, as described in the following.

A common type of precoding is to use a DFT-precoder, where the precoder vector used to precode a single-layer transmission using a single-polarized uniform linear array (ULA) with $N_1$ antennas is defined as $$w_{1D}(l, N_1, O_1) = \frac{1}{\sqrt{N_1}}\begin{bmatrix} e^{j2\pi \cdot 0 \cdot \frac{l}{O_1N_1}} \\ e^{j2\pi \cdot 1 \cdot \frac{l}{O_1N_1}} \\ \vdots \\ e^{j2\pi \cdot (N_1-1) \cdot \frac{l}{O_1N_1}} \end{bmatrix} \quad \text{Equation 4}$$

where l=0, 1, ... $O_1N_1-1$ is the precoder index and $O_1$ is an integer oversampling factor. A precoder for a dual-polarized uniform linear array (ULA) with $N_1$ antennas per polarization (and so $2N_1$ antennas in total) can be similarly defined as $$W_{1D,DP}(l, N_1, O_1) = \quad \text{Equation 5}$$
$$\begin{bmatrix} w_{1D}(l) \\ e^{j\phi}w_{1D}(l) \end{bmatrix} = \begin{bmatrix} w_{1D}(l) & 0 \\ 0 & w_{1D}(l) \end{bmatrix}\begin{bmatrix} 1 \\ e^{j\phi} \end{bmatrix}$$

where $e^{j\phi}$ is a cophasing factor between the two polarizations that may for instance be selected from a QPSK alphabet $$\phi \in \left\{0, \frac{\pi}{2}, \pi, \frac{3\pi}{2}\right\}.$$

A corresponding precoder vector for a two-dimensional uniform planar arrays (UPA) with $N_1 \times N_2$ antennas can be created by taking the Kronecker product of two precoder vectors as $w_{2D}(l,m) w_{1D} (l, N_1, O_1) \otimes w_{1D} (m, N_2, O_2)$, where $O_2$ is an integer oversampling factor in the $N_2$ dimension. Each precoder $W_{2D}(l,m)$ forms a DFT beam, all the precoders {$w_{2D}(l,m)$, l=0, ..., $N_1O_1-1$; m=0, ..., $N_2O_2-1$} form a grid of DFT beams. An example is shown in FIG. 8, where ($N_1$, $N_2$)=(4,2) and ($O_1$, $O_2$)=(4,4). Throughout the following sections, the terms 'DFT beams' and 'DFT precoders' are used interchangeably.

More generally, a beam with an index pair (l,m) can be identified by the direction in which the greatest energy is transmitted when precoding weights $w_{2D}$ (l,m) are used in the transmission. Also, a magnitude taper can be used with DFT beams to lower the beam's sidelobes. A 1D DFT precoder along $N_1$ and $N_2$ dimensions with magnitude tapering can be expressed as $$W_{1D}(l, N_1, O_1, \beta) = \frac{1}{\sqrt{N_1}}\begin{bmatrix} \beta_0 e^{j2\pi \cdot 0 \cdot \frac{l}{O_1N_1}} \\ \beta_1 e^{j2\pi \cdot 1 \cdot \frac{l}{O_1N_1}} \\ \vdots \\ \beta_{N_1-1} e^{j2\pi \cdot (N_1-1) \cdot \frac{l}{O_1N_1}} \end{bmatrix},$$

$$W_{1D}(m, N_2, O_2, \gamma) = \frac{1}{\sqrt{N_2}}\begin{bmatrix} \gamma_0 e^{j2\pi \cdot 0 \cdot \frac{m}{O_2N_2}} \\ \gamma_1 e^{j2\pi \cdot 1 \cdot \frac{m}{O_2N_2}} \\ \vdots \\ \gamma_{N_2-1} e^{j2\pi \cdot (N_2-1) \cdot \frac{m}{O_2N_2}} \end{bmatrix}$$

Where $0<\beta_i, \gamma_k \leq 1$ (i=0, 1, ..., $N_1-1$; k=0, 1, ..., $N_2-1$) are amplitude scaling factors. $\beta_i=1, \gamma_k=1$ (i=0, 1, ..., $N_1-1$; k=0, 1, ..., $N_2-1$) correspond to no tapering. DFT beams (with or without a magnitude taper) have a linear phase shift between elements along each of the two dimensions. Without loss of generality, it can be assumed that the elements of w(l,m) are ordered according to w(l,m)=$w_{1D}$ (l, $N_1,O_1$, $\beta) \otimes w_{1D}$ (m, $N_2$, $O_2$, $\gamma$) such that adjacent elements correspond to adjacent antenna elements along dimension $N_2$, and elements of w(l,m) spaced $N_2$ apart correspond to adjacent antenna elements along dimension $N_1$. Then the phase shift between two elements $w_{s_1}$(l,m) and $w_{s_2}$(l,m) of w(l,m) can be expressed as:

$$w_{s_2}(l, m) = w_{s_1}(l, m) \cdot \left(\frac{\alpha_{s_2}}{\alpha_{s_1}}\right) \cdot e^{j2\pi((k_1-i_1)\Delta_1 + (k_2-i_2)\Delta_2)}$$

Where
$s_1=i_1N_2+i_2$ and $s_2=k_1N_2+k_2$ (with $0 \leq i_2 < N_2$, $0 \leq i_1 < N_1$, $0 \leq k_2 < N_2$, and $0 \leq k_1 < N_1$) are integers identifying two entries of the beam w(l,m) so that ($i_1$, $i_2$) indicates to a first entry of beam w(l,m) that is mapped to a first antenna element (or port) and ($k_1$, $k_2$) indicates to a second entry of beam w(l,m) that is mapped to a second antenna element (or port).

$\alpha_{s_1}=\beta_{i_1}\gamma_{i_2}$ and $\alpha_{s_2}=\beta_{k_1}\gamma_{k_2}$ are real numbers. $\alpha_i \neq 1$ (i=$s_1$, $s_2$) if magnitude tapering is used; otherwise $\alpha_i$=1.

$$\Delta_1 = \frac{l}{O_1 N_1}$$

is a phase shift corresponding to a direction along an axis, e.g. the horizontal axis ('azimuth')

$$\Delta_2 = \frac{m}{O_2 N_2}$$

is a phase shift corresponding to direction along an axis, e.g. the vertical axis ('elevation')

Therefore a $k^{th}$ beam d(k) formed with precoder w($l_k$, $m_k$) can also be referred to by the corresponding precoder w($l_k$, $m_k$), i.e. d(k)=w($l_k$, $m_k$). Thus a beam d(k) can be described as having associated a set of complex numbers, each element of the set being characterized by at least one complex phase shift such that an element of the beam is related to any other element of the beam where $d_n(k)=d_i(k)\alpha_{i,n}e^{j2\pi(p\Delta_{1,k}+q\Delta_{2,k})}=d_i(k)\alpha_{i,n}(e^{j2\pi\Delta_{1,k}})^p(e^{j2\pi\Delta_{2,k}})^q$, where $d_i(k)$ is the $i^{th}$ element of a beam d(k), $\alpha_{i,n}$ is a real number corresponding to the $i^{th}$ and $n^{th}$ elements of the beam d(k); p and q are integers; and $\Delta_{1,k}$ and $\Delta_{2,k}$ are real numbers corresponding to a beam with index pair ($l_k$, $m_k$) that determine the complex phase shifts $e^{j2\pi\Delta_{1,k}}$ and $e^{j2\pi\Delta_{2,k}}$, respectively. Index pair ($l_k$, $m_k$) corresponds to a direction of arrival or departure of a plane wave when beam d(k) is used for transmission or reception in a UPA or ULA. A beam d(k) can be identified with a single index k' where '=$l_k$+$N_1 O_1 m_k$, i.e., along vertical or $N_2$ dimension first, or alternatively k'=$N_2 O_2 l_k$+$m_k$, i.e. along horizontal or $N_1$ dimension first.

An example of precoder elements of a beam w(l,m) to antenna ports mapping is shown in FIG. 9, where a single polarization 2D antenna with ($N_1$, $N_2$)=(4,2) is illustrated. Weights $w_i$(l,m) are applied on the transmit (Tx) signal to port i (i=1, 2, . . . , 8). There is a constant phase shift between any two precoder elements associated with two adjacent antenna ports along each dimension. For example, with $\Delta_2$ defined as above, the phase shift between $w_1$(l,m) and $w_2$(l,m) is $e^{j2\pi\Delta_2}$, which is the same as the phase shift between $w_7$(l,m) and $w_8$(l,m). Similarly, with $\Delta_1$ defined as above, the phase shift between $w_2$(l,m) and $w_4$(l,m) is $e^{j2\pi\Delta_1}$, which is the same as the phase shift between $w_5$(l,m) and $w_7$(l,m).

Extending the precoder for a dual-polarized uniform linear array (ULA) may then be done as $$W_{2D,DP}(l,m,\phi) = \begin{bmatrix} 1 \\ e^{j\phi} \end{bmatrix} \otimes w_{2D}(l,m) = \begin{bmatrix} w_{2D}(l,m) \\ e^{j\phi}w_{2D}(l,m) \end{bmatrix} = \begin{bmatrix} W_{2D}(l,m) & 0 \\ 0 & W_{2D}(l,m) \end{bmatrix} \begin{bmatrix} 1 \\ e^{j\phi} \end{bmatrix} \quad \text{Equation 6}$$

A precoder matrix $W_{2D,DP}$ for multi-layer transmission may be created by appending columns of DFT precoder vectors as $$W_{2D,DP}^{(R)} = [w_{2D,DP}(l_1,m_1,\phi_1) w_{2D,DP}(l_2,m_2,\phi_2) \ldots w_{2D,DP}(l_R,m_R,\phi_R)]$$

where R is the number of transmission layers, i.e. the transmission rank. In a special case for a rank-2 DFT precoder, $m_1=m_2=m$ and $l_1=l_2=1$, one has $$W_{2D,DP}^{(2)}(l,m,\phi_1,\phi_2) = [W_{2D,DP}(l,m,\phi_1) \quad W_{2D,DP}(l,m,\phi_2)] = \begin{bmatrix} W_{2D}(l,m) & 0 \\ 0 & w_{2D}(l,m) \end{bmatrix} \begin{bmatrix} 1 & 1 \\ e^{j\phi_1} & e^{j\phi_2} \end{bmatrix} \quad \text{Equation 7}$$

For each rank, all the precoder candidates form a 'precoder codebook' or a 'codebook'. A wireless device can first determine the rank of the estimated downlink wideband channel based CSI-RS. After the rank is identified, for each subband the wireless device then searches through all the precoder candidates in a codebook for the determined rank to find the best precoder for the subband. For example, in case of rank=1, the wireless device would search through $w_{2D,DP}$(k, l, φ) for all the possible (k, l, φ) values. In case of rank=2, the wireless device would search through $W_{2D,DP}^{(2)}$(k,l,φ$_1$,φ$_2$) for all the possible (k,l,φ$_1$,φ$_2$) values.

With multi-user MIMO, two or more wireless devices in the same cell are co-scheduled on the same time-frequency resource. That is, two or more independent data streams are transmitted to different wireless devices at the same time, and the spatial domain is used to separate the respective streams. By transmitting several streams simultaneously, the capacity of the system can be increased. This however, comes at the cost of reducing the SINR per stream, as the power has to be shared between streams and the streams will cause interference to each-other.

When increasing the antenna array size, the increased beamforming gain will lead to higher SINR, however, as the user throughput depends only logarithmically on the SINR (for large SINRs), it is instead beneficial to trade the gains in SINR for a multiplexing gain, which increases linearly with the number of multiplexed users.

Accurate CSI is required in order to perform appropriate nullforming between co-scheduled users. In the current LTE Rel.13 standard, no special CSI mode for MU-MIMO exists and thus, MU-MIMO scheduling and precoder construction has to be based on the existing CSI reporting designed for single-user MIMO (that is, a PMI indicating a DFT-based precoder, a RI and a CQI). This may prove quite challenging for MU-MIMO, as the reported precoder only contains information about the strongest channel direction for a user and may thus not contain enough information to do proper nullforming, which may lead to a large amount of interference between co-scheduled users, reducing the benefit of MU-MIMO.

Codebooks and CSI feedback for multibeam precoding have been disclosed in the literature. Herein, we describe one such codebook. While the multi-beam codebook is described with two dimensions of the codebook relating to horizontal and vertical dimensions for concreteness, the codebook is equally applicable to a general case where the first or second dimension relates to horizontal or vertical antenna ports, as described above.

$D_N$ is first defined as a size N×N DFT matrix, i.e. the elements of $D_N$ are defined as $$[D_N]_{k,l} = \frac{1}{\sqrt{N}} e^{\frac{j2\pi kl}{N}}.$$

Further we define $$R_N(q) = \text{diag}\left(\left[e^{j2\pi \cdot 0 \cdot \frac{q}{N}} e^{j2\pi \cdot 1 \cdot \frac{q}{N}} \ldots e^{j2\pi \cdot (N-1) \cdot \frac{q}{N}}\right]\right)$$

to be a size N×N rotation matrix, defined for $0 \leq q < 1$. Multiplying $D_N$ with $R_N(q)$ from the left creates a rotated DFT matrix with entries $$[R_N(q)D_N]_{k,l} = \frac{1}{\sqrt{N}} e^{\frac{j2\pi k(l+q)}{N}}.$$

The rotated DFT matrix $R_N(q)D_N = [d_1\ d_2\ \ldots\ d_N]$ consist of normalized orthogonal column vectors $\{d_i\}_{i=1}^N$ which furthermore span the vector space $\mathbb{C}^N$. That is, the columns of $R_N(q)D_N$, for any q, is an orthonormal basis of $\mathbb{C}^N$.

A codebook design begins with extending the (rotated) DFT matrices that were appropriate transforms for a single-polarized ULA as discussed above to also fit the more general case of dual-polarized 2D uniform planar arrays (UPAs). We define a rotated 2D DFT matrix as $D_{N_V,N_H}(q_V, q_H) = (R_{N_H}(q_H)D_{N_H}) \otimes (R_{N_V}(q_V)D_{N_V})$ $[d_1\ d_2\ \ldots\ d_{N_VN_H}]$. The columns $\{d_i\}_{i=1}^{N_{DP}}$ of $D_{N_V,N_H}(q_V,q_H)$ constitutes an orthonormal basis of the vector space $\mathbb{C}^{N_VN_H}$. Such a column $d_i$ is henceforth denoted a (DFT) beam.

A dual-polarized beam space transformation matrix suitable for a UPA is created, where the upper left and lower right elements correspond to the two polarizations:

$$B_{N_V,N_H}(q_V, q_H) =$$

$$I_2 \otimes D_{N_V,N_H}(q_V, q_H) = \begin{bmatrix} D_{N_V,N_H}(q_V, q_H) & 0 \\ 0 & D_{N_V,N_H}(q_V, q_H) \end{bmatrix} =$$

$$\begin{bmatrix} d_1 & d_2 & \ldots & d_{N_VN_H} & 0 & 0 & \ldots & 0 \\ 0 & 0 & \ldots & 0 & d_1 & d_2 & \ldots & d_{N_VN_H} \end{bmatrix} = [b_1\ b_2\ \ldots\ b_{2N_VN_H}].$$

The columns $\{b_i\}_{i=1}^{2N_VN_H}$ of $B_{N_V,N_H}(q_V,q_H)$ constitute an orthonormal basis of the vector space $\mathbb{C}^{2N_VN_H}$. Such a column $b_i$ is henceforth denoted a single-polarized beam (SP-beam) as it is constructed by a beam d transmitted on a single polarization (i.e. b=

$$\begin{bmatrix} d \\ 0 \end{bmatrix} \text{ or } b = \begin{bmatrix} 0 \\ d \end{bmatrix}).$$

We also introduce the notation dual-polarized beam to refer to a beam transmitted on both polarizations (which are combined with a polarization cophasing factor $e^{j\alpha}$, i.e.

$$b_{DP} = \begin{bmatrix} d \\ e^{j\alpha}d \end{bmatrix}).$$

Utilizing the assumption that the channel is somewhat sparse, one can capture sufficiently much of the channel energy by only selecting a column subset of $B_{N_V,N_H}(q_V,q_H)$. That is, it is sufficient to describe a couple of the SP-beams, which keeps down the feedback overhead. So, select a column subset $I_S$ consisting of $N_{SP}$ columns of $B_{N_V,N_H}(q_V,q_H)$, to create a reduced beam space transformation matrix $B_{I_S} = [b_{I_S(1)}\ b_{I_S(2)}\ \ldots\ b_{I_S(N_{SP})}]$. E.g., select column number $I_S = [1\ 5\ 10\ 25]$ to create the reduced beam space transformation matrix $B_{I_S} = [b_1\ b_5\ b_{10}\ b_{25}]$.

A general precoder structure for precoding of a single layer is:

$$w = B_{I_S}\begin{bmatrix} c_1 \\ c_2 \\ \vdots \\ c_{N_{SP}} \end{bmatrix} = [b_{I_S(1)}\ b_{I_S(2)}\ \cdots\ b_{I_S(N_{SP})}]\begin{bmatrix} c_1 \\ c_2 \\ \vdots \\ c_{N_{SP}} \end{bmatrix} = \sum_{i=1}^{N_{SP}} c_i b_{I_S(i)}.$$

Where $\{c_i\}_{i=1}^{N_{SP}}$ are complex beam cophasing coefficients.

The precoder w in the equation above can be described as a linear combination of beams constructed by cophasing a $k^{th}$ beam $b_k$ with cophasing coefficient $c_k$, that is, $w = \sum_{k=1}^{K} c_k b_k$. Such a beam cophasing coefficient is a complex scalar that adjusts at least the phase of a beam relative to other beams according to $c_k b_k$. When a beam cophasing coefficient only adjusts relative phase, it is a unit magnitude complex number. It is in general desirable to also adjust the relative gain of beams, in which case the beam cophasing coefficient is not unit magnitude.

A more refined multi-beam precoder structure is achieved by separating the complex coefficients in a power (or amplitude) and a phase part as $$w = B_{I_S}\begin{bmatrix} c_1 \\ c_2 \\ \vdots \\ c_{N_{SP}} \end{bmatrix} = B_{I_S}\begin{bmatrix} \sqrt{p_1}\,e^{j\alpha_1} \\ \sqrt{p_2}\,e^{j\alpha_2} \\ \vdots \\ \sqrt{p_{N_{SP}}}\,e^{j\alpha_{N_{SP}}} \end{bmatrix} =$$

$$B_{I_S}\begin{bmatrix} \sqrt{p_1} & 0 & & \ddots \\ 0 & \sqrt{p_2} & & \\ & & \ddots & 0 \\ \ddots & & 0 & \sqrt{p_{N_{SP}}} \end{bmatrix}\begin{bmatrix} e^{j\alpha_1} \\ e^{j\alpha_2} \\ \vdots \\ e^{j\alpha_{N_{SP}}} \end{bmatrix} = B_{I_S}\sqrt{P}\begin{bmatrix} e^{j\alpha_1} \\ e^{j\alpha_2} \\ \vdots \\ e^{j\alpha_{N_{SP}}} \end{bmatrix}$$

As multiplying the precoder vector w with a complex constant C does not change its beamforming properties (as only the phase and amplitude relative to the other single-polarized beams is of importance), one may without loss of generality assume that the coefficients corresponding to e.g. SP-beam 1 is fixed to $p_1 = 1$ and $e^{j\alpha_1} = 1$, so that parameters for one less beam need to be signaled from the wireless device to the base station. Furthermore, the precoder may be further assumed to be multiplied with a normalization factor, so that e.g. a sum power constraint is fulfilled, i.e. that $\|w\|^2 = 1$. Any such normalization factor is omitted from the equations herein for clarity.

In some cases, the possible choices of columns of $B_{N_V,N_H}(q_V,q_H)$ are restricted so that if column $i = i_0$ is chosen, so is column $i = i_0 + N_V N_H$. That is, if an SP-beam corresponding to a certain beam mapped to the first polarization is chosen, e.g.

$$b_{i_0} = \begin{bmatrix} d_{i_0} \\ 0 \end{bmatrix},$$

this would imply that the SP-beam $$b_{i_0+N_VN_H} = \begin{bmatrix} 0 \\ d_{i_0} \end{bmatrix}$$

is chosen as well. That is, the SP-beam corresponding to the said certain beam mapped to the second polarization is chosen as well. This would reduce the feedback overhead as only $N_{DP}=N_{SP}/2$ columns of $B_{N_V,N_H}(q_V,q_H)$ would have to be selected and signaled back to the base station. In other words, the column selection is done on a beam (or DP-beam) level rather than an SP-beam level. If a certain beam is strong on one of the polarizations it would typically imply that the beam would be strong on the other polarization as well, at least in a wideband sense, so the loss of restricting the column selection in this way would not significantly decrease the performance. In the following discussion, the use of DP-beams is generally assumed (unless stated otherwise).

In some cases, the multi-beam precoder is factorized into two or more factors that are selected with different frequency-granularity, in order to reduce the feedback overhead. In such cases, the SP-beam selection (i.e. the choice of matrix $B_{I_S}$) and the relative SP-beam powers/amplitudes (i.e. the choice of matrix $\sqrt{P}$) is selected with a certain frequency-granularity while the SP-beam phases (i.e., the choice of matrix $$\begin{bmatrix} e^{j\alpha_1} \\ e^{j\alpha_2} \\ \vdots \\ e^{j\alpha_{N_{SP}}} \end{bmatrix}$$

is selected with another certain frequency-granularity. In one such case, the said certain frequency-granularity corresponds to a wideband selection (that is, one selection for the entire bandwidth) while the said another certain frequency-granularity corresponds to a per-subband selection (that is, the carrier bandwidth is split into a number of subbands, typically consisting of 1-10 physical resource blocks (PRBs), and a separate selection is done for each subband).

In a typical such case, the multi-beam precoder vector is factorized as $w=W_1W_2$, where $W_1$ is selected with a certain frequency-granularity and $W_2$ is selected another certain frequency-granularity. The precoder vector may then be expressed as $$w = \underbrace{B_{I_S}\sqrt{P}}_{=W_1} \underbrace{\begin{bmatrix} e^{j\alpha_1} \\ e^{j\alpha_2} \\ \vdots \\ e^{j\alpha_{N_{SP}}} \end{bmatrix}}_{=W_2} = W_1 W_2.$$

Using this notation, if the certain frequency-granularity corresponds to a wideband selection of $W_1$ and the other certain frequency-granularity corresponds to a per-subband selection of $W_2$, the precoder vector for subband l may be expressed as $w_l=W_1W_2(l)$. That is, only $W_2$ is a function of the subband index l.

What needs to be fed back by the wireless device to the eNodeB is thus:

the chosen columns of $B_{N_V,N_H}(q_V,q_H)$, i.e. the $N_{SP}$ single-polarized beams. This requires at most $N_{SP}\cdot\log_2(2N_VN_H)$ bits.

The vertical and horizontal DFT basis rotation factors $q_V$ and $q_H$. For instance, the $$q(i) = \frac{i}{Q},$$

i=0, 1, . . . , Q−1, for some value of Q. The corresponding overhead would then be $2\cdot\log_2 Q$ bits.

The (relative) power levels $\{p_2, p_3, \ldots, p_{N_{SP}}\}$ of the SP-beams. If L is the number of possible discrete power levels, $(N_{SP}-1)\cdot\log_2 L$ is needed to feed back the SP-beam power levels.

The cophasing factors $$\{e^{j\alpha_2}, e^{j\alpha_3}, \ldots, e^{j\alpha_{N_{SP}}}\}$$

of the SP-beams. For instance, $\alpha(k)=$ $$\alpha(k) = \frac{2\pi k}{K},$$

k=0, 1, . . . K−1, for some value of K. The corresponding overhead would be, $(2N_{DP}-1) \log_2 K$ bits per rank per $W_2(l)$ report.

Consider an example codebook with $N_{DP}=3$ dual polarized beams, $N_V=4$ and $N_H=4$ vertical and horizontal elements, an oversampling factor Q=4 for both vertical and horizontal directions, L=4 possible beam power levels, K=8 possible cophasing factors per subband, and $N_{sub}=9$ subbands in a 10 MHz carrier bandwidth. Furthermore, the beam index, rotation, and relative powers may be reported once (i.e., a wideband report), when they identify $W_1$. On the other hand, the cophasing factors identify $W_2(l)$ and are reported once per subband. This means that a total of $N_{sub}(2N_{DP}-1)\cdot\log_2 K$ bits are needed for the cophasing factors.

Then the number of bits to report the following components of the CSI are:

For $W_1$: a total of 20 bits is needed:
beam index: $3\cdot\log_2(4\cdot4)=12$
beam rotation: $2\cdot\log_2(4)=4$
beam relative power: $(3-1)\cdot\log_2(4)=4$ For $W_2$: cophasing: $9\cdot(2\cdot3-1)\cdot\log_2(8)=135$ bits are needed It can be observed that the vast majority of CSI feedback (87% in this example) is for cophasing information. Furthermore, a total of 155 bits are needed for a single cell. If the wireless device is configured for downlink carrier aggregation with, for example, 5 cells, then 5*155=775 bits are needed.

SUMMARY

Some embodiments, include a method in a wireless device of reporting multi-beam channel state information, CSI, in uplink control information, UCI. The method includes providing an indication of a plurality of beam index pairs, $(l_k, m_k)$, in the UCI in a first transmission, each beam index pair corresponding to a beam k. The method includes providing an indication of at least one of a beam power, a beam rotation and a channel quality index, CQI, in the UCI in a second transmission.

In some embodiments, a beam power $p_k$ of a beam k is a real number such that a cophasing factor $c_k$ can be expressed $c_k=c'_k p_k$, where $|c_k'|^2=1$ and beam rotations $r_1$ and $r_2$ are real numbers such that beam directions for beam k, $\Delta_{1,k}$ and $\Delta_{2,k}$ can be expressed as $\Delta_{1,k}=\Delta'_{1,k}+r_1$ and $\Delta'_{2,k}=\Delta'_{2,k}+r_2$. In some embodiments, a method further includes generating a first periodicity CSI report corresponding to a plurality of beams and identifying a plurality of beam cophasing factors, and transmitting the beam cophasing factors on an uplink transport channel, the uplink transport channel being produced using a medium access control, MAC, protocol. In some embodiments, the method may further include: receiving signaling identifying a periodicity $N_{pd}$ with which a plurality of CSI reports should be transmitted; determining at least a second periodicity $H' \cdot N_{pd}$, where H' is an integer greater than zero; transmitting a CQI report of a plurality of CQI reports in UCI in a subframe occurring once every $N_{pd}$ subframes unless a second periodicity CSI report is to be transmitted, wherein the second periodicity CSI report includes at least one of the beam index i, the beam power, and the beam rotation, in UCI in in a subframe occurring once every $H' \cdot N_{pd}$ subframes, wherein: a beam power $p_i$ for a beam with index i is a real number such that cophasing factor $c_i$ can be expressed $c_i=c'_i p_i$, where $|c_i'|^2=1$, and a beam rotation $r_1$ or $r_2$ is a real number such that beam directions $\Delta_1$ and $\Delta_2$ can be expressed $\Delta_1=\Delta'_1+r_1$ and $\Delta_2=\Delta'_2+r_2$; and if the second periodicity CSI report is to be transmitted, transmitting the second periodicity CSI report once every $H' \cdot N_{pd}$ subframes.

In some embodiments, each beam is a $k^{th}$ beam, d(k), that comprises a set of complex numbers and has index pair ($l_k$, $m_k$), each element of the set of complex numbers being characterized by at least one complex phase shift such that:
$d_n(k)=d_i(k)\alpha_{i,n} e^{j2\pi(p\Delta_{1,k}+q\Delta_{2,k})}$;
$d_n(k)$, and $d_i(k)$ are the $i^{th}$ and $n^{th}$ elements of d(k), respectively;
$\alpha_{i,n}$ is a real number corresponding to the $i^{th}$ and $n^{th}$ elements of d(k);
p and q are integers; and
beam directions $\Delta_{1,k}$ and $\Delta_{2,k}$ are real numbers corresponding to beams with index pair ($l_k$, $m_k$) that determine the complex phase shifts $e^{j2\pi\Delta_{1,k}}$ and $e^{j2\pi\Delta_{2,k}}$ respectively; and each beam cophasing coefficient is a complex number $c_k$ for d(k) that is used to adjust the phase of the $i^{th}$ element of d(k) according to $c_k d_i(k)$.

In some embodiments, the method further includes generating a third periodicity CSI report corresponding to a first subframe, the CSI report including indications of at least one of a recommended precoder, a channel quality indicator (CQI), a rank indicator (RI), and a CSI-RS resource indicator (CRI). In some embodiments, the method further includes determining a second subframe in which the wireless device may transmit the CSI report; if the wireless device receives a grant allowing it to transmit in the second subframe, transmitting the CSI report in an uplink transport channel in the second subframe; and otherwise, transmitting the CSI report in the uplink transport channel in a third subframe after the second subframe, wherein the wireless device receives a grant allowing it to transmit in the third subframe.

In some embodiments, the method may further comprise calculating a channel quality metric in a first subframe; generating a CSI report corresponding to the first subframe; and if the channel quality metric meets a reporting criterion, transmitting the CSI report in an uplink transport channel in a second subframe, the second subframe being after the first subframe.

In some embodiments, a method may further include successfully decoding one of a downlink control channel and downlink shared transport channel (DL-SCH) in a first subframe, where one of downlink channel information, DCI, in the downlink control channel and the DL-SCH indicate that the wireless device should report CSI.

In some embodiments, a wireless device for reporting multi-beam channel state information, CSI, in uplink control information, UCI, is provided. The wireless device includes processing circuitry configured to: provide an indication of a plurality of beam index pairs, ($l_k$, $m_k$), in the UCI in a first transmission, each beam index pair corresponding to a beam k; and provide an indication of at least one of a beam power, a beam rotation and a channel quality index, CQI, in the UCI in a second transmission. The wireless device also includes a transceiver configured to transmit the first and second transmission.

In some embodiments, a beam power $p_k$ of a beam k is a real number such that a cophasing factor $c_k$ can be expressed $c_k=c'_k p_k$, where $|c_k'|^2=1$, and beam rotations $r_1$ and $r_2$ are real numbers such that beam directions for beam k, $\Delta_{1,k}$ and $\Delta_{2,k}$ can be expressed as $\Delta_{1,k}=\Delta'_{1,k}+r_1$ and $\Delta_{2,k}=\Delta'_{2,k}+r_2$.

In some embodiments, the wireless device includes processing circuitry configured to generate a CSI report corresponding to a plurality of beams and identifying a plurality of beam cophasing factors, and further includes a transmitter configured to transmit the beam cophasing factors on an uplink transport channel, the uplink transport channel being produced using a medium access control, MAC, protocol.

In some embodiments, each beam is a $k^{th}$ beam, d(k), that comprises a set of complex numbers and has index pair ($l_k$, $m_k$), each element of the set of complex numbers being characterized by at least one complex phase shift such that:
$d_n(k)=d_i(k)\alpha_{i,n} e^{j2\pi(p\Delta_{1,k}+q\Delta_{2,k})}$;
$d_n(k)$, and $d_i(k)$ are $i^{th}$ and $n^{th}$ elements of d(k), respectively;
$\alpha_{i,n}$ is a real number corresponding to the $i^{th}$ and $n^{th}$ elements of d(k);
p and q are integers; and
beam directions $\Delta_{1,k}$ and $\Delta_{2,k}$ are real numbers corresponding to beams with index pair ($l_k$, $m_k$) that determine the complex phase shifts $e^{j2\pi\Delta_{1,k}}$ and $e^{j2\pi\Delta_{2,k}}$ respectively; and
each beam cophasing coefficient is a complex number $c_k$ for d(k) that is used to adjust the phase of the $i^{th}$ element of d(k) according to $c_k d_i(k)$.

In some embodiments, the transceiver is further configured to receive signaling identifying a periodicity $N_{pd}$ with which a plurality of CSI reports should be transmitted; transmit a CQI report of a plurality of CQI reports in UCI in a subframe occurring once every $N_{pd}$ subframes unless a second periodicity CSI report is to be transmitted, wherein the second periodicity CSI report includes at least one of the beam index i, the beam power, and the beam rotation, in UCI in in a subframe occurring once every $H' \cdot N_{pd}$ subframes, wherein: a beam power $p_i$ for a beam with index i is a real number such that cophasing factor $c_i$ can be expressed $c_i=c'_i p_i$, where $|c_i'|^2=1$, and a beam rotation $r_1$ or $r_2$ is a real number such that beam directions $\Delta_1$ and $\Delta_2$ can be expressed $\Delta_1=\Delta'_1+r_1$ and $\Delta_2=\Delta'_2+r_2$; and if the second periodicity CSI report is to be transmitted, transmit the second CSI report once every $H' \cdot N_{pd}$ subframes.

In some embodiments, the processing circuitry is further configured to generate a CSI report corresponding to a first subframe, the CSI report including indications of at least one of a recommended precoder, a channel quality indicator (CQI), a rank indicator (RI), and a CSI-RS resource indicator (CRI). In some embodiments, the processing circuitry is further configured to: determine a second subframe in which the wireless device may transmit the CSI report; and the transceiver configured to: if the wireless device receives a grant allowing it to transmit in the second subframe, transmit the CSI report in an uplink transport channel in the second subframe; and otherwise, transmit the CSI report in the uplink transport channel in a third subframe after the second subframe, wherein the wireless device receives a grant allowing it to transmit in the third subframe.

In some embodiments, the processor circuitry is further configured to: calculate a channel quality metric in a first subframe, and generate a CSI report corresponding to the first subframe. In some embodiments, the wireless device includes a transceiver further configured to, if the channel quality metric meets a reporting criterion, transmit the CSI report in an uplink transport channel in a second subframe, the second subframe being after the first subframe.

In some embodiments, the processing circuitry is further configured to decode one of a downlink control channel and downlink shared transport channel, DL-SCH, in a first subframe, where one of downlink control information, DCI, in the downlink control channel and the DL-SCH indicate that the wireless device should report CSI.

In some embodiments, a wireless device for reporting multi-beam channel state information, CSI, in uplink control information, UCI, is provided. The wireless device includes a beam index pair indicator module configured to provide an indication of a plurality of beam index pairs, $(l_k, m_k)$, in the UCI in a first transmission, each beam index pair corresponding to a beam k; and a beam parameter indicator module configured to provide an indication of at least one of a beam power, a beam rotation and a channel quality index in the UCI in a second transmission.

In some embodiments, a beam power $p_k$ of a beam k is a real number such that a cophasing factor $c_k$ can be expressed $c_k = c'_k p_k$, where $|c_k'|^2 = 1$, and beam rotations $r_1$ and $r_2$ are real numbers such that beam directions for beam k, $\Delta_{1,k}$ and $\Delta_{2,k}$ can be expressed as $\Delta_{1,k} = \Delta'_{1,k} + r_1$ and $\Delta_{2,k} = \Delta'_{2,k} + r_2$.

In some embodiment, a method performed in a network node of obtaining multi-beam channel state information, CSI, in uplink control information, UCI. The method includes instructing a wireless device to calculate and transmit channel state information, CSI, reports. The method includes receiving an indication of a plurality of beam index pairs, $(l_k, m_k)$, in the UCI in a first transmission, each beam index pair corresponding to a beam k; and receiving an indication of at least one of a beam power, a beam rotation and a channel quality index, CQI, in the UCI in a second transmission.

In some embodiments, a network node includes processing circuitry configured to: instruct a wireless device to calculate and transmit channel station information, reports; receive an indication of a plurality of beam index pairs, $(l_k, m_k)$, in the UCI in a first transmission, each beam index pair corresponding to a beam k; and receive an indication of at least one of a beam power, a beam rotation and a channel quality index, CQI, in the UCI in a second transmission.

In some embodiments, a network node includes a CSI instruction module configured to generate an instruction to instruct a wireless device to calculate CSI reports, and a transceiver module configured to receive, an indication of a plurality of beam index pairs, $(l_k, m_k)$, in the UCI in a first transmission, each beam index pair corresponding to a beam k; and an indication of at least one of a beam power, a beam rotation and a channel quality index, CQI, in the UCI in a second transmission.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
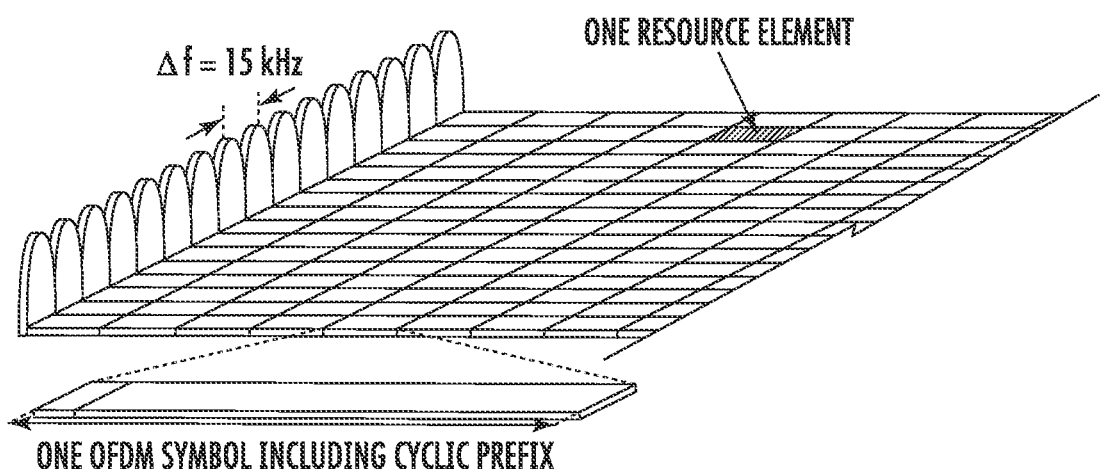
FIG. 1 is a time-frequency grid showing a resource element.
Figure 2:
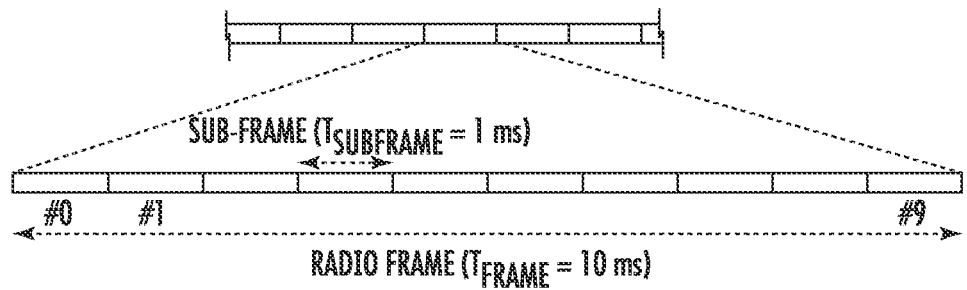
FIG. 2 is a radio frame.
Figure 3:
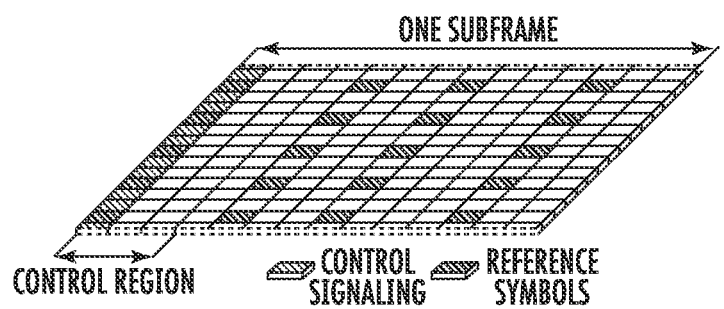
FIG. 3 is a time-frequency grid showing a control region and reference symbols.
Figure 4:
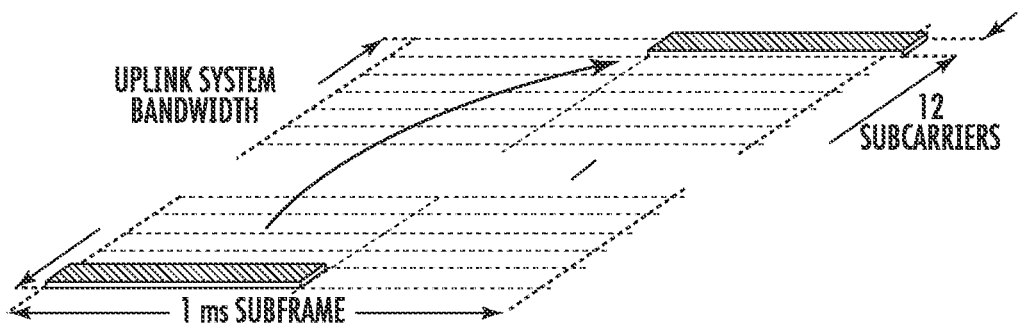
FIG. 4 is a time-frequency grid showing resource blocks assigned for uplink control on the PUCCH.
Figure 5:
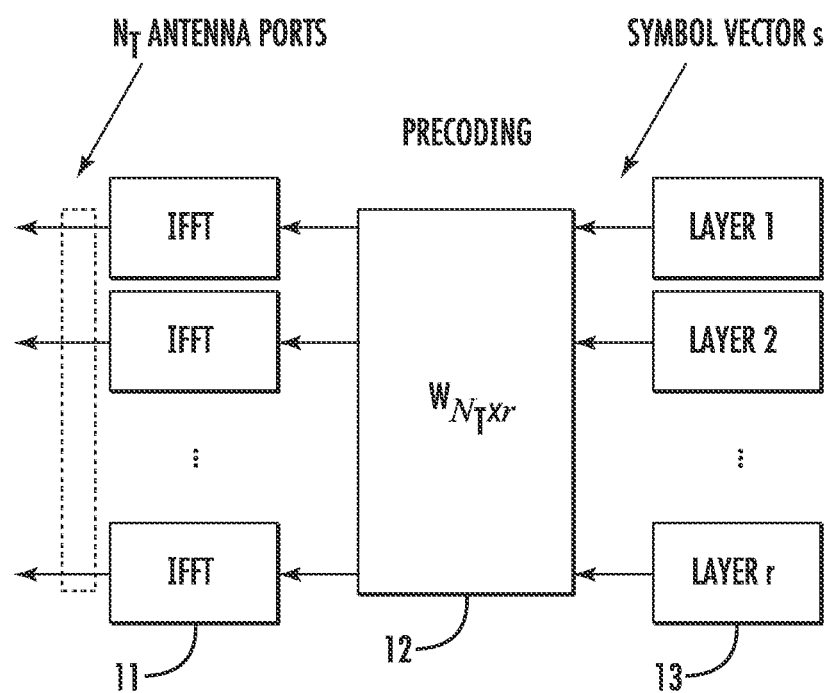
FIG. 5 is a block diagram of a spatial multiplexing operation.
Figure 6:
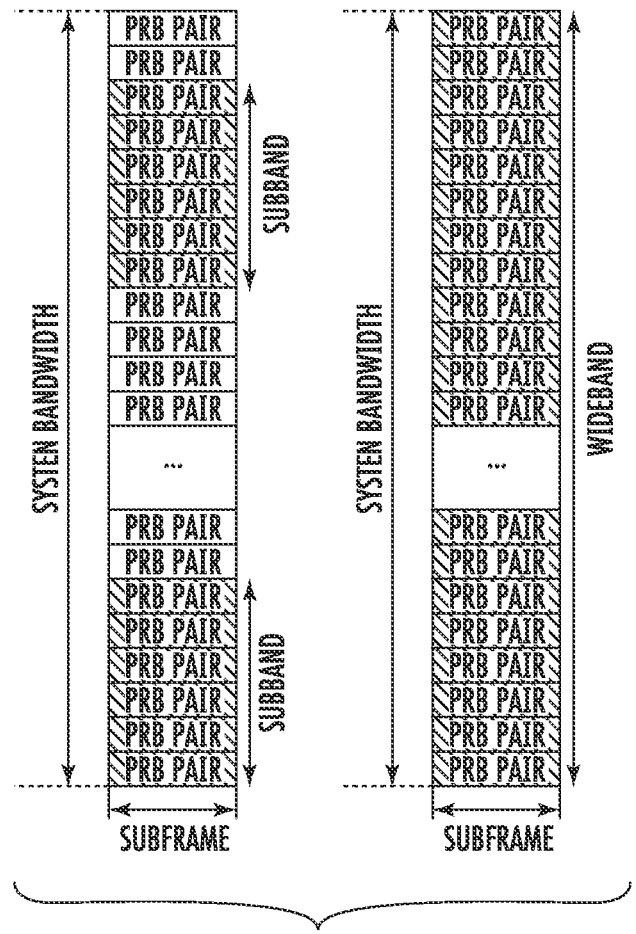
FIG. 6 is a diagram of allocation of system bandwidth for subband and wide band configurations.
Figure 7:
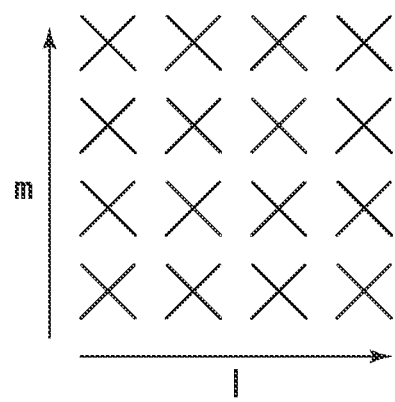
FIG. 7 is a 4×4 antenna array.
Figure 8:
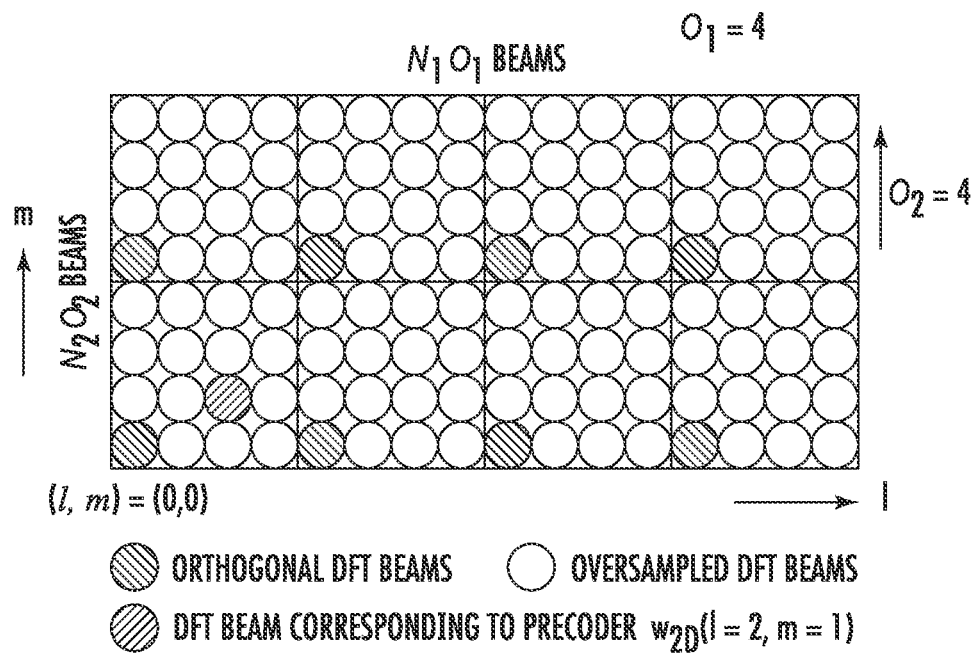
FIG. 8 is a grid of DFT beams.
Figure 9:
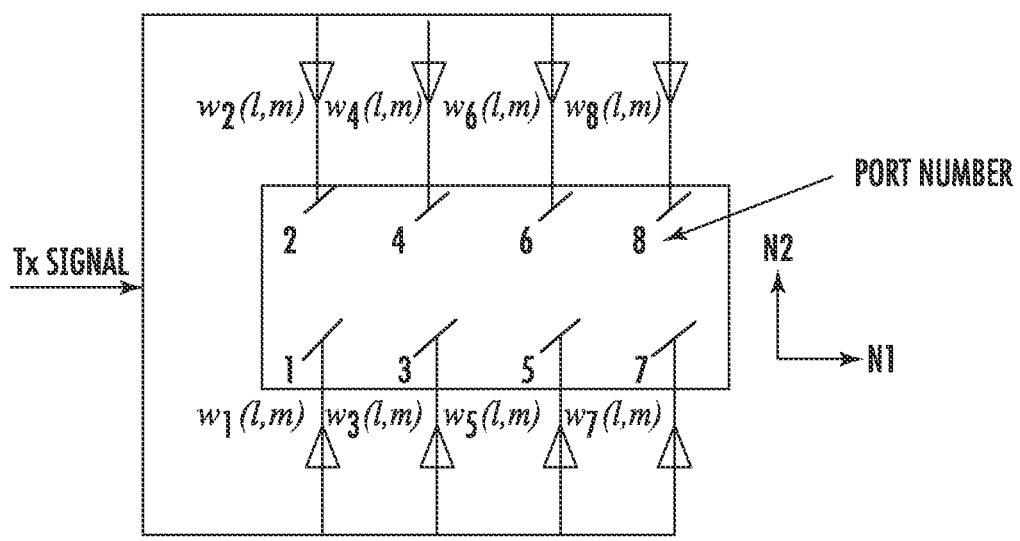
FIG. 9 are antenna port mappings for a single polarization 2D antenna.

Note that although terminology from the third generation partnership project, (3GPP) long term evolution (LTE) is used in this disclosure as an example, this should not be seen as limiting the scope of the disclosure to only the aforementioned system. Other wireless systems, including NR (i.e., 5G), wideband code division multiple access (WCDMA), WiMax, ultra mobile broadband (UMB) and global system for mobile communications (GSM), may also benefit from exploiting the concepts and methods covered within this disclosure.

Also note that terminology such as eNodeB and wireless device should be considered non-limiting and does in particular not imply a certain hierarchical relation between the two; in general, "eNodeB" could be considered as device 1 and "wireless device" device 2, and these two devices communicate with each other over some radio channel. Also, while some of the principles of the disclosure focus on wireless transmissions in the downlink/uplink, they may be equally applicable in the uplink/downlink.

The term wireless device used herein may refer to any type of wireless device communicating with a network node and/or with another wireless device in a cellular or mobile communication system. Examples of a wireless device are user equipment (UE), target device, device to device (D2D) wireless device, machine type wireless device or wireless device capable of machine to machine (M2M) communication, PDA, iPAD, Tablet, mobile terminals, smart phone, laptop embedded equipped (LEE), laptop mounted equipment (LME), USB dongles etc.

The term "network node" used herein may refer to a radio network node or another network node, e.g., a core network node, MSC, MME, O&M, OSS, SON, positioning node (e.g. E-SMLC), MDT node, etc.

The term "radio network node" or "network node" used herein can be any kind of network node comprised in a radio network which may further comprise any of base station (BS), radio base station, base transceiver station (BTS), base station controller (BSC), radio network controller (RNC), evolved Node B (eNB or eNodeB), Node B, multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS), etc.

Note further that functions described herein as being performed by a wireless device or a network node may be distributed over a plurality of wireless devices and/or network nodes.

Before describing in detail exemplary embodiments, it is noted that the embodiments reside primarily in combinations of apparatus components and processing steps related to L1 and L2 CSI reporting mechanisms. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

In some embodiments, the CSI report is carried on UL-SCH (in a MAC control element or RRC), allowing more efficient transmission than Rel-13 physical layer control signaling could. The CSI report on UL-SCH may be transmitted in a near-periodic manner, when triggered via DL-SCH or DCI, or when wireless device measurements trigger the report.

Because it requires on the order of 10s of bits, the beam direction (and other wideband CSI including a CQI) may be transmitted in UCI. If the UCI is transmitted periodically, the timing for the multi-beam CSI is derived from the CQI report timing.

The beam direction information in UCI can be used to identify beams to use in beamformed CSI-RS for a wireless device, select wireless devices for MU-MIMO pairing, or to identify precoding to apply to EPDCCH. The cophasing information in the report in UL-SCH provides more detailed channel state information that can be used to reduce mutual interference among coscheduled MU-MIMO wireless devices. Such detailed information is not always needed, and so the report on UL-SCH can be provided when requested by the network node.

The report on UCI is compact, and so it may be frequently transmitted without much overhead and can be used to efficiently decide which wireless devices to schedule. Consequently, the report on UCI can also contain SINR related information such as a CQI and/or an indication of the relative power among the beams. The network can then compare channel quality among different wireless devices as part of its scheduling decisions, and determine low resolution precoding from the other information in the first report to serve the selected wireless device(s). Additionally, the network can use the report on UCI containing SINR information to decide when to request the second report from the wireless device(s).

As observed above, CSI for feedback for the beam index, beam shift, and relative beam power ('$W_1$') components in the disclosed multibeam codebook is relatively compact, requiring on the order of tens of bits. On the other hand, CSI for feedback for beam and polarization cophasing ('$W_2$') is substantial, needing hundreds of bits. The compact size of the $W_1$ reports makes it feasible to carry them in current (Rel-13) LTE PUCCH or PUSCH. However, the $W_2$ reports are too large to be well suited to current PUCCH or PUSCH transmission. For PUCCH, only PUCCH formats 4 or 5 can support such large payload sizes, and these would not be efficient, since periodic transmission does not support link adaptation, and also because turbo coding is not supported. For PUSCH, turbo coding of CSI is also not supported, and while link adaptation is possible in some cases, the payload size is known beforehand to the network node, e.g., eNodeB, and wireless device, precluding the ability to reduce overhead when the wireless device identifies that less overhead is needed.

A second observation is that $W_1$ and $W_2$ information can be used independently. $W_1$ identifies long term and wide band information, and so is suitable for identifying beams to use in beamformed CSI-RS for a wireless device, select wireless devices for MU-MIMO pairing, or to identify precoding to apply to EPDCCH. On the other hand, $W_2$ identifies short term and narrow band information, and so is used to provide extra channel state information needed for high resolution beamforming and to reduce mutual interference among coscheduled MU-MIMO. Such detailed information is not always needed.

Because $W_1$ information is compact, it may be frequently transmitted without much overhead, and can be used to efficiently decide which wireless devices to schedule. Consequently, a report containing $W_1$ information can also contain SINR related information such as a CQI and/or an indication of the relative power among the beams. The network can then compare channel quality among different wireless devices as part of its scheduling decisions, and determine low resolution precoding from the other information in the first report to serve the selected wireless device(s). Furthermore, using the $W_1$ information for scheduling decisions rather than both $W_1$ and $W_2$ can simplify network node implementation significantly. Additionally, the network can use a first report containing $W_1$ and SINR information to decide when to request a second report containing $W_2$ from the wireless device(s).

These two sets of observations motivate a two part CSI reporting structure, where $W_2$ is reported on an as-needed basis in higher layers, and $W_1$ is reported using existing PUCCH and PUSCH mechanisms. The use of higher layer reporting for $W_2$ allows full link adaptation, variable payload sizes, and automatically supports turbo coding. In the following, we describe the reporting mechanisms in more detail. We also consider a special case where a compact wideband $W_2$ report is reported in UCI.

While embodiments are generally described using dual polarized beams and a number of dual polarized beams $N_{DP}$, many aspects of the embodiments do not require the use of dual polarized beams, and single polarized beams (characterized by a number of single polarized beams $N_{SP}$) may instead be used.

$W_2$ can require large CSI reporting payloads because it is reported per subband, per beam, as well as per polarization, as described above. In some cases, it may be desirable to report lower resolution CSI, such as when the channel is sufficiently flat in frequency so that wideband CSI reporting is sufficient. In this case, a single wideband polarization cophasing factor is reported, i.e., only one value of $e^{j\alpha}$ with $$b_{DP} = \begin{bmatrix} d \\ e^{j\alpha}d \end{bmatrix}$$

using the notation for multi-beam CSI provided in the background section above. The polarization cophasing factor corresponds to the beam with greatest power. Values of $e^{j\alpha} \in \{1, j, -1, -j\}$ should be sufficient for wideband reporting, and so a two bit indication of wideband $W_2$ per multi-beam CSI report can be suitable.

Aperiodic CSI reports in UCI are triggered by DCI in uplink grants in Rel-13. For consistency with this Rel-13 mechanism, it can be beneficial to also trigger aperiodic CSI reports carried by higher layers using DCI. One way to do this would be to trigger a $W_2$ report whenever a $W_1$ report is triggered. Additionally, in some embodiments, it is desirable to be able to trigger these two report types independently in order to avoid excessive overhead. Therefore, another approach would be to add additional triggering states to DCI to allow $W_2$ to be triggered independently of $W_1$. This requires extra overhead in DCI, but has the benefit that a PDSCH transmission is not needed to trigger the CSI report, and so DCI carried in a UL grant is sufficient in this case. Another motivation for higher layer triggering of aperiodic CSI reports carried by is that DCI based signaling triggering mixes higher layer signaling with physical layer signaling.

Given the above observations, in an embodiment, a wireless device reports CSI comprising at least beam cophasing information in a MAC PDU carried within UL-SCH. The CSI report may additionally contain multi-beam $W_1$ information, comprising at least a beam index. Furthermore, the CSI report may also include CQI, Rel-13 PMI, RI, and/or CRI.

CSI reporting such as for PMI, CQI, RI, or CRI is not carried on higher layers in Rel-13 LTE. Therefore, no timing mechanism exists in Rel-13 to tie a CSI report carried on UL-SCH to the time at which the CSI is measured. CSI reporting in Rel-13 defines the timing via a reference resource (defined in section 7.2.3 of 3GPP TS 36.213). These are defined in different ways in the following, according to the mechanism used for the CSI reporting.

The wireless device reports periodically, when triggered by a request from the network e.g., from a network node, or when a measurement meets a predetermined criterion. The network trigger identifies at least a set of CSI-RS ports to which the CSI report should correspond. Similarly, a periodic report or a report triggered by a measurement corresponds to a predetermined set of CSI-RS ports. Periodic reporting, network based, and measurement based triggering is described in more detail in the following.

Periodic CSI reporting can be a MAC or RRC procedure where the wireless device calculates CSI for reference resources occupying particular subframes. In this case, the subframes containing the reference resources can be specified to be the same as those for which a CQI report is calculated. If Rel-13 CQI report timing is used, then the reference resource is defined by a subframe $n - n_{CQI\_ref}$.

Where

Subframe n corresponds to when $(10 \times n_f + \lfloor n_s/2 \rfloor - N_{OFFSET,CQI}) \bmod (N_{pd}) = 0$ $n_{CQI\_ref}$ is a non-negative integer, for example 4 or 5

$n_f$, $n_s$, $N_{pd}$, and $N_{OFFSET,CQI}$ are as defined with respect to Table 1 (and as also defined in 3GPP TS 36.213 and 36.331).

Although the reference resource timing may be set according to Rel-13 periodic CQI report timing, the subframe in which the CSI-report is transmitted on UL-SCH may not be the same as the CQI report timing. A wireless device needs a grant to transmit on UL-SCH, and the wireless device may not have one in subframe n. Therefore, the wireless device will report the CSI in subframe n or later, when the wireless device receives the uplink grant. If the wireless device does not receive an UL grant prior to a CSI-RS subframe configured for calculating a new CSI report for the same CSI process, the wireless device discards the old CSI, and reports the new CSI.

In an embodiment, the network trigger may be carried within a DL-SCH using a MAC CE or an RRC message. A Rel-13 wireless device can be configured with multiple CSI-RS resources and/or CSI processes, where the CSI-RS resource or process configurations identify a number of CSI-RS ports, as well as the subframes and resource elements where the CSI-RS occur. In such cases, it may be necessary to at least indicate which CSI-RS resource or process is to be reported on. Therefore, the network trigger may contain a CSI-RS resource identifier from 3GPP TS 36.331 such as csi-RS-ConfigNZPIdListExt-r13, a CSI process identifier such as CSI-ProcessId-r11, or newly defined similar identifiers. Furthermore, the trigger can contain one or more additional parameters such as one that identifies a number of beams $N_{DP}$ or $N_{SP}$, oversampling factors $Q_H$ or $Q_V$, subbands for which $W_2$ is to be reported, or a rank with which to report CSI. The size of the report may vary according to such additional parameters, thereby enabling the network to control the overhead of the CSI reports.

When the wireless device successfully decodes a CSI report trigger on DL-SCH in subframe n, it may transmit the CSI report in subframe n+k, where k is a non-negative integer used to allow enough time to process CSI and transmit the CSI report on UL-SCH, for example k=4 subframes. The wireless device will transmit the CSI report in subframe n+k if it has a grant for UL-SCH in subframe n+k. Otherwise, it will report the CSI on UL-SCH in the earliest subframe after n+k for which it has a grant for UL-SCH. If the grant for UL-SCH arrives after a new CSI trigger on DL-SCH, the old CSI report is discarded and a new one is calculated based on the subframe in which the new trigger is successfully decoded.

The reference resource for the CSI report whose trigger on DL-SCH is successfully decoded in subframe n is defined as the subframe, $n+k-n_{CQI\_ref}'$, where k is the above minimum delay until a report can be transmitted on UL-SCH, and $n'_{CQI\_ref}$ is a non-negative integer, for example 4 or 5. In some embodiments $n'_{CQI\_ref} = n_{CQI\_ref}$. In another embodiment, the subframe information of the reference resource may be included in the CSI report so that when the CSI report is received, the network knows which subframe the CSI is valid for.

If multi-beam $W_1$ and $W_2$ information is not reported together in one report, then it may be necessary to determine to which prior $W_1$ report the $W_2$ report is associated. In one approach, the most recent $W_1$ report is associated with the triggered $W_2$ report. In another approach, the trigger includes an identifier of the prior $W_1$ report.

When the trigger is carried in DL-SCH, the overhead from the trigger can be much larger than when it is carried in DCI. Therefore, if frequent triggering is needed, it may be desirable to carry the network trigger within the DCI of a UL grant on EPDCCH or PDCCH. In this case, it is desirable to use a limited amount of triggering information in order to limit the overhead on EPDCCH or PDCCH. Rel-13 CSI request bits in DCI formats 0 and 4 consist of 1, 2, or 3 bits and identify cells, CSI subframe set pairs, and/or CSI process(es) for which to provide a CSI report, as discussed in 3GPP TS 36.212 revision 13.2.0, section 5.3.3.1, and 3GPP TS 36.213 revision 13.2.0, section 7.2.1. Therefore, in an embodiment, a value of a CSI request field indicates that a CSI report for a CSI process should be transmitted on UL-SCH. The CSI report may contain both $W_1$ and $W_2$ information, as well as CQI, RI, other PMI, and CRI, as described above.

When the wireless device successfully decodes a CSI report trigger in DCI of a UL grant in subframe n, the wireless device will transmit the CSI report in subframe n+k, where k is a non-negative integer equal to the delay between a UL grant and transmission of PUSCH. As above, k is used to allow enough time to process CSI and transmit the CSI report on UL-SCH, and may be for example k=4 subframes. This behavior is different from the case where a higher layer trigger on DL-SCH is used, because here a UL grant carries the trigger, allowing more precise CSI reporting timing. Furthermore, there is no need to discard CSI in some embodiments, since the report is transmitted at a known time, and the network node, e.g., eNodeB, should not trigger a new CSI report for a CSI process while the wireless device is processing the CSI report for the same CSI process.

In another embodiment, the CSI report is triggered in DCI of a UL grant. The reference resource for the CSI report whose trigger in DCI of a UL grant is successfully decoded in subframe n is defined as the subframe, $n+k-n_{CQI\_ref}'$, where k is the above minimum delay until a report can be transmitted on UL-SCH, and $n'_{CQI\_ref}$ is a non-negative integer, for example 4 or 5. In some embodiments $n'_{CQI\_ref} = n_{CQI\_ref}$.

In some embodiments, it may be desirable to report different CSI information in UCI from that in UL-SCH. For example, since multi-beam $W_1$ information is much more compact than multi-beam $W_2$ information, UCI could be used to feed back the $W_1$ information, and UL-SCH could carry the $W_2$ information. Because the values of $W_1$ and $W_2$ are interrelated, it may be desirable for separate $W_1$ and $W_2$ reports to be associated with one CSI process. Therefore, in an embodiment, a first and a second value that can be indicated by a CSI request field both correspond to a given CSI process, but the first value indicates at least a beam index to be used for the CSI report, while the second value indicates at least beam cophasing to be used for the CSI report. This mechanism may also be used to trigger other configurations of multi-beam CSI. For example, the values of the CSI request field could indicate the number of beams that should be used in $W_1$, or which of the beams from $W_1$ should be used for $W_2$, as well as other parameter settings.

Because two or more different reports are used for a CSI process, the CSI request field values may be associated with CSI subprocesses, wherein each subprocess has an identifier, and more than one subprocess can be associated with one CSI process. This embodiment is illustrated in the revision to Table 7.2.1-1E of 3GPP TS 36.213 revision 13.2.0, reproduced below as TABLE 2, wherein 'CSI subprocess' is added to each value of the CSI request field.

TABLE 2

| Value of CSI request field | Description |
|---|---|
| '000' | No aperiodic CSI report is triggered |
| '001' | Aperiodic CSI report is triggered for a set of CSI process(es) and/or {CSI process, CSI subprocess, CSI subframe set}-pair(s) configured by higher layers for serving cell $_c$ |
| '010' | Aperiodic CSI report is triggered for a $1^{st}$ set of CSI process(es) and/or {CSI process, CSI subprocess, CSI subframe set}-pair(s) configured by higher layers |
| '011' | Aperiodic CSI report is triggered for a $2^{nd}$ set of CSI process(es) and/or {CSI process, CSI subprocess, CSI subframe set}-pair(s) configured by higher layers |
| '100' | Aperiodic CSI report is triggered for a $3^{rd}$ set of CSI process(es) and/or {CSI process, CSI subprocess, CSI subframe set}-pair(s) configured by higher layers |
| '101' | Aperiodic CSI report is triggered for a $4^{th}$ set of CSI process(es) and/or {CSI process, CSI subprocess, CSI subframeset}-pair(s) configured by higher layers |
| '110' | Aperiodic CSI report is triggered for a $5^{th}$ set of CSI process(es) and/or {CSI process, CSI subprocess, CSI subframe set}-pair(s) configured by higher layers |
| '111' | Aperiodic CSI report is triggered for a $6^{th}$ set of CSI process(es) and/or {CSI process, CSI subprocess, CSI subframe set}-pair(s) configured by higher layers |

The large overhead of $W_2$ reporting can be reduced by sending CSI reports only when they are sufficiently different from prior CSI reports. This is more straightforward to do with reporting on UL-SCH than in physical layer signaling (i.e., UCI) because in Rel-13, UCI only occurs at preconfigured times or when triggered by the network, and so new L1 mechanisms can be implemented to allow transmission of wireless device measurement triggered reports at times determined by the wireless device.

An issue for UL-SCH measurement triggered CSI reports is then the triggering criteria. Multi-beam CSI reporting could provide a variety of parameters, including relative beam power, PMI (including $i_1$, $i_{1,1}$, $i_{1,2}$, and $i_2$), RI, CQI, etc. In theory, variation in measurements of any of these parameters (or some combination) could be used as a basis for measurement based triggering. However, one can define a limited set of triggering criteria to avoid excessive reporting complexity. Since network scheduling decisions are based on radio link capacity, criteria that are directly relatable to radio link capacity such as CQI, SINR, or received power related measures are good candidates. Therefore, in an embodiment, a wireless device computes a CSI report comprising at least a CQI value. A metric is calculated using the CQI value, SINR, or a hypothesized channel power, and a report is triggered or not triggered according to the value of the metric. In one embodiment, a wireless device computes the metric by averaging CQI values from prior CSI reports and comparing the current CQI value to the average. The CQI values are in units of spectral efficiency, such as is provided by the CQI Tables in section 7.2.3 of 3GPP TS 36.213.

Alternatively, the signal to interference and noise ratio corresponding to the CQI index reported by the wireless device may be used. In another alternative, a measure of the expected power corresponding to a hypothesized precoder transmission is used. Such a hypothesized channel power can be calculated as $\|HW_1W_2\|_F^2$, where H is the estimated channel from the network node to the wireless device, $W_1W_2$ is the hypothesized precoder selected by the wireless device, and $\|Z\|_F^2$ is the Frobenius norm of Z. If the current CQI value or hypothesized channel power is larger than the average by a predetermined amount, a report is triggered.

This is described with the equations below: Additional criteria to the threshold of Equation 9 can be used, such as requiring the threshold to be met for a consecutive number of measurements or period of time.

$$\overline{X}_n = (1-a)\overline{X}_{n-1} + aX_n \qquad \text{Equation 8}$$

$$X_n > \overline{X}_n + T \qquad \text{Equation 9}$$

where $X_n$ is current CQI, SNR, or hypothesized channel power
$\overline{X}_n$ is the updated averaged metric
$0 < a \leq 1$ is an averaging coefficient
T is a CSI reporting threshold When the measurement criteria are met in subframe n, the wireless device may transmit the CSI report in subframe n+k, where k is a non-negative integer used to allow enough time to process CSI and transmit the CSI report on UL-SCH, for example k=4 subframes. The wireless device will transmit the CSI report in subframe n+k if it has a grant for UL-SCH in subframe n+k. Otherwise, the wireless device will report the CSI on UL-SCH in the earliest subframe after n+k for which it has a grant for UL-SCH. If the grant for UL-SCH arrives after a new measurement trigger, the old CSI report is discarded and a new one is calculated based on the subframe in which the new trigger is successfully decoded.

The reference resource for the CSI report whose measurement criteria are met in subframe n is determined as occupying the subframe $n+k-n_{CQI\_ref}'$, where k is the above minimum delay until a report can be transmitted on UL-SCH, and $n'_{CQI\_ref}$ is a non-negative integer, for example 4 or 5. In some embodiments $n'_{CQI\_ref} = n_{CQI\_ref}$. In another embodiment, the subframe information of the reference resource may be included in the CSI report so that when the CSI report is received, the network knows which subframe the CSI is valid for.

The reported CSI should be complete enough for the network to use, since a CSI report triggered by wireless device measurements will generally occur at times not controlled by the network, and so the timing relationship to other available measurements (such as periodic CSI), will not be strictly controlled. Therefore, when the CSI report is transmitted, the wireless device reports CSI on UL-SCH including at least the current CQI value. The CSI report may contain $W_2$ or both $W_1$ and $W_2$ information, as well as CQI, RI, other PMI, and CRI, as described above.

As discussed above, $W_1$ can be reported with on the order of 20 bits. Therefore, it can fit into periodic reporting in PUCCH as well as aperiodic reporting in PUSCH. Since PUCCH reporting is the most heavily constrained, and not all PUCCH formats can support the ~20 bits needed for multi-beam $W_1$, and additional bits may be needed for other CSI information, we concentrate on the design for periodic CSI, considering the different PUCCH formats.

As discussed above, because PUCCH payloads are constrained, LTE defines CSI reporting types that carry subsets of CSI components (such as CQI, PMI, RI, and CRI). These reporting types are multiplexed in time with various constraints according to a small number of approaches. The design task here is then to define PUCCH reporting types for the new CSI needed by multi-beam precoding and the subframes in which they can be transmitted.

Because only $W_1$ related parameters are to be carried on PUCCH, PUCCH reporting types needed for subband reporting, such as those carrying PTI, are not used with multi-beam $W_1$ reporting on PUCCH.

Multi-beam $W_1$ can require the following number of bits for each of its components:

beam index: $N_{DP} \cdot \log_2(N_V \cdot N_H)$
beam rotation: $\log_2(Q_H \cdot Q_V)$
beam relative power: $(N_{DP}-1) \cdot \log_2(L)$ In Rel-14, precoding codebook designs for up to 32 CSI-RS ports are to be supported. Therefore, a design targeting $N_V = N_H = 4$ is a reasonable starting point. Furthermore, oversampling factors $Q_H = Q_V = 4$ and $N_{DP} = 3$ beams are expected to provide good performance with reasonable overhead.

For PUCCH format 2, we identify the following design goals for consistency with Rel-13 operation:
  1. All CSI reporting types must fit into 11 bits
  2. At most 3 transmissions are needed to report RI, CQI, PMI, and CRI.
     a. RI (possibly with PMI and/or CRI) can occupy the entirety of one of the transmissions
        i. Rel-13 reporting types 3, 5, 7, and 8 may be used to carry RI
     b. Wideband CQI with 7 bits can be used for 2 codeword transmission
  3. Each transmission should be as useful as possible to the network node in the absence of the other transmissions.

When Rel-13 reporting types are used to carry RI and/or CRI, it is only necessary then to define two new reporting types to carry $W_1$: those needed for PMI and/or CQI. Therefore, we concentrate on the designs of these two new reporting types in the following.

With $N_V = N_H = 4$, oversampling factors $Q_H = Q_V = 4$, and $N_{DP} = 3$ beams, then 12 bits are needed for beam index. Since PUCCH format 2 supports at most 11 bits, we must reduce the number of beam ID bits if this format is to be used. Rather than reduce the number of ports, we first reduce the number of beams used for PUCCH format 2 reporting to $N_{DP} = 2$, resulting in 8 bits needed for beam ID.

Since CQI and PMI must fit into two transmissions in order to meet design goals 2 and 2a, the parameters must be selected accordingly. With $N_{DP} = 2$ beams, a 7 bit CQI, and the other parameters as above, beam rotation and beam relative power require 4 and 2 bits, respectively. Therefore, CQI and beam rotation would total to 11 bits, while beam index and beam relative power total to 10 bits.

Therefore, a first multi-beam PUCCH CSI reporting type design ('Reporting Type Set #1', below) consists of extending Rel-13 CSI reporting types carrying wideband first PMI (Type 2a) to a new 'Type 2d', and those carrying wideband CQI (Types 2, 2b, or 2c) to a new 'Type 2e'. Note that the payload size in parentheses corresponds to the assumptions above, and smaller payloads are possible, for example if a single codeword 4 bit CQI is reported, if different multi-beam CSI reporting parameters are used, etc.

Reporting Type Set #1:
Type 2d supporting wideband PMI feedback identifying beam index and beam power (10 bits)
Type 2e supporting wideband CQI and PMI feedback identifying CQI and beam rotation (11 bits)

Since all the 3 different transmissions of PUCCH needed to report RI, CQI, PMI, and CRI transmissions fit into 11 bits with the above set of parameters and reporting combinations, then requirements 1, 2, and 2a are met. However, whether requirement 3 is met may depend on if beam power or beam rotation is more useful information to have with beam ID. Beam ID+beam rotation provides better channel state information with respect to multipath angle of departure, while beam power provides better information about the relative multipath powers. As angle of departure information is likely to be more beneficial in a given report, it may be preferred in some embodiments to have beam ID and beam rotation in a single CSI report.

Since beam rotation and beam ID require a total of 12 bits with $N_V=N_H=4$, and we choose oversampling factors $Q_H=Q_V=4$, and $N_{DP}=2$ beams, some further change in parameters is needed to fit into 11 bits. If either $Q_H$ or $Q_V$ is set to 2, then only 3 bits are needed for beam rotation, and a total of 11 bits is needed for beam ID and beam rotation. Given that beam ID and rotation are in one PUCCH transmission, CQI and beam power are needed in a second transmission. These require 9 bits, and so there are two remaining bits that could fit in the second transmission. A wideband QPSK cophasing coefficient could require two bits, as described above.

An alternative approach to extending the Rel-13 CSI Types to carry multi-beam $W_1$ is then as follows, where two variants of a Type supporting CQI and PMI either does not (Type 2e') or does (Type 2f) carry a two bit wideband second PMI ('$W_2$') indication. As in reporting Type Set #1, Type 2d' can be seen as an extension of Rel-13 Type 2a, while Types 2e' and 2f can be seen as extensions of Rel-13 Types 2, 2b, or 2c. This leads to Type Set #2:

Reporting Type Set #2:
Type 2d' supporting wideband PMI feedback identifying beam index and beam rotation (11 bits)
Type 2e', supporting wideband CQI and PMI feedback identifying CQI and beam power (9 bits)
Type 2f, supporting wideband CQI and PMI feedback identifying CQI, beam power, and wideband $W_2$ (11 bits) In case further overhead reduction is desirable, CSI for $N_{SP}=1$ beam may be reported. Then with $N_V=N_H=4$, oversampling factors $Q_H=Q_V=4$, then $W_1$ can require the following number of bits for each of its components:
beam index: 4 bits
beam rotation: 4 bits
beam relative power: 0 bits Now beam index and beam rotation total to 8 bits, and easily fit within one PUCCH format 2 transmission. Furthermore, since beam relative power is not transmitted on PUCCH, modified CSI reporting types carrying beam power such as Type 2e, 2e', or 2f above are not needed. Therefore, in this case of single beam reporting, the following reporting type is defined:

Reporting Type Set #3:
Type 2d supporting wideband PMI feedback identifying beam index and beam rotation (8 bits) Still further overhead reduction is possible if beam rotation is not carried in PUCCH.

Then when a single beam is reported (i.e. with $N_{DP}=1$), only a 4 bit beam index may need to be carried on PUCCH. The beam rotation can be carried along with other multi-beam CSI feedback carried on channels other than PUCCH, such as L1 PUSCH reporting, higher layer reporting, etc. In this case, a reporting type carrying both beam index and 7 bit CQI could be sufficient for wideband PMI and CQI reporting. Since PMI and CQI are both in one reporting Type, then only two, rather than three, transmissions on PUCCH are sufficient to receive all multi-beam $W_1$ reports on PUCCH.

Reporting Type Set #4:
Type 2e" supporting wideband CQI and PMI feedback identifying beam index (11 bits)

As discussed above, with $N_V=N_H=4$, oversampling factors $Q_H=Q_V=4$, and $N_{SP}=3$ beams, then a total of 30 bits is needed for $W_1$, CQI, and RI:
beam index: $3 \cdot \log_2(4 \cdot 4)=12$
beam rotation: $2 \cdot \log_2(4)=4$
beam relative power: $(3-1) \cdot \log_2(4)=4$
Wideband CQI for 2 codewords: 7 bits
RI for 8 layers: 3 bits PUCCH format 3 supports up to 22 bits, and so it is not possible to carry multi-beam $W_1$, CQI, and RI in a single PUCCH format 3 transmission. Furthermore, PUCCH format 3 is also used to carry HARQ-ACK as well as SR, which can be up to 21 bits for TDD with up to 5 serving cells. Finally, CRI may also be carried on PUCCH, requiring an additional 3 bits with the above multi-beam codebook configuration.

For PUCCH format 3, we identify the following design goals for consistency with Rel-13 operation:
1. All CSI reporting types should fit into <=17 bits
   a. At least 5 bits should be reserved, allowing 4 bit TDD single cell HARQ-ACK and 1 bit SR
2. Minimize the number of transmissions to report RI, CQI, and PMI, and CRI.
   a. Wideband CQI with 7 bits can be used for 2 codeword transmission
   b. RI, CRI, or RI+CRI can take up to 3, 3, or 6 bits respectively.
3. Each transmission should be as useful as possible to the network node in the absence of the other transmissions.

Note that when $N_{DP}=3$ beams are used, beam rotation and beam power both require 4 bits. Therefore, from an overhead perspective, it is sufficient to consider Reporting Type Set #2 from PUCCH format 2. In this case, as for PUCCH format 2, it is possible to carry RI and/or CRI using Rel-13 mechanisms. Therefore, it is only necessary then to define two new reporting types to carry multi-beam $W_1$ for reporting Type Set #2: those needed for PMI and/or CQI.

Reporting Type Set #2 (with $N_{DP}=3$ beams)
Type 2d' supporting wideband PMI feedback identifying beam index and beam rotation (16 bits)
Type 2e', supporting wideband CQI and PMI feedback identifying CQI and beam power (11 bits)
Type 2f, supporting wideband CQI and PMI feedback identifying CQI, beam power, and wideband $W_2$ (13 bits)

More compact transmission on PUCCH is possible if RI is transmitted together with multi-beam CSI parameters. It can be difficult to transmit some Rel-13 CSI parameters with RI. Observe that Rel-13 payload sizes depend on RI: if RI is >1, a 7 bit CQI report is provided rather than a 4 bit CQI report. Therefore, the network node can't decode CQI until it determines what RI is. This makes it difficult to multiplex CQI and RI in one PUCCH transmission. However, if beams are identified with a fixed payload size in PUCCH transmissions, then a transmission containing a beam index and RI will have known size, and be easy to decode. Therefore, in an embodiment, multi-beam beam index is carried in PUCCH using a predetermined payload size, where the payload size may be determined through an RRC configured parameter. The beam index may be transmitted with a rank indication in one transmission on PUCCH, and CQI, beam power, and beam rotation can be in a second transmission on PUCCH. Alternatively, the second transmission on PUCCH may additionally contain a wideband indication of cophasing. This is summarized in Type Set #5, below.

Reporting Type Set #5

Type 5a supporting RI and wideband PMI feedback identifying beam index and RI (15 bits)

Type 2e''', supporting wideband CQI and PMI feedback identifying CQI, beam power, and beam rotation (15 bits)

Type 2f', supporting wideband CQI and PMI feedback identifying CQI, beam power, beam rotation, and wideband $W_2$ (17 bits)

It may also be desirable to carry CRI on PUCCH, possibly simultaneously with RI. If 3 bits for CRI is added to Type 5a, then a total of 18 bits would be needed, which is larger than our 17 bit design target. CRI is generally used to select among different CSI-RS resources transmitted in different horizontal or vertical directions. Given this, it may not be as necessary to have $N_D=3$ beams as compared to when CRI is not configured. Therefore, when CRI is configured, a reduced number of beams such as $N_{DP}=2$ beams is used in multi-beam CSI reporting supporting CRI.

For $N_{DP}=2$ beams with $N_V=N_H=4$, oversampling factors $Q_H=Q_V=4$, then $W_1$ can require the following number of bits for each of its components:

beam index: 8 bits
beam rotation: 4 bits
beam relative power: 2 bits

Reporting Type Set #6

Type 7a supporting CRI, and wideband PMI feedback identifying beam index and CRI (11 bits)

Type 8a supporting CRI, RI, and wideband PMI feedback identifying beam index, RI, and CRI (14 bits)

Type 2e''', supporting wideband CQI and PMI feedback identifying CQI, beam power, and beam rotation (13 bits)

Type 2f', supporting wideband CQI and PMI feedback identifying CQI, beam power, beam rotation, and wideband $W_2$ (15 bits)

In order to simplify CSI reporting, it may be desirable to use existing CSI reporting types for RI and CRI. However, in order to minimize the number of PUCCH transmissions, it is still desirable to include RI and/or CRI in a PUCCH transmission along with other multi-beam CSI feedback. As discussed above, transmissions on PUCCH including RI should not have a payload size depending on RI, and so RI should not be carried in the same PUCCH transmission as e.g. CQI. Therefore, PUCCH reporting types are defined such that there is room for RI and/or CRI in at least a PUCCH format 3 transmission. Also, CSI reporting type collision rules are altered such that when a type carrying RI and/or CRI collide with a type carrying PMI, the reporting type carrying PMI is not always dropped. Instead, both the CSI reporting types are dropped if there is no room for both the types, including any HARQ-ACK bits that are present, in a PUCCH transmission.

Reporting Type Set #7

Type 2d'' supporting wideband PMI feedback, and identifying beam index (8 or 12 bits)
  a) A Type 2d'' report that occurs in the same subframe with a Type 3, 5, 7, or 8 report is not always dropped. It is dropped if more than 22 bits is needed in a PUCCH format 3 report.

Type 2e''', supporting wideband CQI and PMI feedback identifying CQI, beam power, and beam rotation (13 or 15 bits)

Type 2f', supporting wideband CQI and PMI feedback identifying CQI, beam power, beam rotation, and wideband $W_2$ (15 or 17 bits)

Similar to the case of format 2, it may be desirable to further reduce CSI overhead, especially when reporting CSI for multiple cells. Therefore, multi-beam CSI for a given cell can be configured with $N_{DP}=1$ beam, and may be reported using $N_V=N_H=4$. If further overhead reductions are needed, then multi-beam CSI for a given cell can be configured with either or both of oversampling factors $Q_H$ and $Q_V$ can be set to less than 4. The reporting types defined above are then used, but with payloads set according to $N_{DP}=1$ or either or both of $Q_H$ and $Q_V$ set to less than 4.

PUCCH formats 4 and 5 both support payloads larger than the 35 bits needed to carry multi-beam $W_1$, CQI, PMI, RI, CRI, SR, and 4 bit HARQ-ACK. Therefore, it is not necessary to use a number of beams $N_{DP}<3$ at least when multi-beam CSI for a single cell is to be carried on PUCCH formats 4 and 5. While it is still desirable to minimize the number of PUCCH transmissions as above for PUCCH format 3, because CQI payload size depends on RI as discussed above, at least two PUCCH format 4 or 5 transmissions will generally be needed to carry a CSI report including both RI and CQI. Therefore, the PUCCH reporting types defined according to the various embodiments for PUCCH format 3 can be used for PUCCH format 4 and 5, but assuming $N_{DP} \geq 3$ with $N_V=N_H=4$ and oversampling factors $Q_H=Q_V=4$.

In Rel-13 LTE, Class A first PMI (i.e. $W_1$ reporting) alternates with CQI. Since each PMI and CQI correspond to the same reference resource and subframe, then both Class A PMI and CQI are updated at the rate of $H' \cdot N_{pd}$, that is, a factor of H' times slower than when only CQI is reported. While $W_1$ can change relatively slowly, even in such cases CQI can vary rapidly, e.g. according to interference variation or fast fading. Therefore, when Class A reporting is configured, channel tracking for CQI and PMI is substantially slower than when Class A is not configured.

A related issue is that once the network node receives CQI, it must wait a full $N_{pd}$ subframes for PMI in order to schedule a wireless device with the PMI determined for the CQI. If the CQI indicates good channel conditions for a wireless device, and the network node would like to select the wireless device for scheduling in these good channel conditions, it must wait for PMI. By the time the PMI arrives, the CQI may change.

As discussed above with respect to Table 1, the reporting timing of PUCCH CSI reporting types is determined by the CSI content of the reporting type. A simple method to define timing of PUCCH CSI reporting types carrying multi-beam CSI is to reuse these existing timing mechanisms, based on which existing reporting type the new reporting type is similar to. Therefore, in one approach we set the timing of the above defined multi-beam reporting Types as follows, where the variables are defined as in Rel-13 and as described above for Table 1. Note that $N_{pd}$, $N_{OFFSET,CQI}$, $N_{OFFSET,RI}$, H', $M_{RI}$, $M_{CRI}$, can all be determined using Rel-13 RRC parameters identified above for Table 1.

The method of timing in Table 3 is a minimal extension of Rel-13 behavior, and so may be beneficial from a wireless device and/or network implementation complexity perspective.

TABLE 3

| CSI Reporting Type | Subframe in which wideband CSI reporting type(s) are transmitted |
|---|---|
| 2e, 2e', 2e'', 2e''', 2f, 2f' | $(10 \times n_f + \lfloor n_s/2 \rfloor - N_{OFFSET, CQI}) \mod (N_{pd}) = 0$ |
| 2d, 2d', 2d'' | $(10 \times n_f + \lfloor n_s/2 \rfloor - N_{OFFSET, CQI}) \mod (H' \cdot N_{pd}) = 0$ |
| 5a | $(10 \times n_f + \lfloor n_s/2 \rfloor - N_{OFFSET, CQI} - N_{OFFSET, RI}) \mod (N_{pd} \cdot M_{RI}) = 0$ |
| 7a, 8a | $(10 \times n_f + \lfloor n_s/2 \rfloor - N_{OFFSET, CQI} - N_{OFFSET, RI}) \mod (N_{pd} \cdot M_{RI} \cdot M_{CRI}) = 0$ |

However, the Class A first PMI report timing has the above-mentioned drawbacks related to reduced reporting rate of first PMI and CQI. Therefore, in an alternative approach, reporting types 2d, 2d', and/or 2d'' reporting in subframes where the following equation is true:

$$(10 \times n_f + \lfloor n_s/2 \rfloor - N_{OFFSET,PMI}) \mod (H' \cdot N_{pd}) = 0 \quad \text{Equation 10}$$

Where (as defined in 3GPP TS 36.213 and 36.331):
$n_f$, $n_s$, $N_{pd}$ are as defined with respect to Table 1
$N_{pd}$ is the periodicity in subframes, and may be set by the higher layer parameter cqi-pmi-ConfigIndex in some embodiments
$N_{OFFSET,PMI}$ is an offset in subframes set by a higher layer parameter. It may be in the range: $0 \leq N_{OFFSET,PMI} < H' \cdot N_{pd}$
H' may be set by the higher layer parameter periodicityFactorWB in some embodiments. In others, it may be a fixed integer, or not used (equivalently fixed to H'=1 in Equation 10).

Because $N_{OFFSET,PMI}$ is used instead of $N_{OFFSET,CQI}$, Types 2d, 2d', or 2d'' can occur in subframes where CQI is not reported. For example, with H'=$M_{RI}$=1, $N_{OFFSET,CQI}$=0, $N_{OFFSET,RI}$=1, $N_{OFFSET,PMI}$=2, CQI, PMI, and RI can all be reported in 3 consecutive subframes with periodicity $N_{pd}$. In Rel-13, H' should be set to at least 2, and so CQI and PMI can be updated on the order of at least twice as fast as in Rel-13.

The following CSI reporting types can be defined in order to support multi-beam $W_1$ reporting on PUCCH formats 2, 3, 4, and/or 5. A maximum number of bits for each CSI reporting type is shown.

Type 2d supporting wideband PMI feedback identifying beam index and beam power (10 bits)
Type 2d' supporting wideband PMI feedback identifying beam index and beam rotation (11 bits)
Type 2d'' supporting wideband PMI feedback, and identifying beam index (12 bits)
Type 2e supporting wideband CQI and PMI feedback identifying CQI and beam rotation (11 bits)
Type 2e', supporting wideband CQI and PMI feedback identifying CQI and beam power (11 bits)
Type 2e'' supporting wideband CQI and PMI feedback identifying beam index (11 bits)
Type 2e''', supporting wideband CQI and PMI feedback identifying CQI, beam power, and beam rotation (15 bits)
Type 2f, supporting wideband CQI and PMI feedback identifying CQI, beam power, and wideband $W_2$ (11 bits)
Type 2f', supporting wideband CQI and PMI feedback identifying CQI, beam power, beam rotation, and wideband $W_2$ (17 bits)
Type 5a supporting RI and wideband PMI feedback identifying beam index and RI (15 bits)
Type 7a supporting CRI, and wideband PMI feedback identifying beam index and CRI (11 bits)
Type 8a supporting CRI, RI, and wideband PMI feedback identifying beam index, RI, and CRI (14 bits)

In cases where smaller payloads are needed for CSI reporting types, the bits needed to report beam indices and beam powers can be reduced by reporting using a smaller number of beams $N_{DP}$ for CSI feedback. Therefore, all the multi-beam CSI reporting types except for type 2e can have reduced overhead by reporting using a smaller number of beams. Such reduced overhead reporting can be enabled through RRC signaling that indicates the number of beams $N_{DP}$ to be used by the wireless device when calculating some or all of the multi-beam periodic CSI reporting types, except for type 2e.

If maximum payloads of 11 bits or less and at most 2 distinct PUCCH transmissions are required, Types 2e'' and Rel-13 Types 3 or 7 may be used together to provide wideband CQI and PMI (beam index) in one transmission, with RI and/or CRI in the other transmission. In this case, a single beam index is reported (and so there is no relative beam power or wideband cophasing to report) and there is no room for beam rotation.

If maximum payloads of 11 bits or less and at most 3 distinct PUCCH transmissions can be used, a first transmission identifies at least a beam index, while a second transmission identifies at least one of a beam power and a beam rotation. CSI reporting type combinations are shown below. If RI and/or CRI is configured, a third transmission carries reporting type 3 or 7. Note that the transmission numbering here does not imply a particular order in time, just that there are at most 3 distinct transmissions in time: up to 2 from the table below, and up to one carrying RI and/or CRI.

TABLE 4

| Transmission 1 | Transmission 2 | Max # Beams Reported | Max # bits for beam rotation |
|---|---|---|---|
| 2d | 2e | 2 | 4 |
| 2d' | 2e' or 2f | 2 | 3 |

If maximum payloads of 22 bits or less and at most 2 distinct PUCCH transmissions can be used, a first transmission identifies at least a beam index and RI and/or CRI, while a second transmission identifies CQI, beam power, and beam rotation. If maximum payloads of 22 bits or less and at most 3 distinct PUCCH transmissions can be used, a first transmission identifies at least a beam index, while a second transmission identifies at least one of a beam power and a beam rotation, and the third carries RI and/or CRI. CSI reporting type combinations are shown below.

TABLE 5

| Transmission 1 | Transmission 2 | Transmission 3 | Max # Beams Reported | Max # bits for beam rotation |
|---|---|---|---|---|
| 2d | 2e | 3 or 7 | 3 | 4 |
| 2d' | 2e' or 2f | 3 or 7 | 3 | 4 |
| 2d" | 2e'" or 2f' | 3 or 7 | 3 or 2 | 4 |
| 5a | 2e'" or 2f' | n/a | 3 | 4 |
| 7a or 8a | 2e'" or 2f' | n/a | 2 | 4 |

Figure 10:
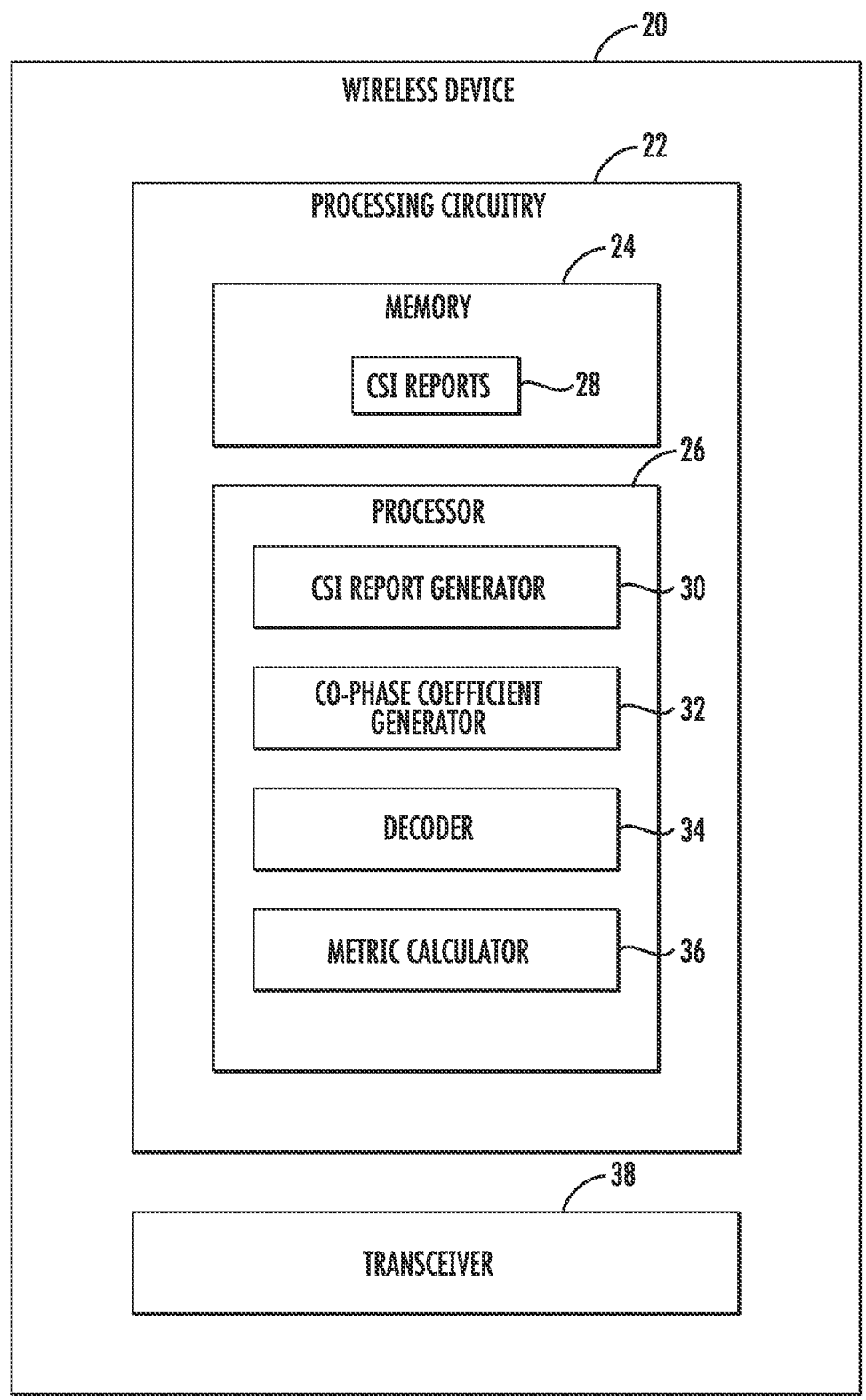
FIG. 10 is a block diagram of a wireless device.

FIG. 10 is a block diagram of a wireless device 20 configured to report multi-beam channel state information, CSI. The wireless device 20 includes processing circuitry 22. In some embodiments, the processing circuitry may include a memory 24 and processor 26, the memory 24 containing instructions which, when executed by the processor 26, configure processor 26 to perform the one or more functions described herein for multi-beam CSI reporting. In addition to a traditional processor and memory, processing circuitry 22 may include integrated circuitry for processing and/or control, e.g., one or more processors and/or processor cores and/or FPGAs (Field Programmable Gate Array) and/or ASICs (Application Specific Integrated Circuitry).

Processing circuitry 22 may include and/or be connected to and/or be configured for accessing (e.g., writing to and/or reading from) memory 24, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by control circuitry and/or other data, e.g., data pertaining to communication, e.g., configuration and/or address data of nodes, etc. Processing circuitry 22 may be configured to control any of the methods described herein and/or to cause such methods to be performed, e.g., by processor 26. Corresponding instructions may be stored in the memory 24, which may be readable and/or readably connected to the processing circuitry 22. In other words, processing circuitry 22 may include a controller, which may comprise a microprocessor and/or microcontroller and/or FPGA (Field-Programmable Gate Array) device and/or ASIC (Application Specific Integrated Circuit) device. It may be considered that processing circuitry 22 includes or may be connected or connectable to memory, which may be configured to be accessible for reading and/or writing by the controller and/or processing circuitry 22.

In one embodiment, the memory 24 is configured to store CSI reports 28. The CSI reports may include an identity of a plurality of beam cophasing coefficients, a plurality of beam index pairs ($l_k$, $m_k$), each beam index pair corresponding to a beam, k, at least one of a beam power, a beam rotation and a channel quality index, CQI, indications of at least one of a recommended precoder, a rank indicator (RI), and a CSI-RS resource indicator (CRI). The processor 26 executes software to perform functions of a CSI report generator 30, a cophase coefficient generator 32 for identifying a plurality of beam cophase coefficients, a decoder 34 to decode one of a downlink control channel and a DL-SCH and a metric calculator 36 for calculating a channel quality metric. The wireless device 20 also includes a transceiver 38 to transmit CSI reports to a network node. Although shown as a single integrated transmitter/receiver unit designated as a "transceiver," it is understood that implementations using separate transmitter and receiver can be made and that embodiments are not limited to a single combined transmitter/receiver.

Figure 11:
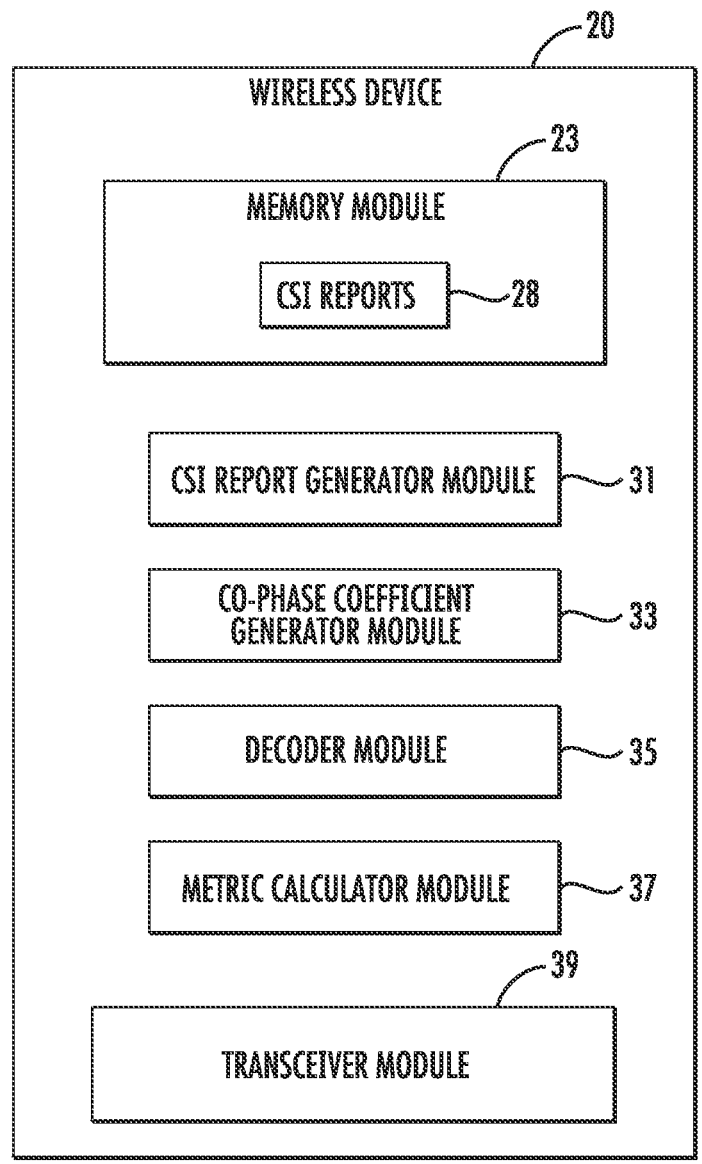
FIG. 11 is a block diagram of an alternative embodiment of the wireless device.

FIG. 11 is a block diagram of an alternative embodiment of a wireless device 20, which includes a memory module 23, a CSI report generator module 31, a cophase coefficient generator module 33, a decoder module 35, a metric calculator module 37 and a transceiver module 39. These modules may be implemented as software that is executable by a computer processor to perform functions described above with respect to FIG. 10. Specifically, in some embodiments, a memory module is configured to store CSI reports, a calculator module is configured to calculate a channel quality metric in a first subframe, and a CSI report generator module is configured to generate a CSI report corresponding to the first subframe. Also, a transceiver module is configured to transmit the CSI report in the uplink transport channel in a second subframe, the second subframe being after the first subframe, if the channel quality metric meets a reporting criterion.

In some embodiments, a wireless device having the above-described modules uses the memory module 23 to store a CSI report corresponding to a plurality of beams and identifying a plurality of beam cophasing coefficients. The CSI report generator module 31 generates the CSI report and the cophase coefficient generator module 33 generates the beam cophasing coefficients. The transceiver module 39 sends the beam cophasing coefficients to the network node on an uplink control channel that is produced using a MAC protocol.

In some embodiments, the memory module 23 of the wireless device is configured to store a plurality of beam index pairs ($l_k$, $m_k$), each beam index pair corresponding to a beam, k, and at least one of a beam power, a beam rotation and a channel quality index, CQI. These parameters may be transmitted to a network node by the transceiver module 39.

In some embodiments, the memory module 23 of the wireless device 20 is configured to store CSI reports including indications of at least one of a recommended precoder, a channel quality indicator (CQI), a rank indicator (RI), and a CSI-RS resource indicator (CRI), and the CSI reports are generated by the CSI report generator module 31.

In some embodiments, the memory module 23 stores CSI reports that are generated by the CSI report generator module 31 during a first subframe. Also, the decoder module 35 successfully decodes one of a downlink control channel and a DL-SCH in a first subframe, where one of the DCI in the downlink control channel and the DL-SCH indicate that the wireless device should report CSI. The CSI report generated in the second subframe by the CSI report generator module 31. The CSI report is transmitted to a network node by the transceiver module 39 in an uplink transport channel in a third subframe.

Figure 12:
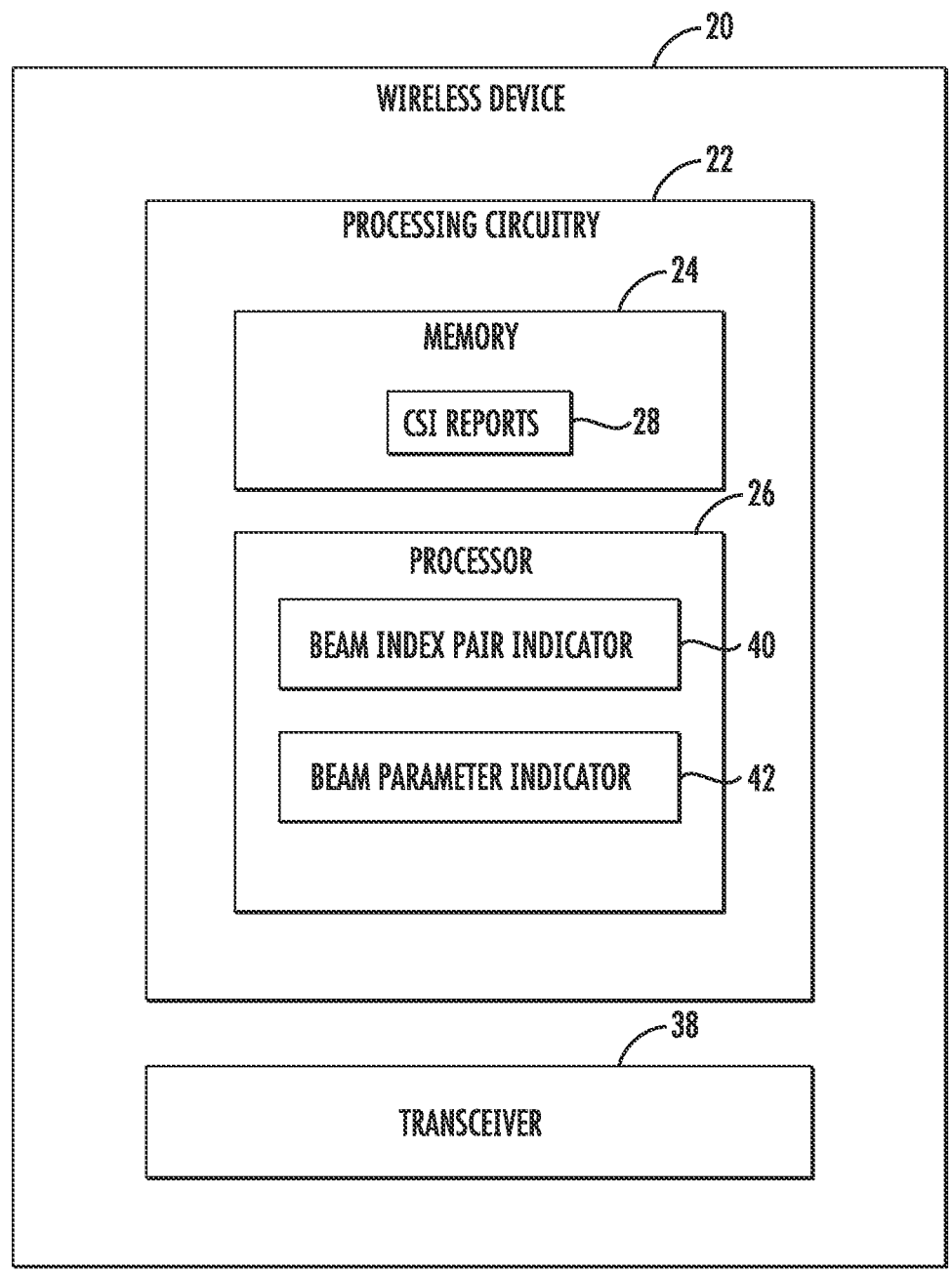
FIG. 12 is a block diagram of an alternative embodiment of the wireless device.

FIG. 12 is a block diagram of another alternative embodiment of a wireless device 20. In the embodiment of FIG. 12 the processor implements a beam index pair indicator 40 and a beam parameter indicator 42. The beam index pair indicator 40 is configured to provide an indication of a plurality of beam index pairs, $(l_k, m_k)$, in the UCI in a first transmission, each beam index pair corresponding to a beam k. The beam parameter indicator 42 is configured to provide an indication of at least one of a beam power, a beam rotation and a channel quality index, CQI, in the UCI in a second transmission. A transceiver is configured to transmit at least one of the indication of beam index pairs, beam power, beam rotation and CQI. In the embodiment of FIG. 12, a beam power $p_k$ of a beam k is a real number such that a cophasing factor $c_k$ can be expressed $c_k = c'_k p_k$, where $|c_k'|^2 = 1$, and beam rotations $r_1$ and $r_2$ are real numbers such that beam directions for beam k, $\Delta_{1,k}$ and $\Delta_{2,k}$ can be expressed as $\Delta_{1,k} = \Delta'_{1,k} + r_1$ and $\Delta_{2,k} = \Delta'_{2,k} + r_2$.

Figure 13:
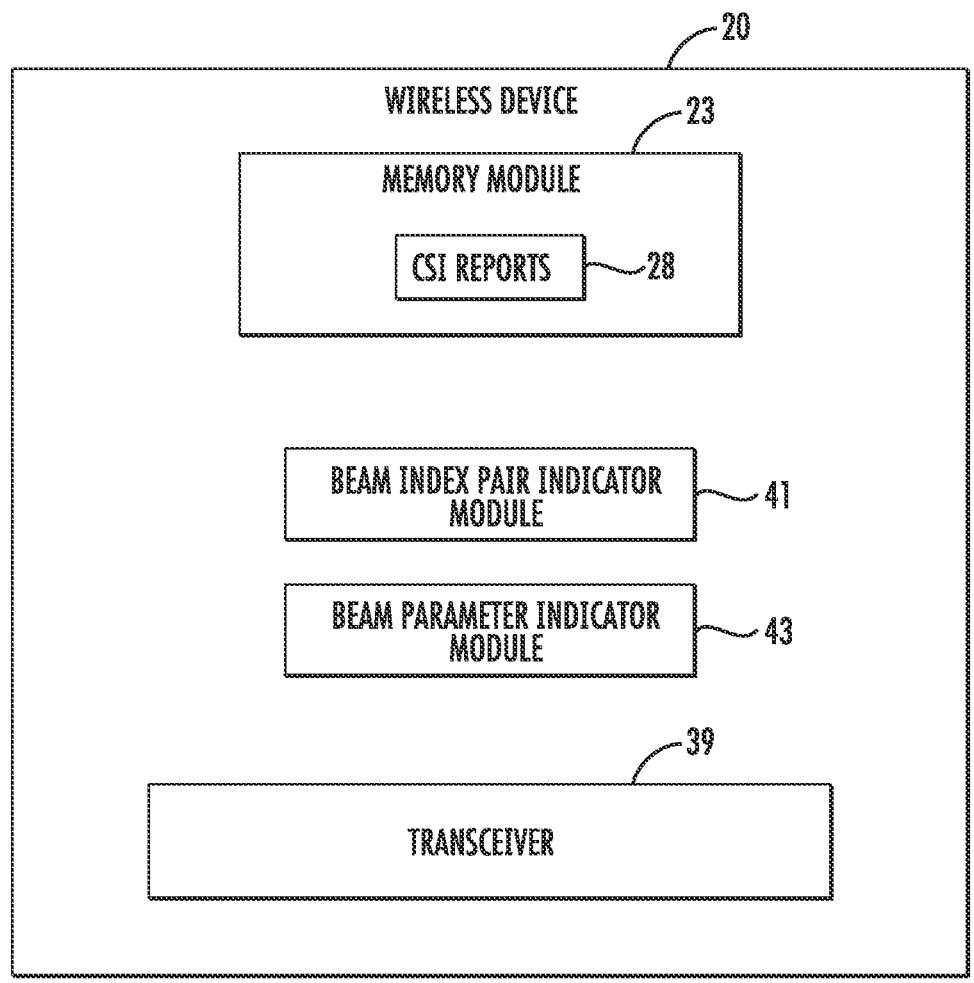
FIG. 13 is a block diagram of an alternative embodiment of the wireless device.

FIG. 13 is an alternative embodiment of the wireless device 20 which includes the memory module 23 which stores CSI reports 28. The wireless device 20 also includes software modules for implementing a beam index pair indication module 41 configured to provide an indication of a plurality of beam index pairs, $(l_k, m_k)$, in the UCI in a first transmission, each beam index pair corresponding to a beam k. The beam pair indicator module 43 is configured to provide an indication of at least one of a beam power, a beam rotation and a channel quality index, CQI, in the UCI in a second transmission. The transceiver module 39 is configured to transmit at least one of the indication of beam index pairs, beam power, beam rotation and CQI. In the embodiment of FIG. 13, a beam power $p_k$ of a beam k is a real number such that a cophasing factor $c_k$ can be expressed $c_k = c'_k p_k$, where $|c_k'|^2 = 1$, and beam rotations $r_1$ and $r_2$ are real numbers such that beam directions for beam k, $\Delta_{1,k}$ and $\Delta_{2,k}$ can be expressed as $\Delta_{1,k} = \Delta'_{1,k} + r_1$ and $\Delta_{2,k} = \Delta'_{2,k} + r_2$.

Figure 14:
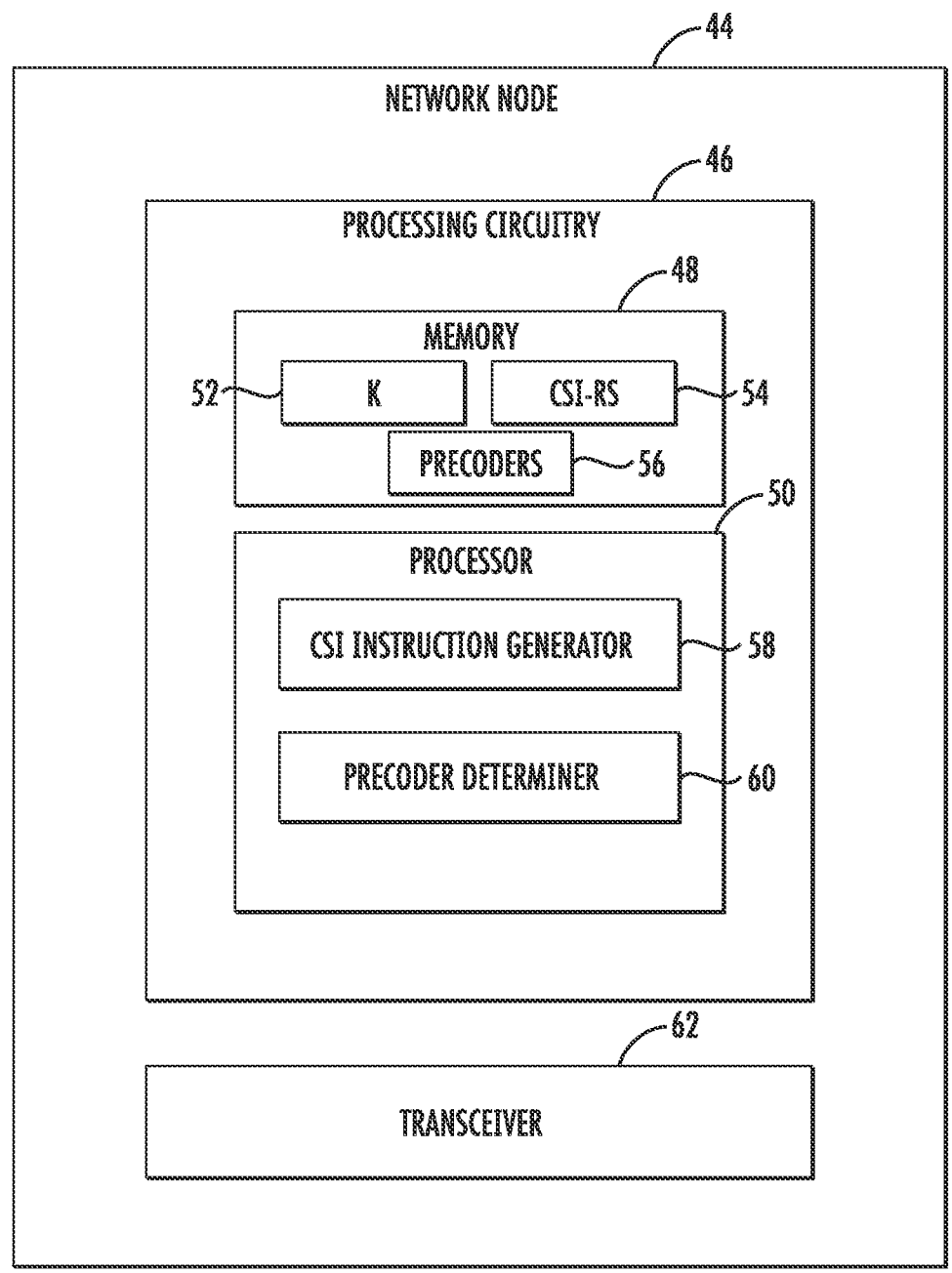
FIG. 14 is a block diagram of a network node.

FIG. 14 is a block diagram of a network node 44, such as a base station or eNB, configured to obtain a precoder based on information from a wireless device. The network node 44 has processing circuitry 46. In some embodiments, the processing circuitry may include a memory 48 and processor 50, the memory 48 containing instructions which, when executed by the processor 50, configure processor 50 to perform the functions described herein for obtaining a precoder based on information from a wireless device 20.

In one embodiment, the memory 48 is configured to store a number of beams, K, 50 used to determine a precoder W. The memory 48 is also configured to store a channel state information-reference symbol, CSI-RS, 52 for estimating w, cophasing coefficients $c_1, \ldots, c_k$, and multiple precoders, $b_1, \ldots b_k$ $1 < k < K$, 54. The processor 50 is in communication with the memory 48 and is configured to implement a CSI instruction generator to generate an instruction to instruct the wireless device 20 to provide CSI reports. The processor 50 is further configured to implement a precoder computer 60 to compute a precoder $w = \sum_{k=1}^{K} c_k b_k$. The transceiver 62 is in communication with the processor 50 and is configured to transmit K and the CSI-RS to the wireless device and to receive from the wireless device the cophasing coefficients and $c_1, \ldots, c_k$ multiple precoders $b_1, \ldots b_k$. Although shown as a single integrated transmitter/receiver unit designated as a "transceiver" it is understood that implementations using separate transmitter and receiver can be made and that embodiments are not limited to a single combined transmitter/receiver.

Figure 15:
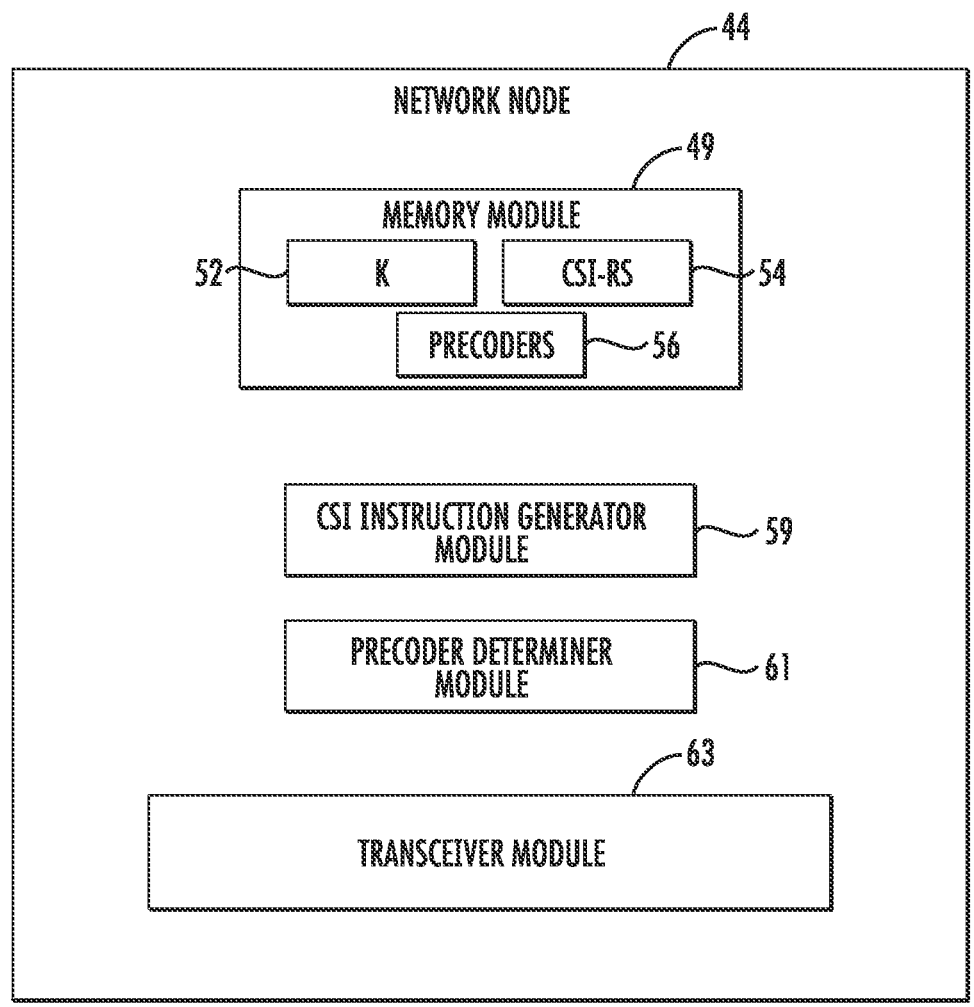
FIG. 15 is a block diagram of an alternative embodiment of a network node.

FIG. 15 is a block diagram of an alternative embodiment of the network node 40 having modules that include a memory module 49, a CSI instruction generator module 59, a precoder determiner module 61 and a transceiver module 63. In one embodiment, the precoder module and at least some of the transceiver module 63 may be implemented as software executable by a computer processor. The memory module 49, the CSI instruction generator module 59, the precoder module 61 and transceiver module 63 may perform the same functions as memory 48, CSI instruction generator 58, precoder computer 60 and transceiver 62, respectively.

Figure 16:
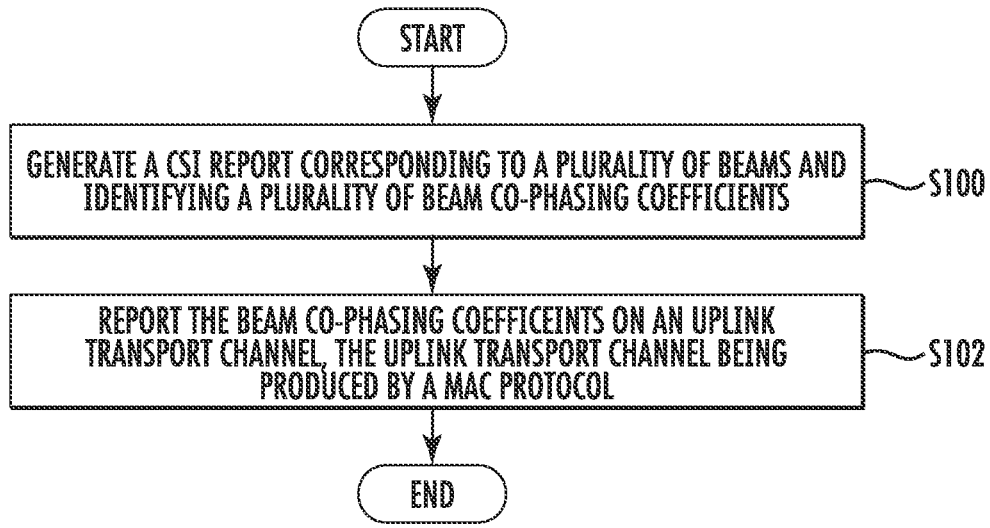
FIG. 16 is a flowchart of an exemplary process of reporting multi-beam channel state information, CSI, in a wireless device.

FIG. 16 is a flowchart of an exemplary process of reporting multi-beam channel state information, CSI, in a wireless device. The process includes generating a CSI report corresponding to a plurality of beams and identifying a plurality of beam cophasing coefficients (block S100). The process also includes reporting the beam cophasing coefficients on an uplink transport channel, the uplink transport channel being produced using a medium access control, MAC, protocol (block S102).

Figure 17:
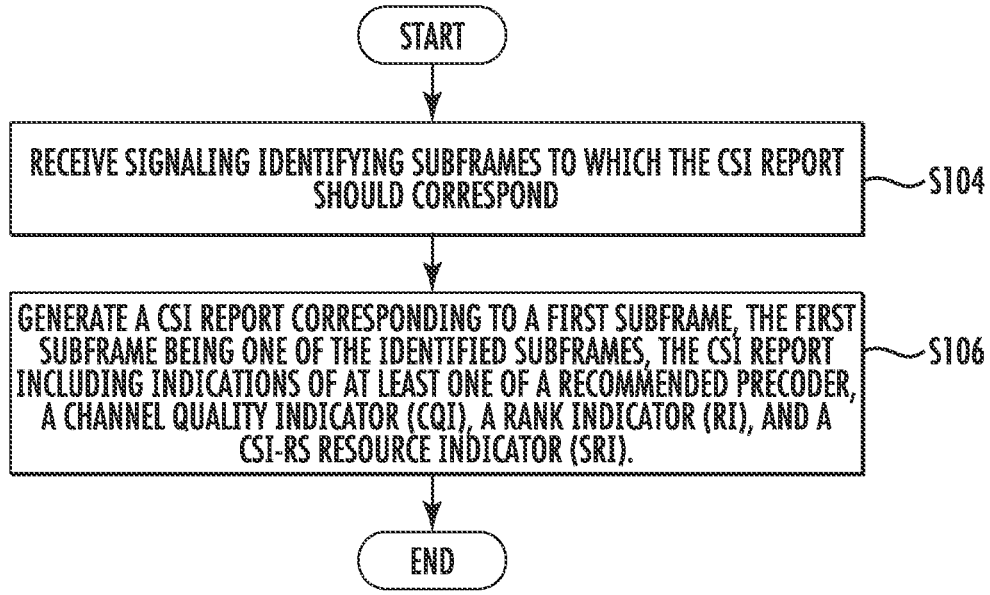
FIG. 17 is a flowchart of an exemplary process in a wireless device of reporting channel state information, CSI, at predetermined times on an uplink transport channel.

FIG. 17 is a flowchart of an exemplary process in a wireless device of reporting channel state information, CSI, at predetermined times on an uplink transport channel. The process includes receiving signaling identifying subframes to which the CSI report should correspond (block S104). The process also includes generating a CSI report corresponding to a first subframe, the first subframe being one of the identified subframes, the CSI report including indications of at least one of a recommended precoder, a channel quality indicator (CQI), a rank indicator (RI), and a CSI-RS resource indicator (CRI) (block S106).

Figure 18:
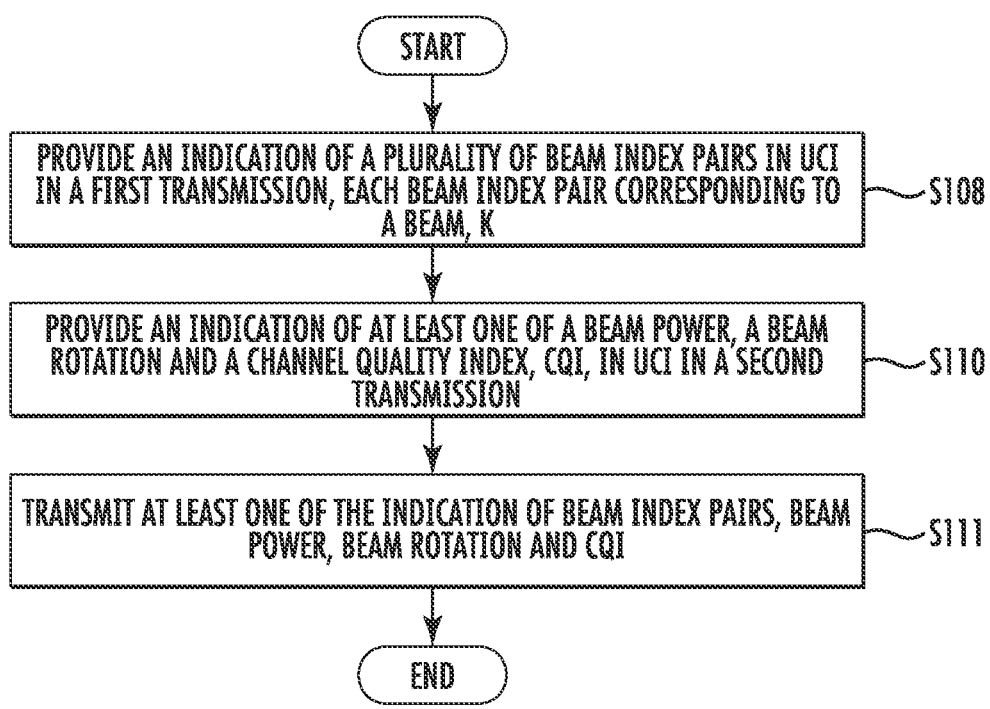
FIG. 18 is a flowchart of a process for reporting multi-beam channel state information, CSI, in uplink control information, UCI.

FIG. 18 is a flowchart of a process for reporting multi-beam channel state information, CSI, in uplink control information, UCI. The process includes providing a plurality of beam index pairs $(l_k, m_k)$ in UCI in a first transmission, each beam index pair corresponding to a beam, k (block S108). The process also includes providing an indication of at least one of a beam power, a beam rotation and a channel quality index, CQI, in UCI in a second transmission (block S110). In some embodiments, the process also includes transmitting at least one of the indication of beam index pairs, beam power, beam rotation and CQI (block S111).

Figure 19:
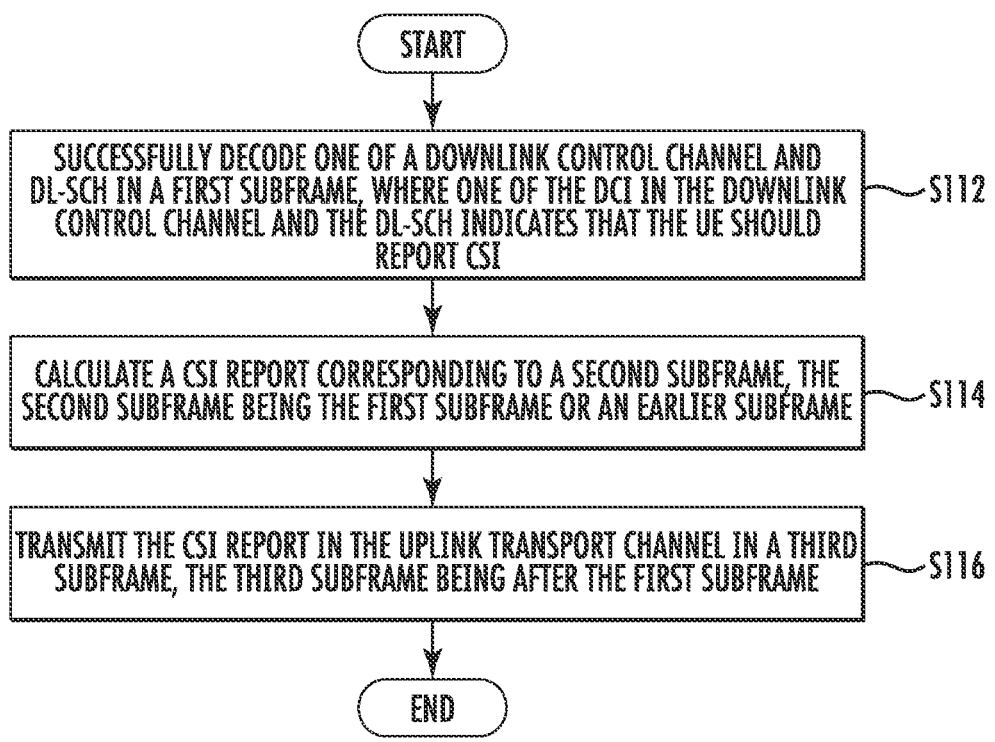
FIG. 19 is a flowchart of an exemplary process of reporting triggered channel state information, CSI, reports on an uplink transport channel.

FIG. 19 is a flowchart of an exemplary process of reporting triggered channel state information, CSI, reports on an uplink transport channel. The process includes successfully decoding one of a downlink control channel and DL-SCH in a first subframe, where one of the DCI in the downlink control channel and the DL-SCH indicates that the wireless device should report CSI (block S112). The process also includes generating a CSI report corresponding to a second subframe, the second subframe being the first subframe or an earlier subframe (block S114). The process also includes transmitting the CSI report in the uplink transport channel in a third subframe, the third subframe being after the first subframe (block S116).

Figure 20:
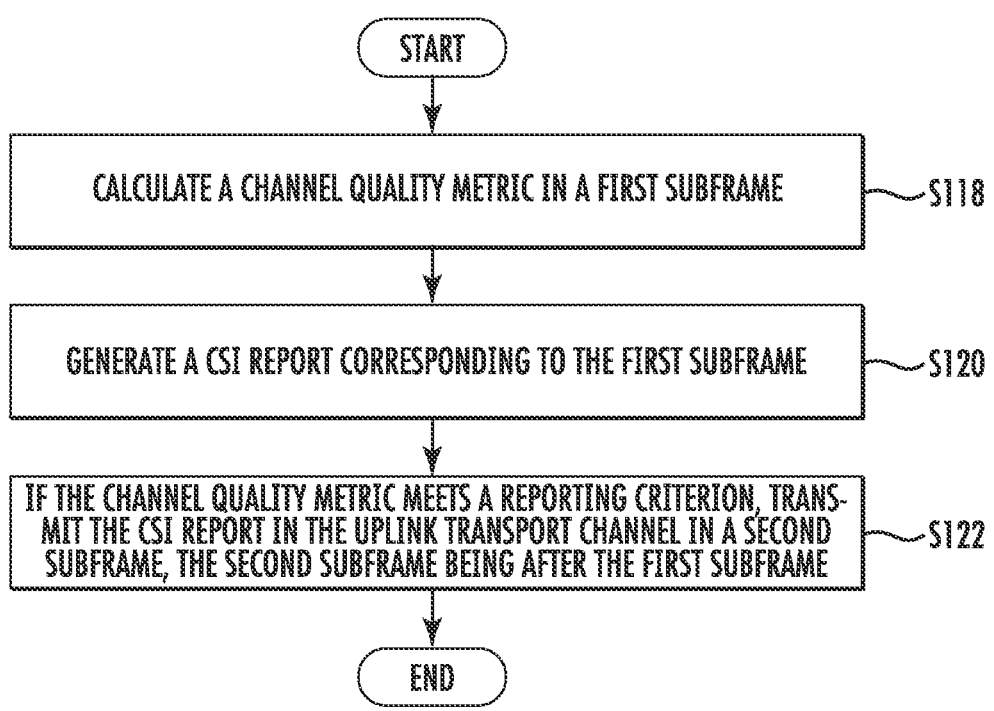
FIG. 20 is a flowchart of an exemplary process in a wireless device of triggering channel state information, CSI, reports on an uplink transport channel.

FIG. 20 is a flowchart of an exemplary process in a wireless device of triggering channel state information, CSI, reports on an uplink transport channel. The process includes calculating a channel quality metric in a first subframe (block S118). The process includes generating a CSI report corresponding to the first subframe (block S120). The process includes, if the channel quality metric meets a reporting criterion, transmitting the CSI report in the uplink transport channel in a second subframe, the second subframe being after the first subframe (block S122).

Figure 21:
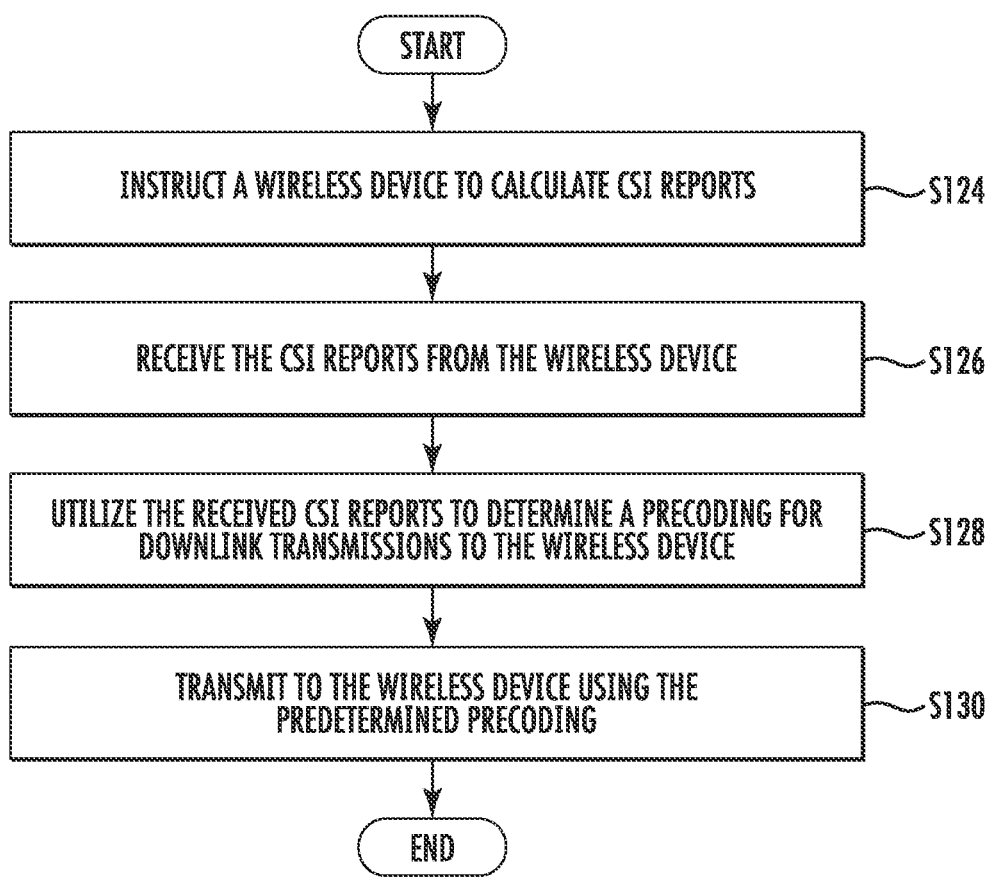
FIG. 21 is a flowchart of an exemplary process in a network node for processing CSI reports.

FIG. 21 is a flowchart of an exemplary process in a network node of generating predetermined precoding. The process includes instructing a wireless device to calculate CSI reports (block S124). The process also includes receiving an indication of a plurality of beam index pairs, $(l_k, m_k)$, in the UCI in a first transmission, each beam index pair corresponding to a beam k (block S126). The process also includes receiving an indication of at least one of a beam power, a beam rotation and a channel quality index, CQI, in the UCI in a second transmission (block S128).

Some embodiments, include a method in a wireless device 20 of reporting multi-beam channel state information, CSI, in uplink control information, UCI. The method includes providing an indication of a plurality of beam index pairs, $(l_k, m_k)$, in the UCI in a first transmission, each beam index pair corresponding to a beam k S108. The method includes providing an indication of at least one of a beam power, a beam rotation and a channel quality index, CQI, in the UCI in a second transmission S110.

In some embodiments, a beam power $p_k$ of a beam k is a real number such that a cophasing factor $c_k$ can be expressed $c_k=c'_k p_k$, where $|c_k'|^2=1$ and beam rotations $r_1$ and $r_2$ are real numbers such that beam directions for beam k, $\Delta_{1,k}$ and $\Delta_{2,k}$ can be expressed as $\Delta_{1,k}=\Delta'_{1,k}+r_1$ and $\Delta_{2,k}=\Delta'_{2,k}+r_2$. In some embodiments, a method further includes generating, via the CSI report generator 30, a first periodicity CSI report 28 corresponding to a plurality of beams and identifying a plurality of beam cophasing factors, and transmitting, via the transceiver 38, the beam cophasing factors on an uplink transport channel, the uplink transport channel being produced using a medium access control, MAC, protocol. In some embodiments, the method may further include: receiving, via the transceiver 38, signaling identifying a periodicity $N_{pd}$ with which a plurality of CSI reports should be transmitted; determining at least a second periodicity $H'\cdot N_{pd}$, where H' is an integer greater than zero; transmitting, via the transceiver 38, a CQI report of a plurality of CQI reports in UCI in a subframe occurring once every $N_{pd}$ subframes unless a second periodicity CSI report 28 is to be transmitted, wherein the second periodicity CSI report 38 includes at least one of the beam index i, the beam power, and the beam rotation, in UCI in in a subframe occurring once every $H'\cdot N_{pd}$ subframes, wherein: a beam power $p_i$ for a beam with index i is a real number such that cophasing factor $c_i$ can be expressed $c_i=c'_i p_i$, where $|c_i'|^2=1$, and a beam rotation $r_1$ or $r_2$ is a real number such that beam directions $\Delta_1$ and $\Delta_2$ can be expressed $\Delta_1=\Delta'_1+r_1$ and $\Delta_2=\Delta'_2+r_2$; and if the second periodicity CSI report is to be transmitted, via the transceiver 38, transmitting the second periodicity CSI report 28 once every $H'\cdot N_{pd}$ subframes.

In some embodiments, each beam is a kth beam, d(k), that comprises a set of complex numbers and has index pair $(l_k, m_k)$, each element of the set of complex numbers being characterized by at least one complex phase shift such that:
$d_n(k)=d_i(k)\alpha_{i,n} e^{j2\pi(p\Delta_{1,k}+q\Delta_{2,k})}$;
$d_n(k)$, and $d_i(k)$ are the $i^{th}$ and $n^{th}$ elements of d(k), respectively;
$\alpha_{i,n}$ is a real number corresponding to the $i^{th}$ and $n^{th}$ elements of d(k);
p and q are integers; and
beam directions $\Delta_{1,k}$ and $\Delta_{2,k}$ are real numbers corresponding to beams with index pair $(l_k, m_k)$ that determine the complex phase shifts $e^{j2\pi\Delta_{1,k}}$ and $e^{j2\pi\Delta_{2,k}}$ respectively; and each beam cophasing coefficient is a complex number $c_k$ for d(k) that is used to adjust the phase of the $i^{th}$ element of d(k) according to $c_k d_i(k)$.

In some embodiments, the method further includes generating, via the CSI report generator 30 a third periodicity CSI report 28 corresponding to a first subframe, the CSI report 28 including indications of at least one of a recommended precoder, a channel quality indicator (CQI), a rank indicator (RI), and a CSI-RS resource indicator (CRI). In some embodiments, the method further includes determining a second subframe in which the wireless device 20 may transmit the CSI report; if the wireless device 20 receives a grant allowing it to transmit in the second subframe, transmitting the CSI report in an uplink transport channel in the second subframe; and otherwise, transmitting the CSI report 28 in the uplink transport channel in a third subframe after the second subframe, wherein the wireless device 20 receives a grant allowing it to transmit in the third subframe.

In some embodiments, the method may further comprise calculating a channel quality metric in a first subframe; generating a CSI report 28, via CSI report generator 30, corresponding to the first subframe; and if the channel quality metric meets a reporting criterion, transmitting, via the transceiver 38, the CSI report 28 in an uplink transport channel in a second subframe, the second subframe being after the first subframe.

In some embodiments, a method may further comprises transmitting the CSI report 28 in the uplink transport channel in a second subframe, the second subframe being after the first subframe, if the channel quality metric meets a reporting criterion.

In some embodiments, a method may further include successfully decoding, via the decoder 34, one of a downlink control channel and downlink shared transport channel (DL-SCH) in a first subframe, where one of downlink channel information, DCI, in the downlink control channel and the DL-SCH indicate that the wireless device should report CSI.

In some embodiments, a wireless device 20 for reporting multi-beam channel state information, CSI, in uplink control information, UCI, is provided. The wireless device 20 includes processing circuitry 22 configured to: provide an indication of a plurality of beam index pairs, $(l_k, m_k)$, in the UCI in a first transmission, each beam index pair corresponding to a beam k; and provide an indication of at least one of a beam power, a beam rotation and a channel quality index, CQI, in the UCI in a second transmission. The wireless device 20 also includes a transceiver 38 configured to transmit the first and second transmission.

In some embodiments, a beam power $p_k$ of a beam k is a real number such that a cophasing factor $c_k$ can be expressed $c_k=c'_k p_k$, where $|c_k'|^2=1$, and beam rotations $r_1$ and $r_2$ are real numbers such that beam directions for beam k, $\Delta_{1,k}$ and $\Delta_{2,k}$ can be expressed as $\Delta_{1,k}=\Delta'_{1,k}+r_1$ and $\Delta_{2,k}=\Delta'_{2,k}+r_2$.

In some embodiments, the wireless device 20 includes processing circuitry 22 configured to generate, via CSI report generator 30, a CSI report corresponding to a plurality of beams and identifying a plurality of beam cophasing factors, and further includes a transmitter 38 configured to transmit the beam cophasing factors on an uplink transport channel, the uplink transport channel being produced using a medium access control, MAC, protocol.

In some embodiments, each beam is a km beam, d(k), that comprises a set of complex numbers and has index pair $(l_k, m_k)$, each element of the set of complex numbers being characterized by at least one complex phase shift such that:
$d_n(k)=d_i(k)\alpha_{i,n} e^{j2\pi(p\Delta_{1,k}+q\Delta_{2,k})}$;
$d_n(k)$, and $d_i(k)$ are is and $n^{th}$ elements of d(k), respectively;
$\alpha_{i,n}$ is a real number corresponding to the $i^{th}$ and $n^{th}$ elements of d(k);
p and q are integers; and
beam directions $\Delta_{1,k}$ and $\Delta_{2,k}$ are real numbers corresponding to beams with index pair $(l_k, m_k)$ that determine the complex phase shifts $e^{j2\pi\Delta_{1,k}}$ and $e^{j2\pi\Delta_{2,k}}$ respectively; and each beam cophasing coefficient is a complex number $c_k$ for d(k) that is used to adjust the phase of the $i^{th}$ element of d(k) according to $c_k d_i(k)$.

In some embodiments, the transceiver 38 is further configured to receive signaling identifying a periodicity $N_{pd}$ with which a plurality of CSI reports should be transmitted; transmit a CQI report of a plurality of CQI reports 28 in UCI in a subframe occurring once every $N_{pd}$ subframes unless a second periodicity CSI report is to be transmitted, wherein the second periodicity CSI report 28 includes at least one of the beam index i, the beam power, and the beam rotation, in UCI in in a subframe occurring once every $H' \cdot N_{pd}$ subframes, wherein: a beam power $p_i$ for a beam with index i is a real number such that cophasing factor $c_i$ can be expressed $c_i = c'_i p_i$, where $|c_i'|^2 = 1$, and a beam rotation $r_1$ or $r_2$ is a real number such that beam directions $\Delta_1$ and $\Delta_2$ can be expressed $\Delta_1 = \Delta'_1 + r_1$ and $\Delta_2 = \Delta'_2 + r_2$; and if the second periodicity CSI report 28 is to be transmitted, transmit, via the transceiver 38, the second CSI report once every $H' \cdot N_{pd}$ subframes.

In some embodiments, the processing circuitry 22 is further configured to generate, via implementation of the CSI report generator 30, a CSI report 28 corresponding to a first subframe, the CSI report 28 including indications of at least one of a recommended precoder, a channel quality indicator (CQI), a rank indicator (RI), and a CSI-RS resource indicator (CRI). In some embodiments, the processing circuitry 22 is further configured to: determine a second subframe in which the wireless device 20 may transmit the CSI report 28; and the transceiver 38 configured to: if the wireless device 20 receives a grant allowing it to transmit in the second subframe, transmit the CSI report in an uplink transport channel in the second subframe; and otherwise, transmit the CSI report in the uplink transport channel in a third subframe after the second subframe, wherein the wireless device 20 receives a grant allowing it to transmit in the third subframe.

In some embodiments, the processor circuitry 22 is further configured to: calculate a channel quality metric in a first subframe, and generate a CSI report 28 corresponding to the first subframe. In some embodiments, the wireless device includes a transceiver 38 further configured to, if the channel quality metric meets a reporting criterion, transmit the CSI report 28 in an uplink transport channel in a second subframe, the second subframe being after the first subframe.

In some embodiments, the processing circuitry 22 is further configured to decode 34 one of a downlink control channel and downlink shared transport channel, DL-SCH, in a first subframe, where one of downlink control information, DCI, in the downlink control channel and the DL-SCH indicate that the wireless device should report CSI.

In some embodiments, a wireless device 20 for reporting multi-beam channel state information, CSI, in uplink control information, UCI, is provided. The wireless device 20 includes a beam index pair indicator module 41 configured to provide an indication of a plurality of beam index pairs, ($l_k$, $m_k$), in the UCI in a first transmission, each beam index pair corresponding to a beam k; and a beam parameter indicator module 43 configured to provide an indication of at least one of a beam power, a beam rotation and a channel quality index in the UCI in a second transmission.

In some embodiments, a beam power $p_k$ of a beam k is a real number such that a cophasing factor $c_k$ can be expressed $c_k = c'_k p_k$, where $|c_k'|^2 = 1$, and beam rotations $r_1$ and $r_2$ are real numbers such that beam directions for beam k, $\Delta_{1,k}$ and $\Delta_{2,k}$ can be expressed as $\Delta_{1,k} = \Delta'_{1,k} + r_1$ and $\Delta_{2,k} = \Delta'_{2,k} + r_2$.

In some embodiments, a method performed in a network node 44 of obtaining multi-beam channel state information, CSI, in uplink control information, UCI. The method includes instructing a wireless device 20 to calculate and transmit channel state information, CSI, reports. The method includes receiving, via the transmitter 62, an indication of a plurality of beam index pairs, ($l_k$, $m_k$), in the UCI in a first transmission, each beam index pair corresponding to a beam k; and receiving an indication of at least one of a beam power, a beam rotation and a channel quality index, CQI, in the UCI in a second transmission.

In some embodiments, a network node 44 includes processing circuitry 46 configured to: instruct a wireless device 20 to calculate and transmit channel station information, reports; receive an indication of a plurality of beam index pairs, ($l_k$, $m_k$), in the UCI in a first transmission, each beam index pair corresponding to a beam k; and receive an indication of at least one of a beam power, a beam rotation and a channel quality index, CQI, in the UCI in a second transmission.

In some embodiments, a network node 44 includes a CSI instruction generator module 59 configured to generate an instruction to instruct a wireless device 20 to calculate CSI reports, and a transceiver module configured to receive, an indication of a plurality of beam index pairs, ($l_k$, $m_k$), in the UCI in a first transmission, each beam index pair corresponding to a beam k; and an indication of at least one of a beam power, a beam rotation and a channel quality index, CQI, in the UCI in a second transmission.

Some embodiments include:

Embodiment 1. A method of reporting multi-beam channel state information, CSI, in a wireless device, the method including:
generating a CSI report corresponding to a plurality of beams and identifying a plurality of beam cophasing coefficients; and
reporting the beam cophasing coefficients on an uplink transport channel, the uplink transport channel being produced using a medium access control, MAC, protocol.

Embodiment 2. A wireless device configured to report multi-beam channel state information, CSI, the wireless device comprising:
processing circuitry including a memory and a processor:
the memory configured to store a CSI report corresponding to a plurality of beams and identifying a plurality of beam cophasing coefficients; and
the processor configured to:
generate the CSI report; and
report the beam cophasing coefficients on an uplink transport channel, the uplink transport channel being produced using a medium access control, MAC, protocol.

Embodiment 3. A method for reporting multi-beam channel state information, CSI, in uplink control information, UCI, the method including:
providing a plurality of beam index pairs ($l_k$, $m_k$) in UCI in a first transmission, each beam index pair corresponding to a beam, k; and
providing an indication of at least one of a beam power, a beam rotation and a channel quality index, CQI, in UCI in a second transmission.

Embodiment 4. The method of Embodiment 3, wherein:
a beam power $p_k$ for a beam k is a real number such that cophasing factor $c_k$ can be expressed $c_k = c'_k p_k$, where $|c_k'|^2 = 1$; and
a beam rotation $r_1$ or $r_2$ is a real number such that beam directions for beam k, $\Delta_{1,k}$ and $\Delta_{2,k}$, can be expressed $\Delta_{1,k} = \Delta'_{1,k} + r_1$ and $\Delta_{2,k} = \Delta'_{2,k} + r_2$.

Embodiment 5. The method of Embodiment 3, wherein:
each beam is a $k^{th}$ beam d(k) that comprises a set of complex numbers and has index pair $(l_k, m_k)$, each element of the set of complex numbers being characterized by at least one complex phase shift such that:
i. $d_n(k)=d_i(k)\alpha_{i,n}e^{j2\pi(p\Delta_{1,k}+q\Delta_{2,k})}$;
ii. $d_n(k)$, and $d_i(k)$ are the $i^{th}$ and $n^{th}$ elements of the beam d(k), respectively;
iii. $\alpha_{i,n}$ is a real number corresponding to the $i^{th}$ and $n^{th}$ elements of the beam d(k);
iv. p and q are integers; and
v. beam directions $\Delta_{1,k}$ and $\Delta_{2,k}$ are real numbers corresponding to beams with index pair $(l_k, m_k)$ that determine the complex phase shifts $e^{j2\pi\Delta_{1,k}}$ and $e^{j2\pi\Delta_{2,k}}$ respectively; and
each beam cophasing coefficient is a complex number $c_k$ for the $k^{th}$ beam d(k) that is used to adjust the phase of the $k^{th}$ beam d(k) according to $c_k d(k)$.

Embodiment 6. The method of Embodiment 3, further comprising:
receiving signaling identifying a periodicity $N_{pd}$ with which a plurality of CSI reports containing CQI should be transmitted;
determining at least a second periodicity $H'\cdot N_{pd}$, where H' is an integer greater than zero;
transmitting a CQI report of the plurality of CQI reports in UCI in a subframe occurring once every $N_{pd}$ subframes unless a second CSI report is to be transmitted;
transmitting the second CSI report containing at least one of the beam index i, a beam power, and a beam rotation, in UCI in in a subframe occurring once every $H'\cdot N_{pd}$ subframes, wherein:
a beam power $p_i$ for a beam with index i is a real number such that cophasing factor $c_i$ can be expressed $c_i=c'_i p_i$, where $|c_i'|^2=1$; and
a beam rotation $r_1$ or $r_2$ is a real number such that beam directions $\Delta_1$ and $\Delta_2$ can be expressed $\Delta_1=\Delta'_1+r_1$ and $\Delta_2=\Delta'_2+r_2$.

Embodiment 7. A wireless device configured to report multi-beam channel state information, CSI, in uplink control information, UCI, the wireless device including:
processing circuitry including a memory and a processor; the memory configured to store:
a plurality of beam index pairs $(l_k, m_k)$, each beam index pair corresponding to a beam, k; and
at least one of a beam power, a beam rotation and a channel quality index, CQI; and
the processor configured to:
provide the beam index pairs; and
provide an indication of the at least one of a beam power, a beam rotation and a channel quality index, CQI.

Embodiment 8. The wireless device of Embodiment 7, wherein:
a beam power $p_k$ for a beam k is a real number such that cophasing factor $c_k$ can be expressed $c_k=c'_k p_k$, where $|c_k'|^2=1$; and
a beam rotation $r_1$ or $r_2$ is a real number such that beam directions for beam k, $\Delta_{1,k}$ and $\Delta_{2,k}$, can be expressed $\Delta_{1,k}=\Delta'_{1,k}+r_1$ and $\Delta_{2,k}=\Delta'_{2,k}+r_2$.

Embodiment 9. The wireless device of Embodiment 7 wherein:
each beam is a $k^{th}$ beam d(k) that comprises a set of complex numbers and has index pair $(l_k, m_k)$, each element of the set of complex numbers being characterized by at least one complex phase shift such that:
i. $d_n(k)=d_i(k)\alpha_{i,n}e^{j2\pi(p\Delta_{1,k}+q\Delta_{2,k})}$;
ii. $d_n(k)$, and $d_i(k)$ are the $i^{th}$ and $n^{th}$ elements of the beam d(k), respectively;
iii. $\alpha_{i,n}$ is a real number corresponding to the $i^{th}$ and $n^{th}$ elements of the beam d(k);
iv. p and q are integers; and
v. beam directions $\Delta_{1,k}$ and $\Delta_{2,k}$ are real numbers corresponding to beams with index pair $(l_k, m_k)$ that determine the complex phase shifts $e^{j2\pi\Delta_{1,k}}$ and $e^{j2\pi\Delta_{2,k}}$ respectively; and
each beam cophasing coefficient is a complex number $c_k$ for the $k^{th}$ beam d(k) that is used to adjust the phase of the $k^{th}$ beam d(k) according to $c_k d(k)$.

Embodiment 10. The wireless device of Embodiment 7, wherein the processor is further configured to:
receive signaling identifying a periodicity $N_{pd}$ with which a plurality of CSI reports containing CQI should be transmitted;
determine at least a second periodicity $H'\cdot N_{pd}$, where H' is an integer greater than zero;
transmit a CQI report of the plurality of CQI reports in UCI in a subframe occurring once every $N_{pd}$ subframes unless a second CSI report is to be transmitted;
transmit the second CSI report containing at least one of the beam index i, a beam power, and a beam rotation, in UCI in in a subframe occurring once every $H'\cdot N_{pd}$ subframes, wherein:
a beam power $p_i$ for a beam with index i is a real number such that cophasing factor $c_i$ can be expressed $c_i=c'_i p_i$, where $|c_i'|^2=1$; and
a beam rotation $r_1$ or $r_2$ is a real number such that beam directions $\Delta_1$ and $\Delta_2$ can be expressed $\Delta_1=\Delta'_1+r_1$ and $\Delta_2=\Delta'_2+r_2$.

Embodiment 11. A method in a wireless device of reporting channel state information, CSI, at predetermined times on an uplink transport channel, the method comprising:
receiving signaling identifying subframes to which the CSI report should correspond; and
generate a CSI report corresponding to a first subframe, the first subframe being one of the identified subframes, the CSI report including indications of at least one of a recommended precoder, a channel quality indicator (CQI), a rank indicator (RI), and a CSI-RS resource indicator (CRI).

Embodiment 12. The method of Embodiment 11, further comprising:
determining a second subframe in which the wireless device may transmit the CSI report;
if the wireless device receives a grant allowing it to transmit in the subframe, transmitting the CSI report in the uplink transport channel in the second subframe;
otherwise, transmitting the CSI report in the uplink transport channel in a third subframe after the second subframe, wherein the wireless device receives a grant allowing it to transmit in the third subframe.

Embodiment 13. A wireless device configured to provide channel state information, CSI, at predetermined times on an uplink transport channel, the wireless device comprising:
processing circuitry including a memory and a processor; the memory configured to store CSI reports, the CSI report including indications of at least one of a recommended precoder, a channel quality indicator (CQI), a rank indicator (RI), and a CSI-RS resource indicator (CRI); and the processor configured to:
 receive signaling identifying subframes to which a CSI report should correspond;
 generate the CSI reports corresponding to a first subframe, the first subframe being one of the identified subframes, a CSI report being based at least in part on a number of beams.

Embodiment 14. The wireless device of Embodiment 13, wherein the processor is further configured to:
determine a second subframe in which the wireless device may transmit the CSI report; and
if the wireless device receives a grant allowing it to transmit in the subframe, transmit the CSI report in the uplink transport channel in the second subframe;
 otherwise, transmit the CSI report in the uplink transport channel in a third subframe after the second subframe, wherein the wireless device receives a grant allowing it to transmit in the third subframe.

Embodiment 15. A method in a wireless device of reporting triggered channel state information, CSI, reports on an uplink transport channel, the method comprising:
successfully decoding one of a downlink control channel and downlink shared transport channel (DL-SCH) in a first subframe, where one of the DCI in the downlink control channel and the DL-SCH indicate that the wireless device should report CSI;
generating a CSI report corresponding to a second subframe, the second subframe being the first subframe or an earlier subframe; and
transmitting the CSI report in the uplink transport channel in a third subframe, the third subframe being after the first subframe.

Embodiment 16. The method of Embodiment 15, wherein the CSI report includes indications of at least one of a recommended precoder, a channel quality indicator (CQI), a rank indicator (RI), and a CSI-RS resource indicator (CRI).

Embodiment 17. A wireless device configured to report triggered channel state information, CSI, reports on an uplink transport channel, the wireless device comprising:
processing circuitry including a memory and a processor:
 the memory configured to store CSI reports; and
 the processor configured to:
  successfully decode one of a downlink control channel and a DL-SCH in a first subframe, where one of the DCI in the downlink control channel and the DL-SCH indicate that the wireless device should report CSI; and
  generate a CSI report corresponding to a second subframe, the second subframe being the first subframe or an earlier subframe; and
a transceiver configured to transmit the CSI report in the uplink transport channel in a third subframe, the third subframe being after the first subframe.

Embodiment 18. The method of Embodiment 17, wherein the CSI report includes indications of at least one of a recommended precoder, a channel quality indicator (CQI), a rank indicator (RI), and a CSI-RS resource indicator (CRI).

Embodiment 19. A method in a wireless device of triggering channel state information, CSI, reports on an uplink transport channel, the method comprising:
calculating a channel quality metric in a first subframe;
generating a CSI report corresponding to the first subframe; and
if the channel quality metric meets a reporting criterion, transmitting the CSI report in the uplink transport channel in a second subframe, the second subframe being after the first subframe.

Embodiment 20. The method of Embodiment 19, wherein the CSI report includes indications of at least one of a recommended precoder, a channel quality indicator (CQI), a rank indicator (RI), and a CSI-RS resource indicator (CRI).

Embodiment 21. A wireless device configured to trigger channel state information, CSI, reports on an uplink transport channel, the wireless device comprising:
processing circuitry including a memory and a processor;
 the memory configured to store CSI reports; and
 the processor configured to:
  calculate a channel quality metric in a first subframe;
  generate a CSI report corresponding to the first subframe; and
a transceiver configured to transmit the CSI report in the uplink transport channel in a second subframe, the second subframe being after the first subframe, if the channel quality metric meets a reporting criterion.

Embodiment 22. The wireless device of Embodiment 21, wherein the CSI report includes indications of at least one of a recommended precoder, a channel quality indicator (CQI), a rank indicator (RI), and a CSI-RS resource indicator (CRI).

Embodiment 23. A wireless device configured to trigger channel state information, CSI, reports on an uplink transport channel, the wireless device comprising:
a memory module configured to store CSI reports;
a calculator module configured to calculate a channel quality metric in a first subframe;
a CSI report generator module configured to generate a CSI report corresponding to the first subframe; and
a transceiver module configured to transmit the CSI report in the uplink transport channel in a second subframe, the second subframe being after the first subframe, if the channel quality metric meets a reporting criterion.

Embodiment 24. A method performed in a transmitting network node, the method comprising any one of:
configuring/triggering/instructing one or more wireless devices to calculate CSI reports as described herein;
receiving the CSI reports from the one or more wireless devices;
utilizing the received CSI reports to determine a precoding for downlink transmission to the one or more wireless devices; and
transmitting to one or more of the one or more wireless devices using the determined precoding.

Embodiment 25. A network node comprising processing circuitry including a memory and a processor:
the memory configured to store CSI reports; and
the processor configured to perform at least one of:
 configuring/triggering/instructing one or more wireless devices to calculate CSI reports as described herein;
 receiving the CSI reports from the one or more wireless devices;
 utilizing the received CSI reports to determine a precoding for downlink transmission to the one or more wireless devices; and
Transmitting to one or more of the one or more wireless devices using the determined precoding.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations used in the preceding description include:
1D One dimensional
2D Two-Dimensional
3GPP Third Generation Partnership Project
5G Fifth Generation
ACK Acknowledgement
ASIC Application Specific Integrated Circuit
ARQ Automatic Retransmission Request
CA Carrier Aggregation
CB Codebook
CDMA Code Division Multiple Access
CFAI CSI Feedback Accuracy Indicator
CFI Control Information Indicator
CP Cyclic Prefix
CPU Central Processing Unit
CQI Channel Quality Indicators
CRS Common Reference Symbol/Signal
CSI Channel State Information
CSI-RS Channel State Information Reference Symbol/Signal
dB Decibel
DCI Downlink Control Information
DFT Discrete Fourier Transform
DL Downlink
eNB Enhanced or Evolved Node B
DP Dual Polarization
EPC Evolved Packet Core
EPDCCH Enhanced Physical Downlink Control Channel
EPRE Energy per Resource Element
E-UTRAN Evolved or Enhanced Universal Terrestrial Radio Access Network
FDD Frequency Division Duplexing
FD-MIMO Full Dimension MIMO
FFT Fast Fourier Transform
FPGA Field Programmable Gate Array
GSM Global System for Mobile Communications
HARQ Hybrid ARQ
ID Identifier
IFFT Inverse FFT
LSB Least Significant Bit
LTE Long Term Evolution
M2M Machine-to-Machine
MCS Modulation and Coding Scheme (or State)
MIMO Multiple Input Multiple Output
MME Mobility Management Entity
MSB Most Significant Bit
MU-MIMO Multi-User MIMO
NAK Non-Acknowledgement
NZP Non-Zero Power
OCC Orthogonal Cover Code
OFDM Orthogonal Frequency Division Multiplexing PCFICH Physical Control Format Indicator Channel
PDA Personal Data Assistance
PDCCH Physical Downlink Control Channel
PDSCH Physical Downlink Shared Channel
PRB Physical Resource Block
PMI Precoder Matrix Indicator
PUCCH Physical Uplink Control Channel
PUSCH Physical Uplink Shared Channel
QPSK Quadrature Phase Shift Keying
RB Resource Block
RE Resource Element
Rel Release
RI Rank Indicator
RRC Radio Resource Control
RPI Relative Power Indication
SINR Signal to Interference plus Noise Ratio
SNR Signal to Noise Ratio
SP Single Polarization
SR Scheduling Request
SU-MIMO Single User MIMO
TDD Time Division Duplexing
TFRE Time/Frequency Resource Element
TP Transmission Point
TS Technical Specification
Tx Transmit
UE User Equipment
UL Uplink
ULA Uniform Linear Array
UMB Ultra Mobile Broadband
UPA Uniform Planar Array
WCDMA Wideband Code Division Multiple Access
ZP Zero Power It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a user equipment of reporting multi-beam channel state information, CSI, in uplink control information, UCI, the method including:
   performing a first transmission in the UCI, the first transmission indicating a plurality of beam index pairs, $(l_k, m_k)$, each beam index pair corresponding to a beam k; and
   performing a second transmission in the UCI, the second transmission indicating at least one of a beam power, a beam rotation and a channel quality index, CQI.

2. The method of claim 1, wherein a beam power $p_k$ of a beam k is a real number such that a cophasing factor $c_k$ can be expressed $c_k = c'_k p_k$, where $|c'_k|^2 = 1$ and beam rotations $r_1$ and $r_2$ are real numbers such that beam directions for beam k, $\Delta_{1,k}$ and $\Delta_{2,k}$ can be expressed as $\Delta_{1,k} = \Delta'_{1,k} + r_1$ and $\Delta'_{2,k} = \Delta'_{2,k} + r_2$.

3. The method of claim 1, further comprising:
   generating a first periodicity CSI report corresponding to a plurality of beams and identifying a plurality of beam cophasing factors; and
   transmitting the beam cophasing factors on an uplink transport channel, the uplink transport channel being produced using a medium access control, MAC, protocol.

4. The method of claim 1, further comprising:
   receiving signaling identifying a periodicity $N_{pd}$ with which a plurality of CSI reports should be transmitted;
   determining at least a second periodicity $H' \cdot N_{pd}$, where H' is an integer greater than zero;
   transmitting a CQI report of a plurality of CQI reports in UCI in a subframe occurring once every $N_{pd}$ subframes unless a second periodicity CSI report is to be transmitted, wherein
   the second periodicity CSI report includes at least one of a beam index i, the beam power, and the beam rotation, in UCI in in a subframe occurring once every $H' \cdot N_{pd}$ subframes, wherein:
   a beam power $p_i$ for a beam with index i is a real number such that cophasing factor cophasing factor $c_i$ can be expressed $c_i = c'_i p_i$, where $|c'_i|^2 = 1$, and
   a beam rotation $r_1$ or $r_2$ is a real number such that beam directions a beam rotation $r_1$ or $r_2$ is a real number such that beam directions $\Delta_1$ and $\Delta_2$ can be expressed $\Delta_1 = \Delta'_1 + r_1$ and $\Delta_2 = \Delta'_2 + r_2$; and
   if the second periodicity CSI report (28) is to be transmitted, transmitting the second periodicity CSI report once every $H' \cdot N_{pd}$ subframes.

5. The method of claim 1, wherein: each beam is a $k^{th}$ beam, d(k), that comprises a set of complex numbers and has index pair $(l_k, m_k)$, each element of the set of complex numbers being characterized by at least one complex phase shift such that:
   $d_n(k) = d_i(k) \alpha_{i,n} e^{j2\pi(p\Delta_{1,k} + q\Delta_{2,k})}$;
   $d_n(k)$, and $d_i(k)$ are $i^{th}$ and $n^{th}$ elements of d(k), respectively;
   $\alpha_{i,n}$ is a real number corresponding to the $i^{th}$ and $n^{th}$ elements of d(k);
   p and q are integers; and
   beam directions $\Delta_{1,k}$ and $\Delta_{2,k}$ are real numbers corresponding to beams with index pair $(l_k, m_k)$ that determine the complex phase shifts $e^{j2\pi\Delta_{1,k}}$ and $e^{j2\pi\Delta_{2,k}}$ respectively; and
   each beam cophasing coefficient is a complex number $c_k$ for d(k) that is used to adjust the phase of the $i^{th}$ element of d(k) according to $c_k d_i(k)$.

6. The method of claim 1, further comprising generating a third periodicity CSI report (28) corresponding to a first subframe, the CSI report (28) including indications of at least one of a recommended precoder, a channel quality indicator (CQI), a rank indicator (RI), and a CSI-RS resource indicator (CRI).

7. The method of claim 6, further comprising:
   determining a second subframe in which a user equipment may transmit the CSI report;
   if the user equipment receives a grant allowing it to transmit in the second subframe, transmitting the CSI report in an uplink transport channel in the second subframe; and
   otherwise, transmitting the CSI report in the uplink transport channel in a third subframe after the second subframe, wherein the user equipment receives a grant allowing it to transmit in the third subframe.

8. The method of claim 1, further comprising:
   calculating a channel quality metric in a first subframe;
   generating a CSI report corresponding to the first subframe; and
   if the channel quality metric meets a reporting criterion, transmitting the CSI report in an uplink transport channel in a second subframe, the second subframe being after the first subframe.

9. The method of claim 1, further comprising successfully decoding one of a downlink control channel and downlink shared transport channel (DL-SCH) in a first subframe, where one of downlink channel information, DCI, in the downlink control channel and the DL-SCH indicate that the user equipment should report CSI.

10. A user equipment for reporting multi-beam channel state information, CSI, in uplink control information, UCI, the user equipment including:
processing circuitry configured to:
indicate a plurality of beam index pairs, $(l_k,m_k)$, in the UCI in a first transmission, each beam index pair corresponding to a beam k; and
indicate at least one of a beam power, a beam rotation and a channel quality index, CQI, in the UCI in a second transmission; and
a transceiver configured to transmit the first and second transmission.

11. The user equipment of claim 10, wherein a beam power $p_k$ of a beam k is a real number such that a cophasing factor $c_k$ can be expressed $c_k=c'_k p_k$, where $|c'_k|^2=1$, and beam rotations $r_1$ and $r_2$ are real numbers such that beam directions for beam k, $\Delta_{1,k}$ and $\Delta_{2,k}$ can be expressed as $\Delta_{1,k}=\Delta'_{1,k}+r_1$ and $\Delta'_{2,k}=\Delta'_{2,k}+r_2$.

12. The user equipment of claim 10, wherein the processing circuitry is further configured to:
generate a CSI report corresponding to a plurality of beams and identifying a plurality of beam cophasing factors; and
transmit the beam cophasing factors on an uplink transport channel, the uplink transport channel being produced using a medium access control, MAC, protocol.

13. The user equipment of claim 10, wherein: each beam is a $k^{th}$ beam, d(k), that comprises a set of complex numbers and has index pair $(l_k,m_k)$, each element of the set of complex numbers being characterized by at least one complex phase shift such that:
$d_n(k)=d_i(k)\alpha_{i,n}e^{j2\pi(p\Delta_{1,k}+q\Delta_{2,k})}$;
$d_n(k)$, and $d_i(k)$ are $i^{th}$ and $n^{th}$ elements of d(k), respectively;
$\alpha_{i,n}$ is a real number corresponding to the $i^{th}$ and $n^{th}$ elements of d(k);
p and q are integers; and
beam directions $\Delta_{1,k}$ and $\Delta_{2,k}$ are real numbers corresponding to beams with index pair $(l_k, m_k)$ that determine the complex phase shifts $e^{j2\pi\Delta_{1,k}}$ and $e^{j2\pi\Delta_{2,k}}$ respectively; and
each beam cophasing coefficient is a complex number $c_k$ for d(k) that is used to adjust the phase of the $i^{th}$ element of d(k) according to $c_k d_i(k)$.

14. The user equipment of claim 10, wherein:
the transceiver is further configured to:
receive signaling identifying a periodicity $N_{pd}$ with which a plurality of CSI reports should be transmitted;
transmit a CQI report of a plurality of CQI reports in UCI in a subframe occurring once every $N_{pd}$ subframes unless a second periodicity CSI report is to be transmitted, wherein:
the second periodicity CSI report includes at least one of the beam index i, the beam power, and the beam rotation, in UCI in in a subframe occurring once every $H'\cdot N_{pd}$ subframes, wherein:
a beam power $p_i$ for a beam with index i is a real number such that cophasing factor $c_i$ can be expressed $c_i=c'_i p_i$, where $|c'_i|^2=1$, and
a beam rotation $r_1$ or $r_2$ is a real number such that beam directions $\Delta_1$ and $\Delta_2$ can be expressed $\Delta_1=\Delta'_1+r_1$ and $\Delta_2=\Delta'_2+r_2$; and
if the second periodicity CSI report is to be transmitted, transmit the second CSI report once every $H'\cdot N_{pd}$ subframes.

15. The user equipment of claim 10, wherein the processing circuitry is further configured to generate a CSI report corresponding to a first subframe, the CSI report including indications of at least one of a recommended precoder, a channel quality indicator (COI), a rank indicator (RI), and a CSI-RS resource indicator (CRI).

16. The user equipment of claim 15, wherein the processing circuitry is further configured to:
determine a second subframe in which the user equipment may transmit the CSI report; and
the transceiver configured to;
if the user equipment receives a grant allowing it to transmit in the second subframe, transmit the CSI report in an uplink transport channel in the second subframe; and
otherwise, transmit the CSI report in the uplink transport channel in a third subframe after the second subframe, wherein the user equipment receives a grant allowing it to transmit in the third subframe.

17. The user equipment of claim 10, wherein the processing circuitry is further configured to:
calculate a channel quality metric in a first subframe;
generate a CSI report corresponding to the first subframe; and
the transceiver further configured to, if the channel quality metric meets a reporting criterion, transmit the CSI report in an uplink transport channel in a second subframe, the second subframe being after the first subframe.

18. The user equipment of claim 10, wherein the processing circuitry is further configured to decode one of a downlink control channel and downlink shared transport channel, DL-SCH, in a first subframe, where one of downlink control information, DCI, in the downlink control channel and the DL-SCH indicate that the user equipment should report CSI.

19. A base station comprising:
processing circuitry configured to:
instruct a user equipment to calculate and transmit channel station information, CSI, reports;
receive, in a first transmission of the UCI, an indication of a plurality of beam index pairs, $(l_k,m_k)$, each beam index pair corresponding to a beam k; and
receive, in a second transmission of the UCI, an indication of at least one of a beam power, a beam rotation and a channel quality index, CQI.

20. The base station of claim 19, wherein a beam power $p_k$ of a beam k is a real number such that a cophasing factor $c_k$ can be expressed $c_k=c'_k p_k$, where $|c'_k|^2=1$, and beam rotations $r_1$ and $r_2$ are real numbers such that beam directions for beam k, $\Delta_{1,k}$ and $\Delta_{2,k}$ can be expressed as $\Delta_{1,k}=\Delta'_{1,k}+r_1$ and $\Delta_{2,k}=\Delta'_{2,k}+r_2$.

* * * * *